(12) United States Patent
Tanaka et al.

(10) Patent No.: US 6,994,573 B2
(45) Date of Patent: Feb. 7, 2006

(54) CONNECTOR FOR MEMORY CARD

(75) Inventors: Hirohisa Tanaka, Tsu (JP); Hidetoshi Takeyama, Hisai (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/466,109

(22) PCT Filed: Nov. 15, 2002

(86) PCT No.: PCT/JP02/11984

§ 371 (c)(1),
(2), (4) Date: Jul. 21, 2003

(87) PCT Pub. No.: WO03/042902

PCT Pub. Date: May 22, 2003

(65) Prior Publication Data

US 2005/0101170 A1    May 12, 2005

(30) Foreign Application Priority Data

Nov. 15, 2001  (JP) .............................. 2001-350782
Apr. 26, 2002  (JP) .............................. 2002-127556

(51) Int. Cl.
*H01R 13/62*       (2006.01)
(52) U.S. Cl. ....................... 439/159; 439/630
(58) Field of Classification Search ................ 439/159, 439/630, 76.1
See application file for complete search history.

(56) References Cited

U.S. PATENT DOCUMENTS

| 5,768,110 | A | * | 6/1998 | Frommer et al. | ........... 439/76.1 |
| 6,102,708 | A | * | 8/2000 | Kimura | ....................... 439/159 |
| 6,109,940 | A | | 8/2000 | Chad et al. | |
| 6,394,843 | B1 | * | 5/2002 | Chang et al. | ................ 439/159 |

FOREIGN PATENT DOCUMENTS

| EP | 0936705 | 8/1999 |
| EP | 1146474 | 10/2001 |

* cited by examiner

*Primary Examiner*—Briggitte R. Hammond
(74) *Attorney, Agent, or Firm*—Greenblum & Bernstein, P.L.C.

(57) ABSTRACT

In a connector used for connecting a memory card to an apparatus which processes the data stored in the memory card, a cover shell and a base shell which configure a box-shaped housing are respectively formed by a metal thin plate for increasing the mechanical strength of the housing and for grounding the housing with ease so that the connector can be tough with respect to static electricity and external noise. Contacts, which are to be contacted with I/O contacts of a memory card, are integrally held on a contact base by insert molding so that contacting portions and soldering terminals of the contacts can be aligned parallel to and on the same level. A slider is configured to move forward and backward in the housing to correspond to the insertion and withdrawal of the memory card. The slider is pressed by pressing forces of a pair of coil springs so that the movement of the slider is smooth.

13 Claims, 40 Drawing Sheets

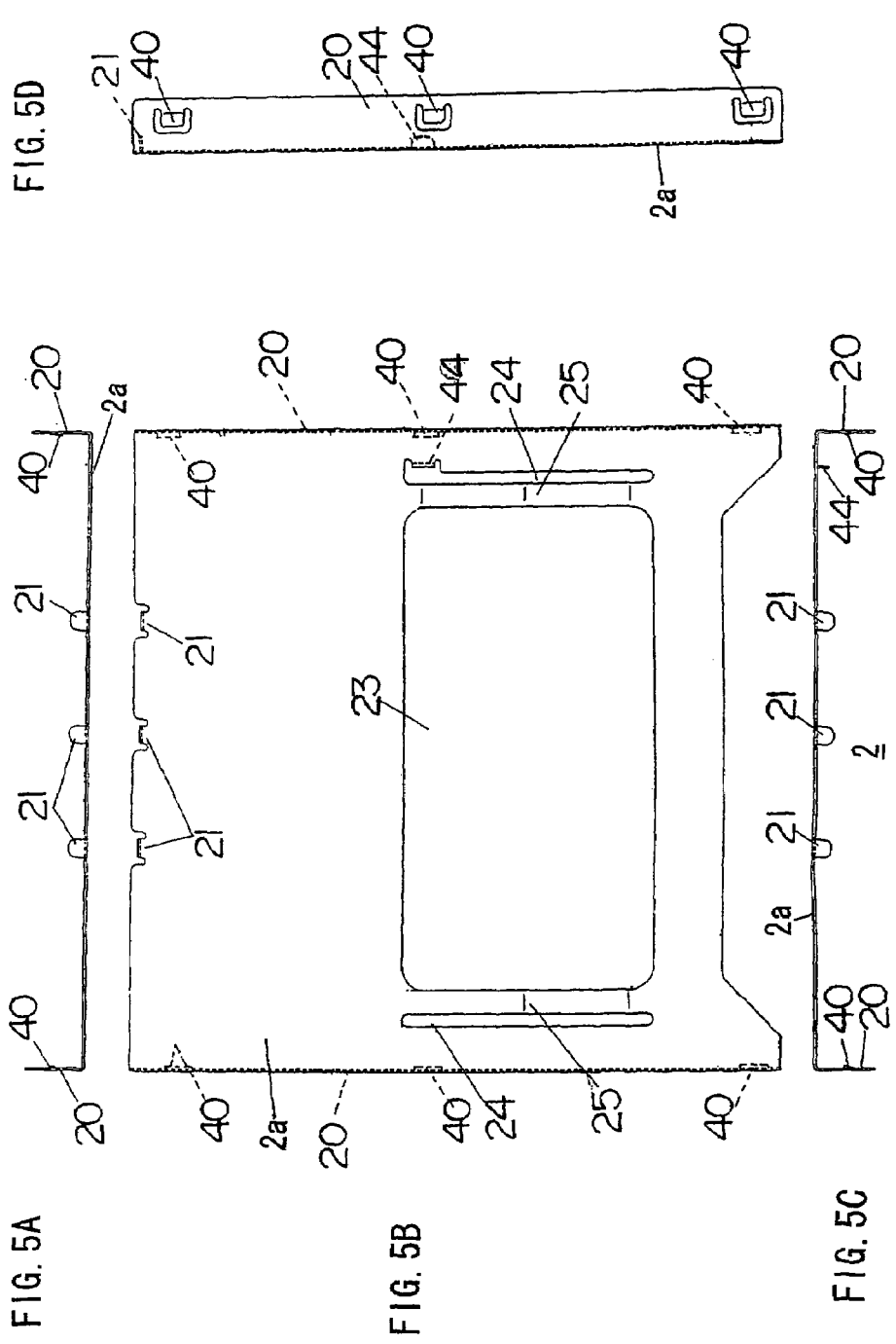

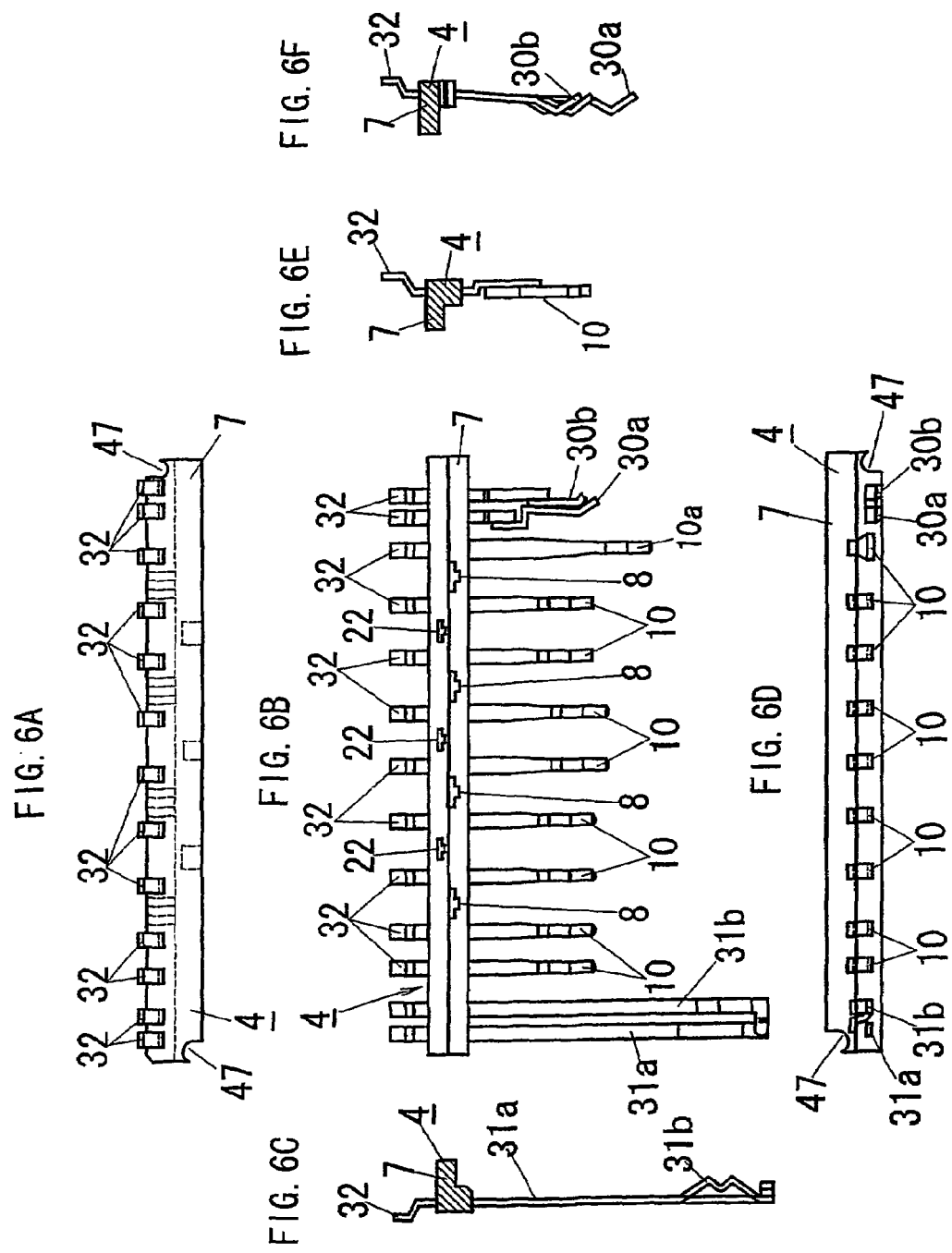

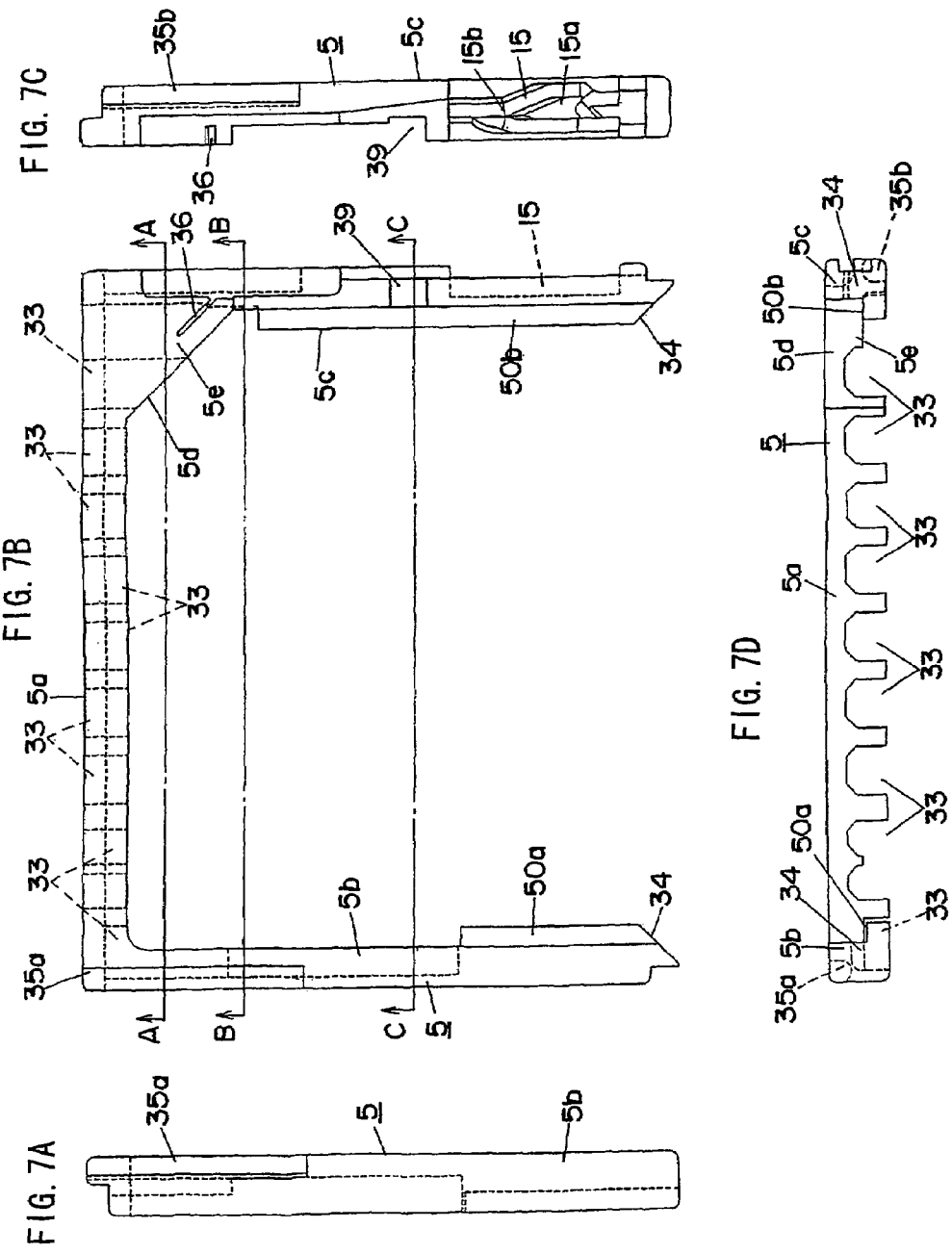

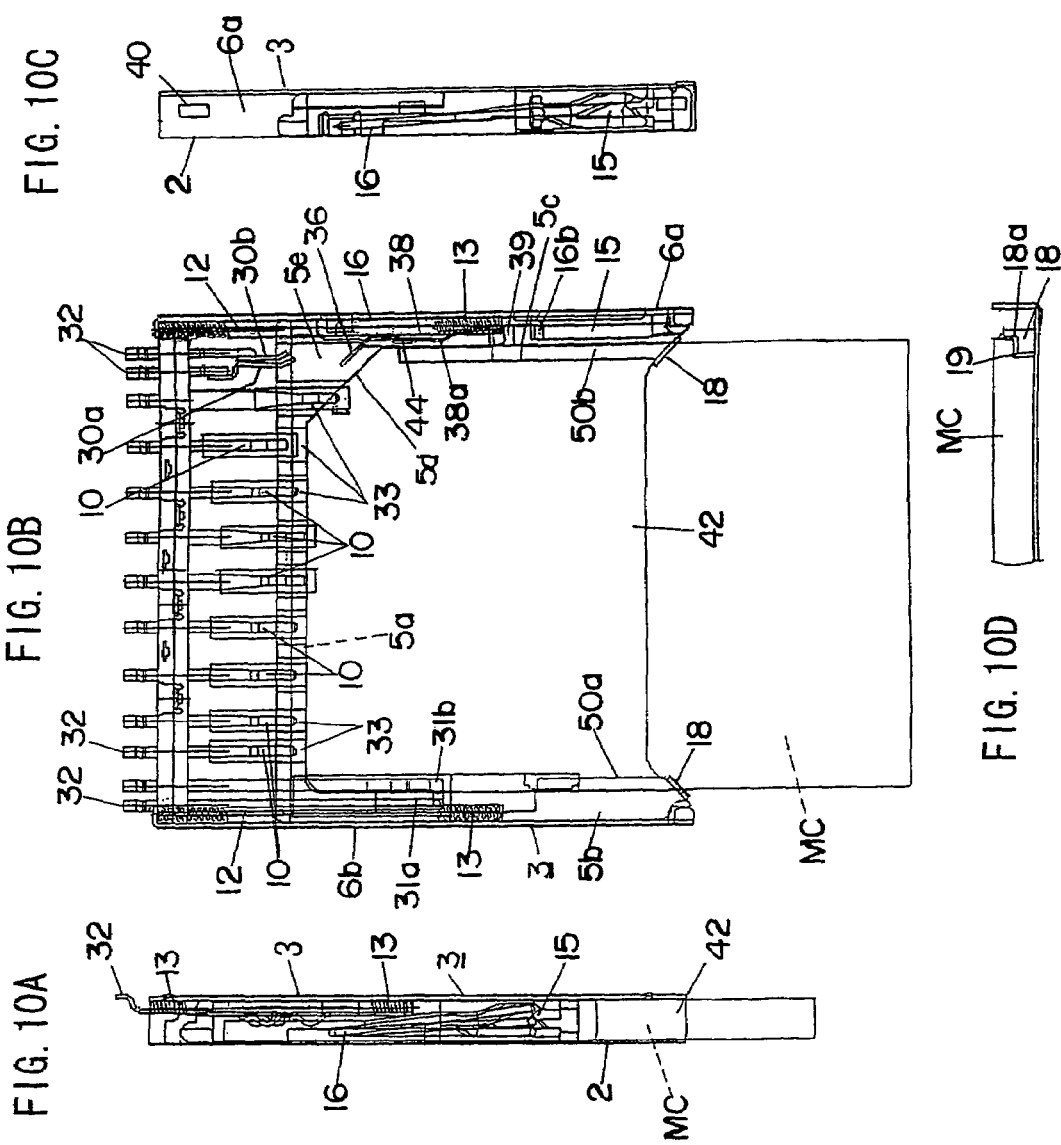

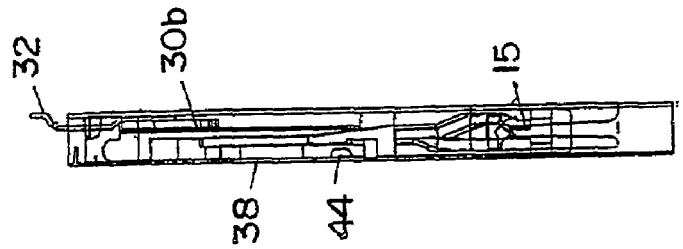
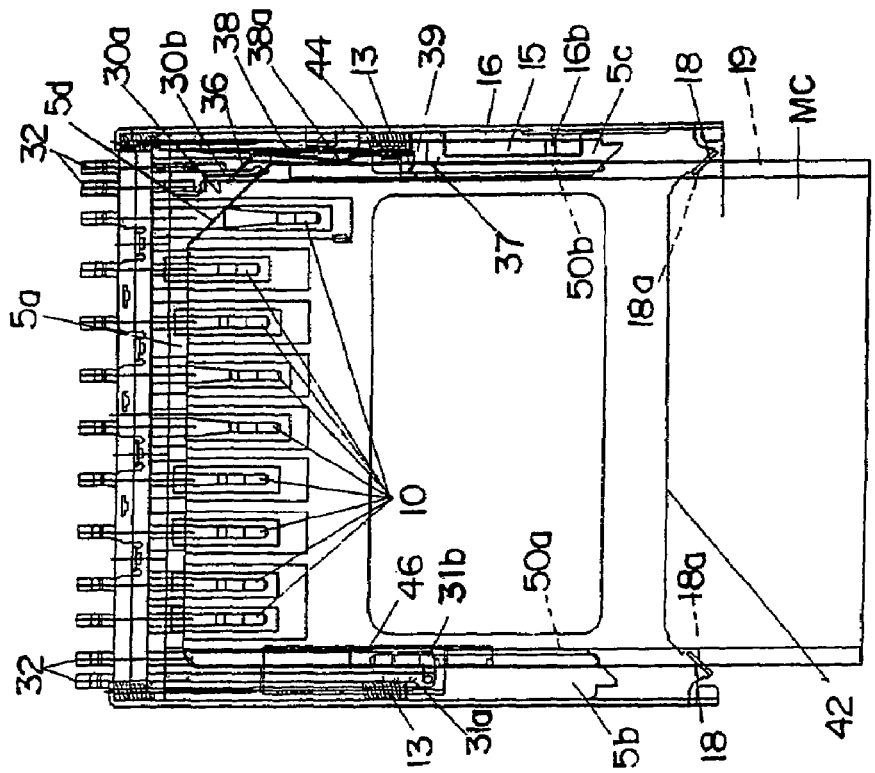
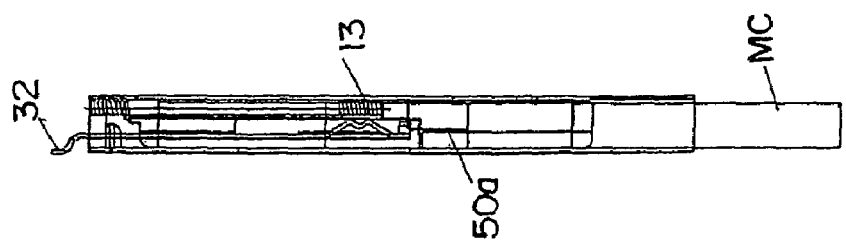

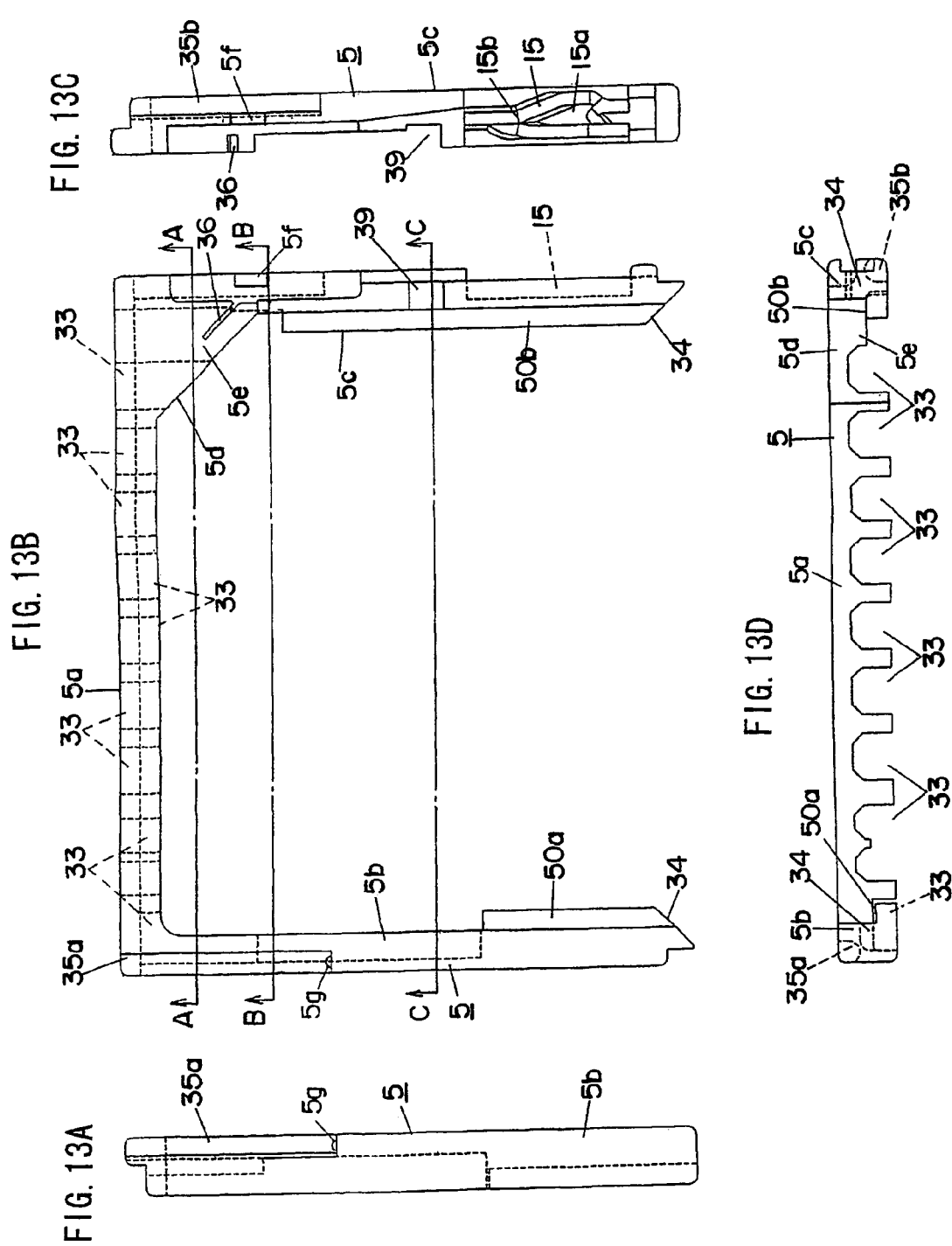

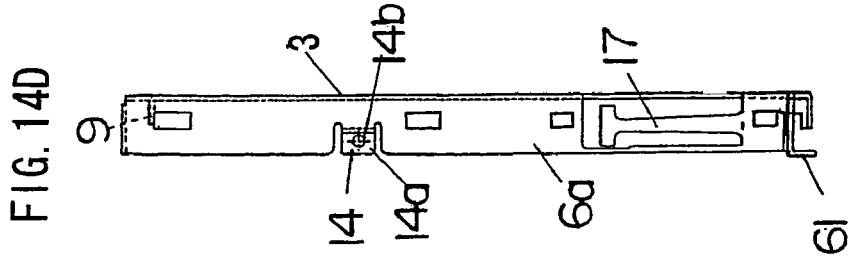
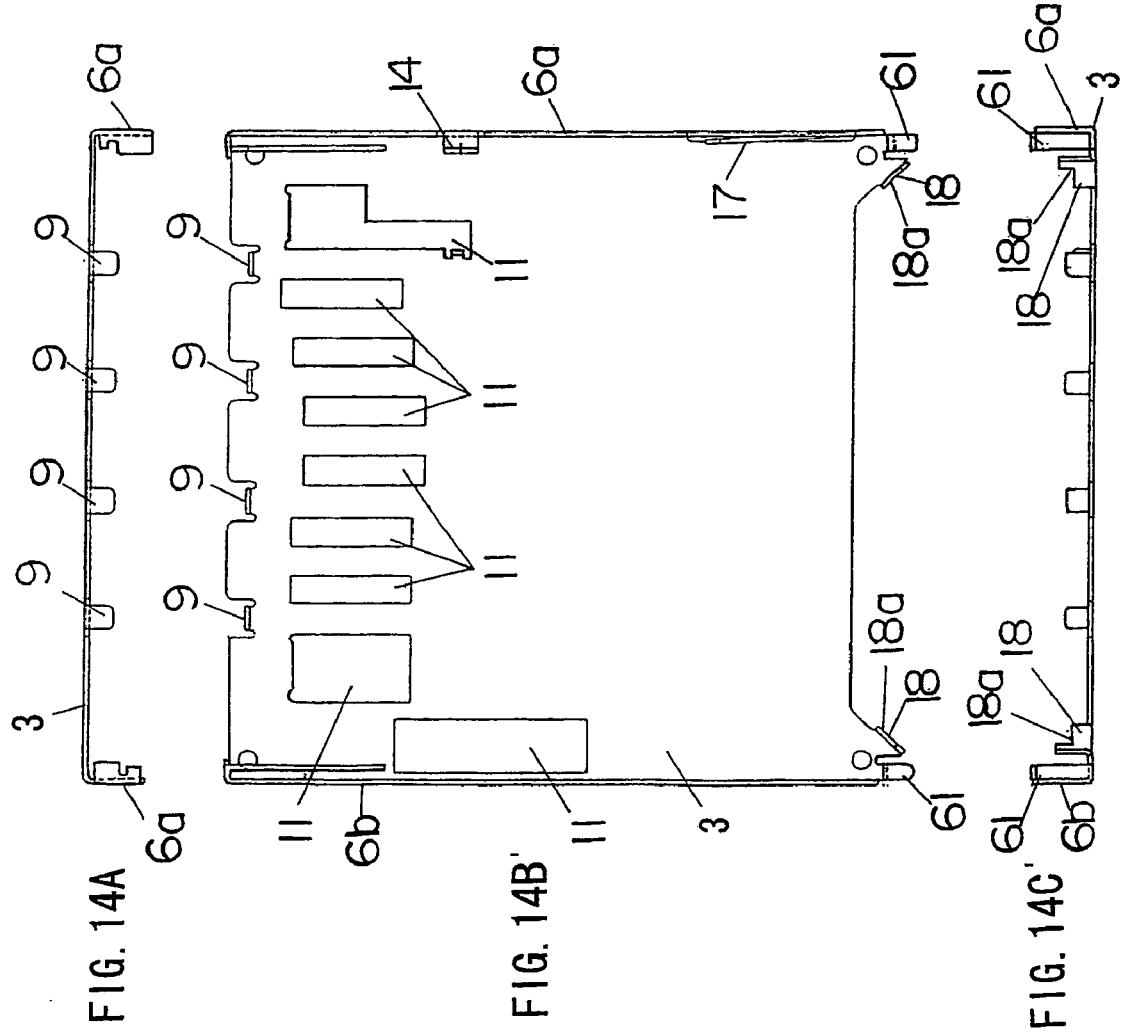
FIG. 14A  FIG. 14B  FIG. 14C  FIG. 14D

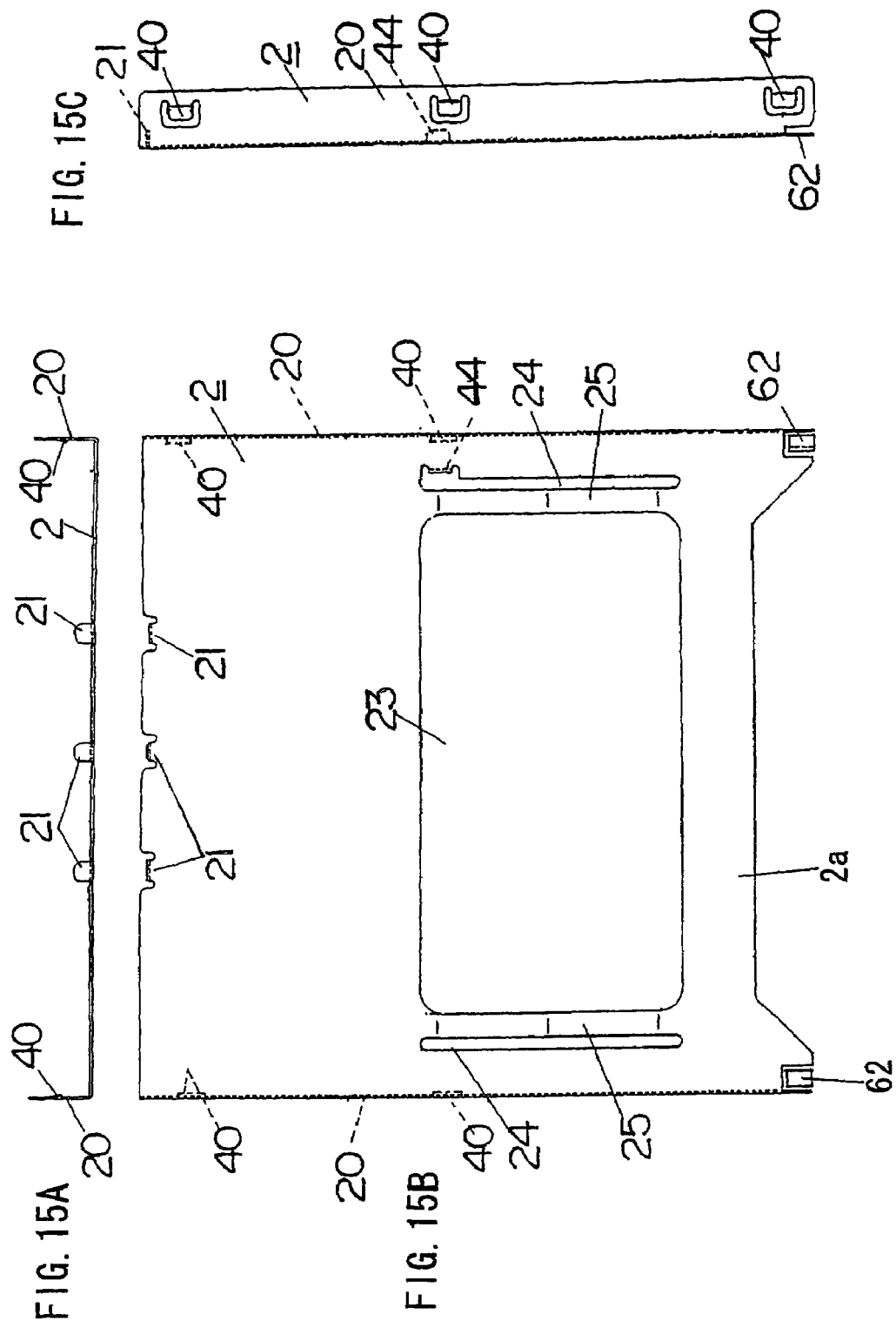

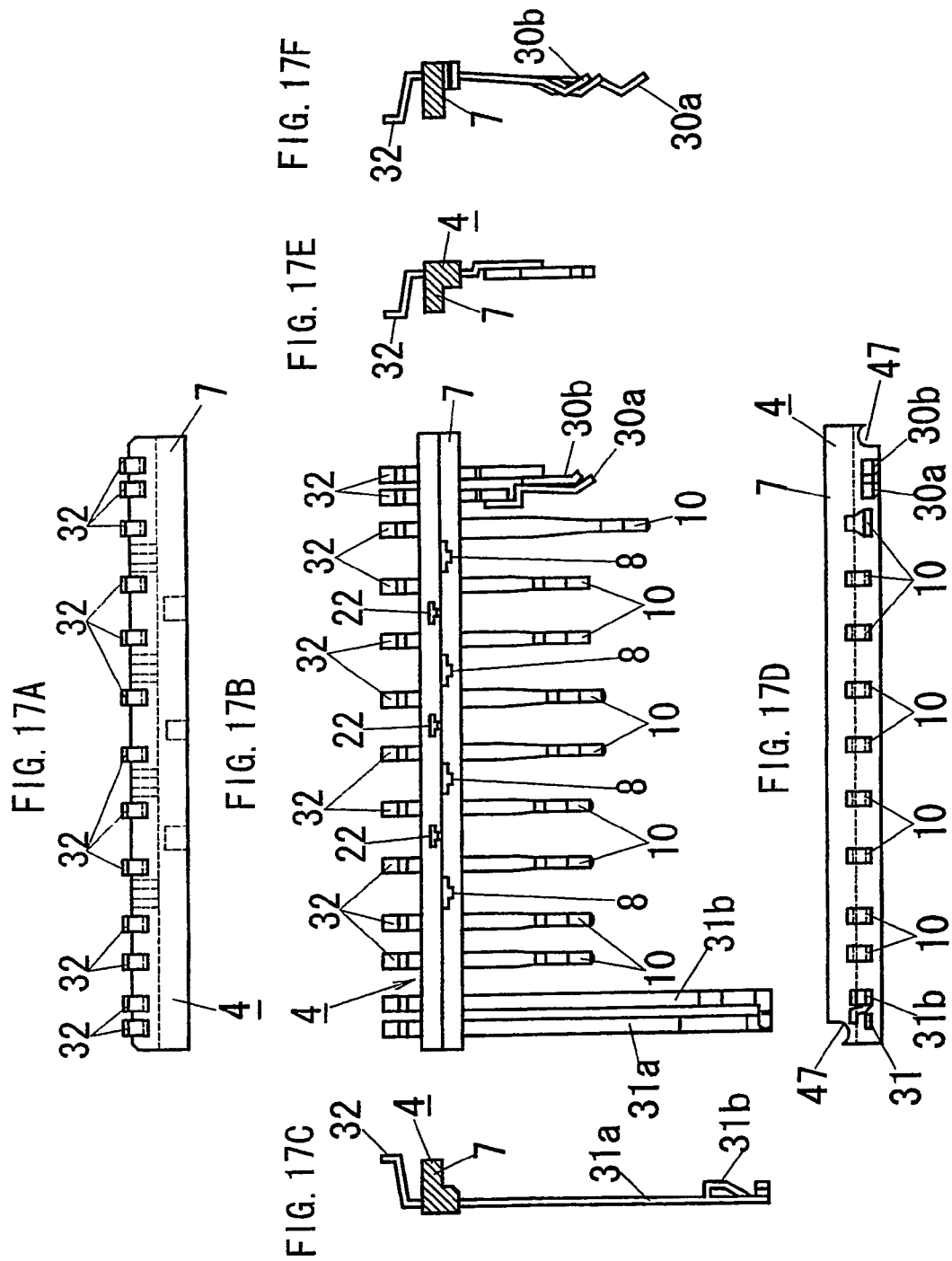

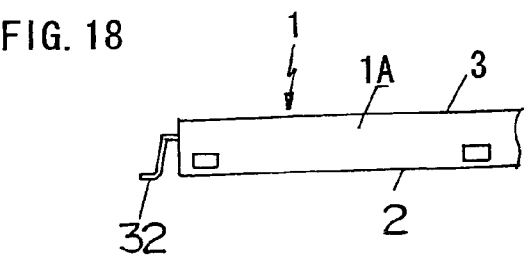
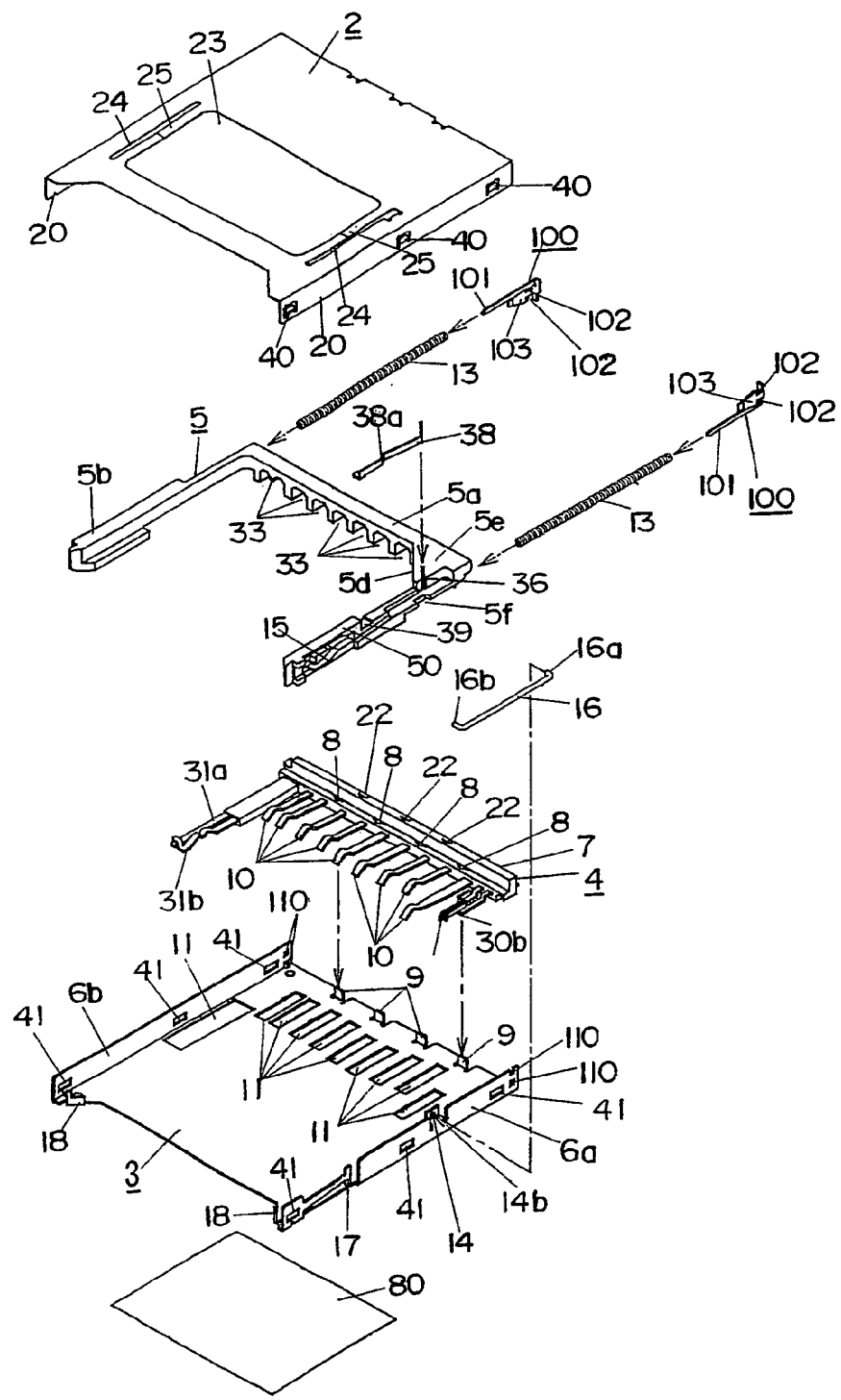

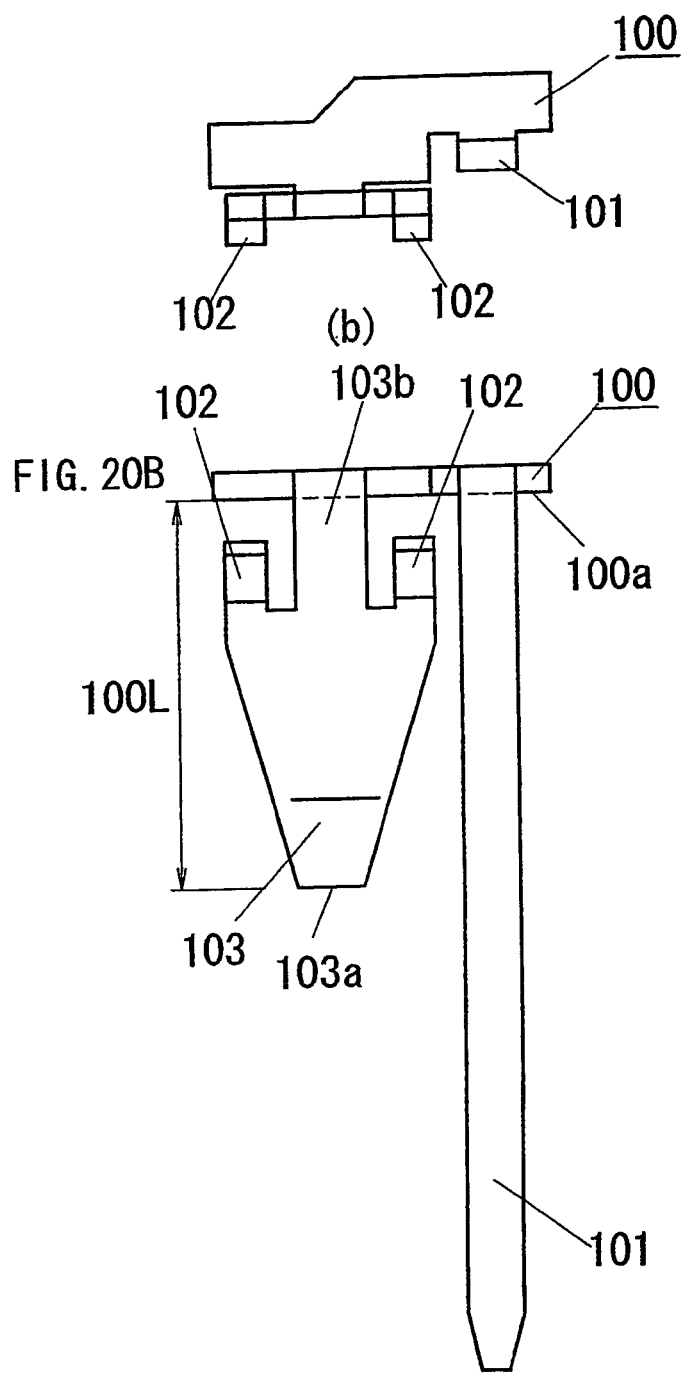

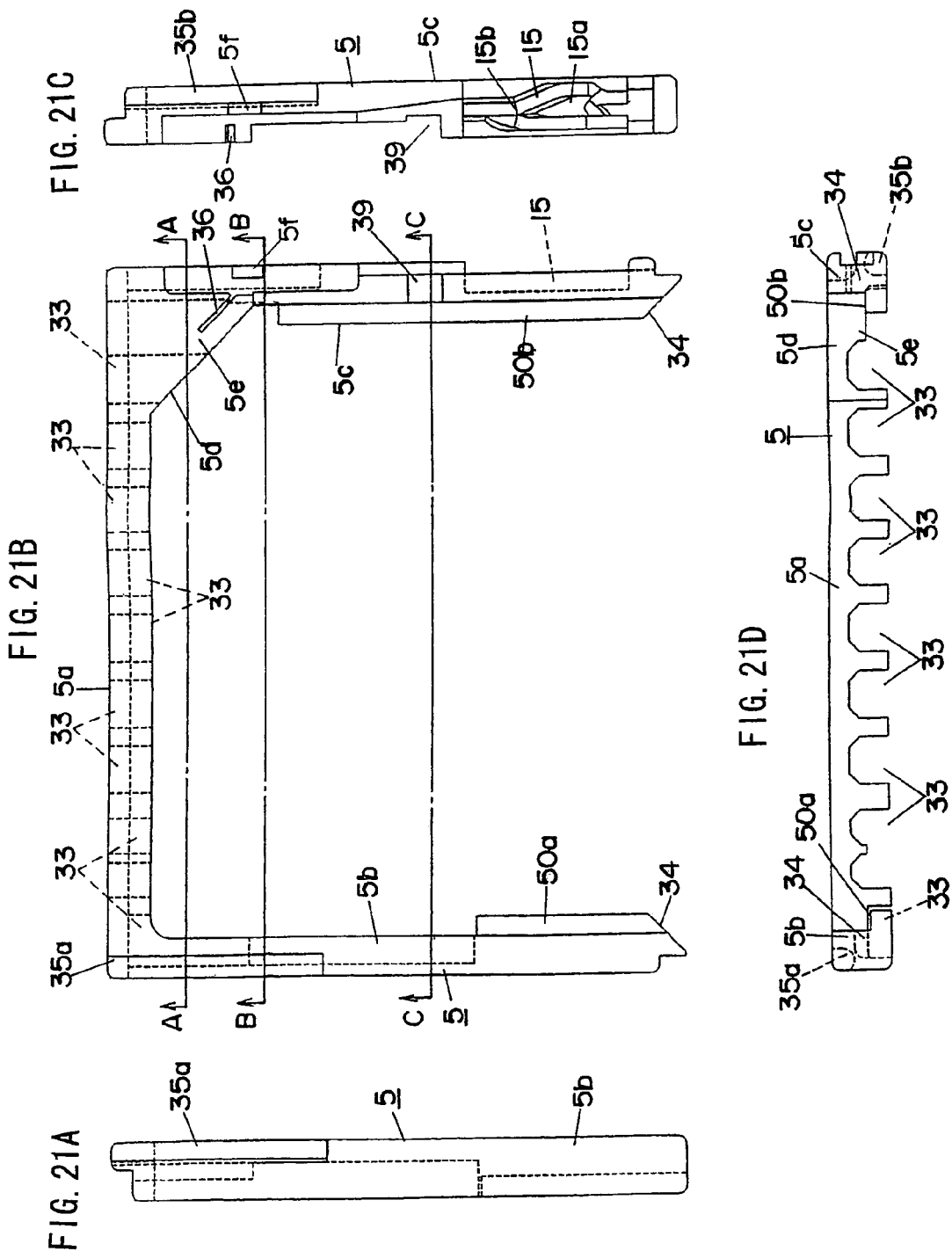

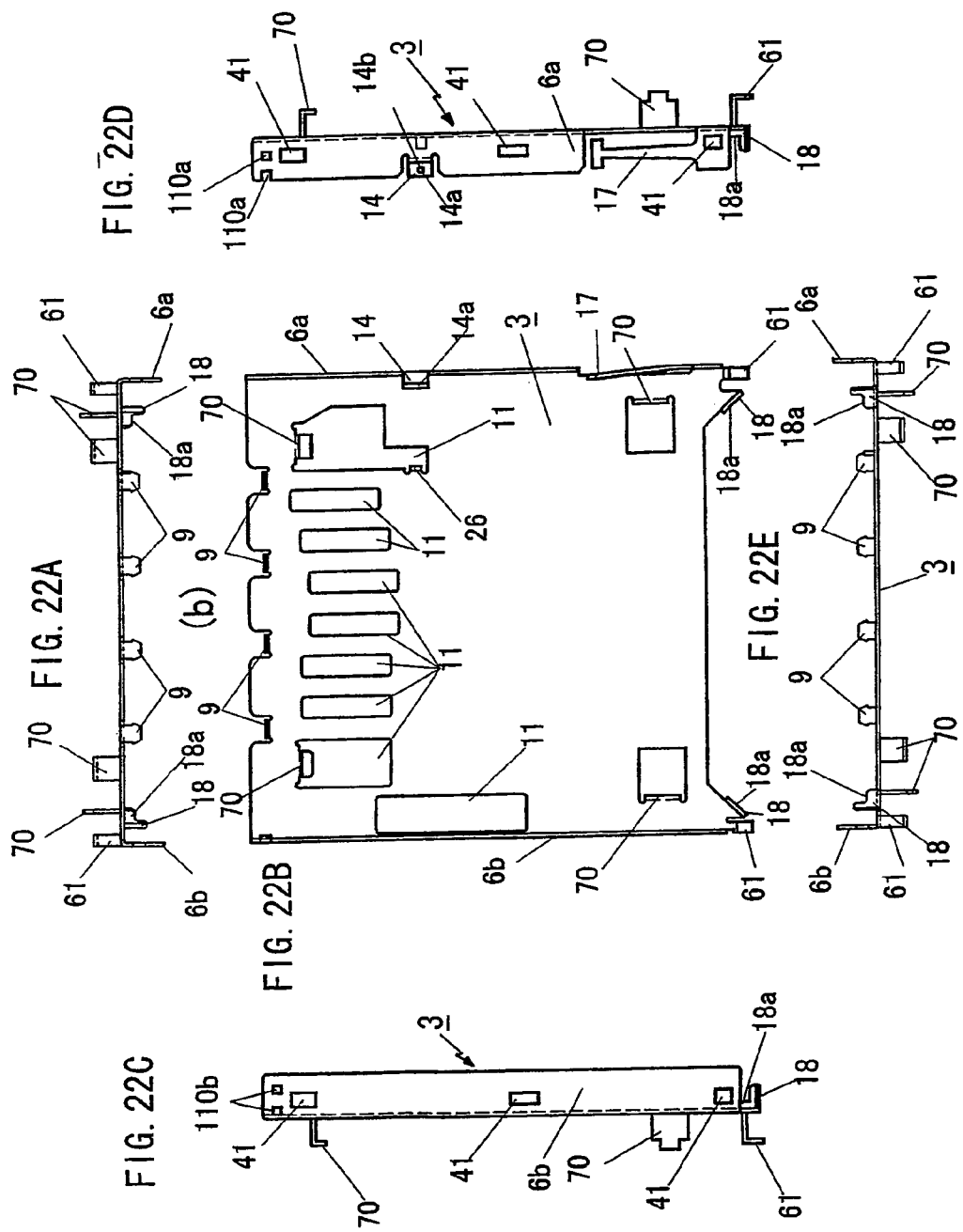

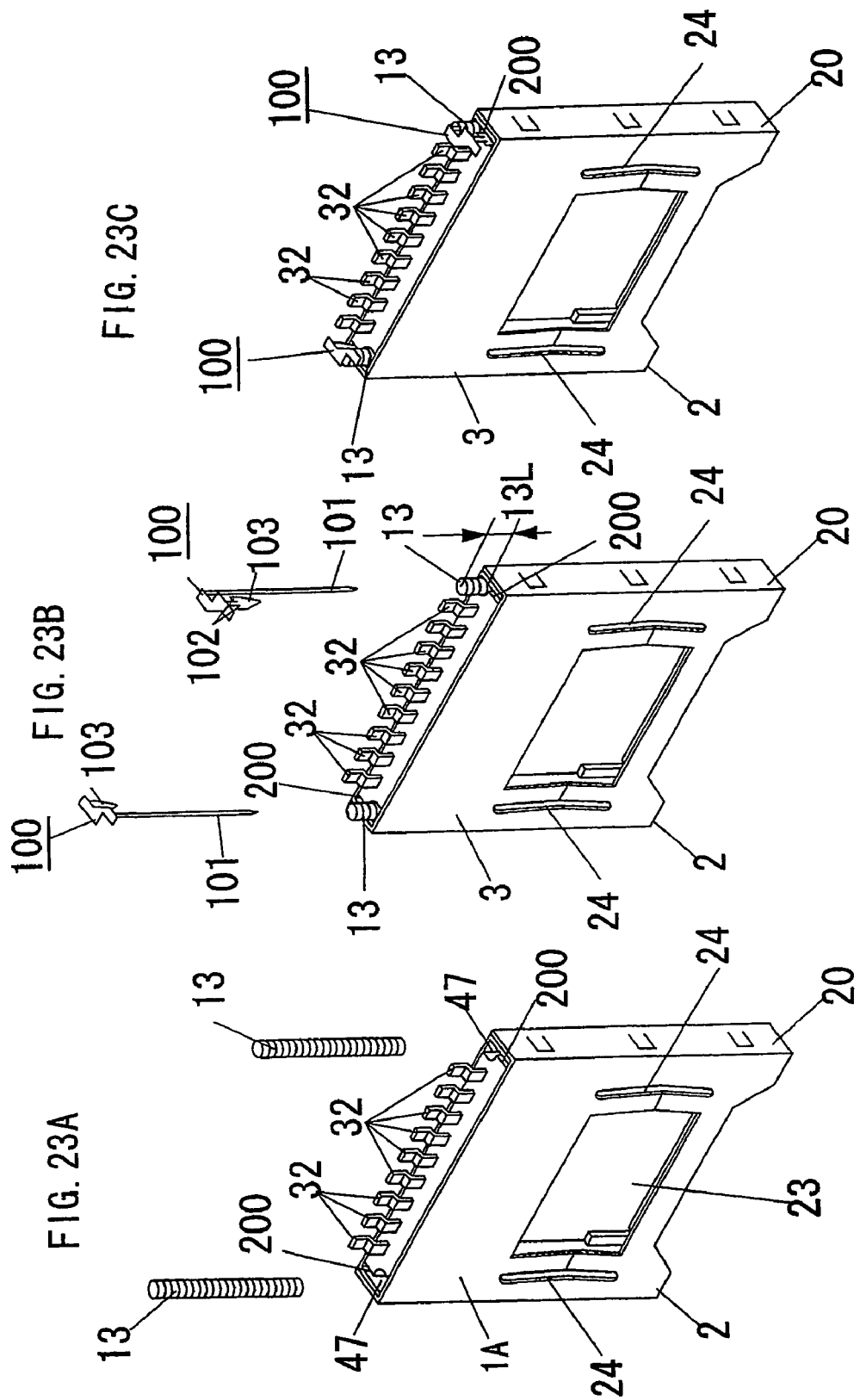

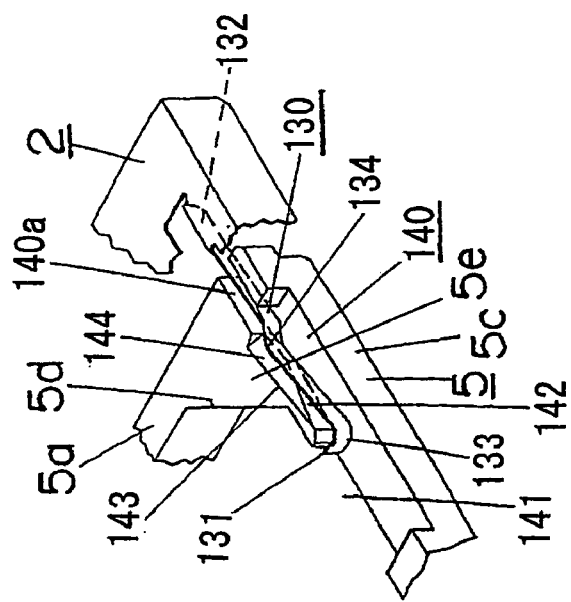
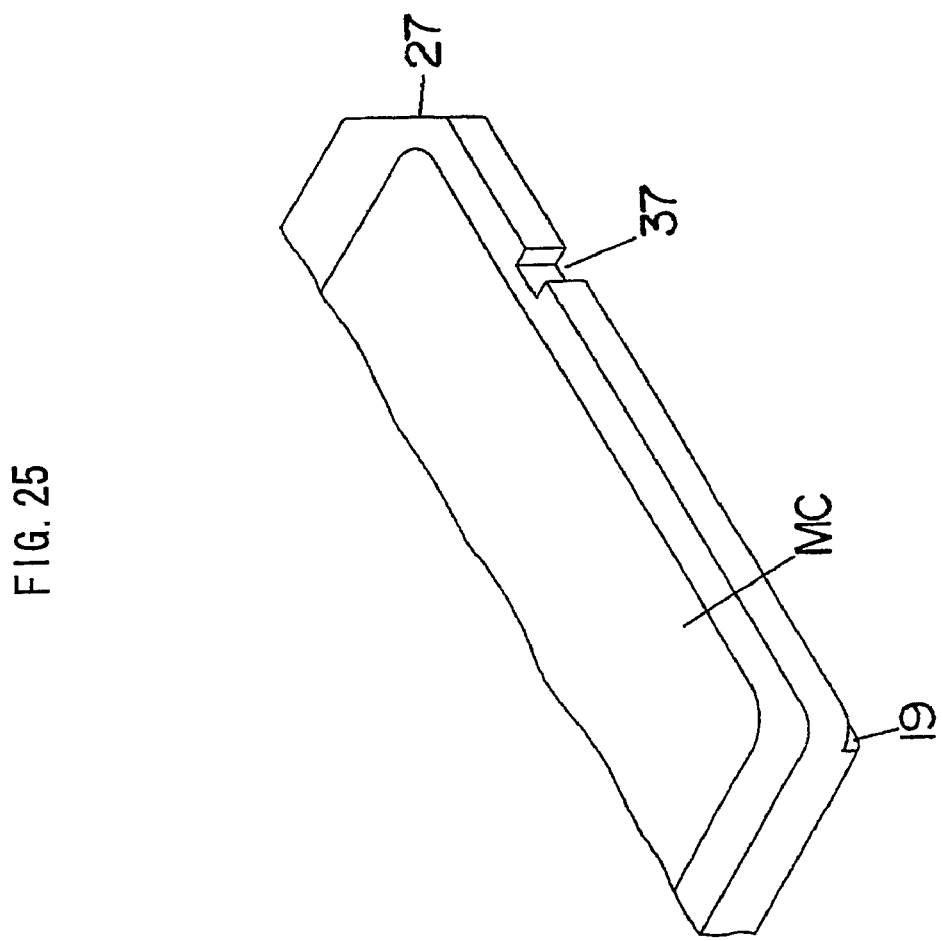
FIG. 25

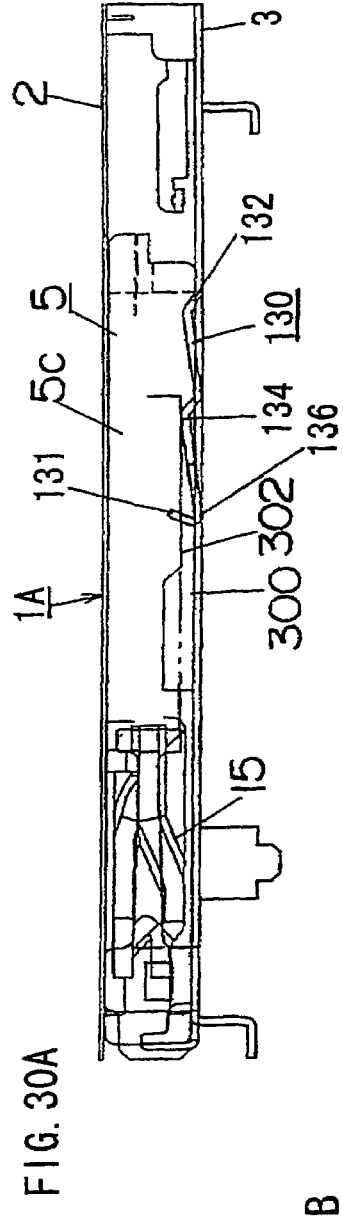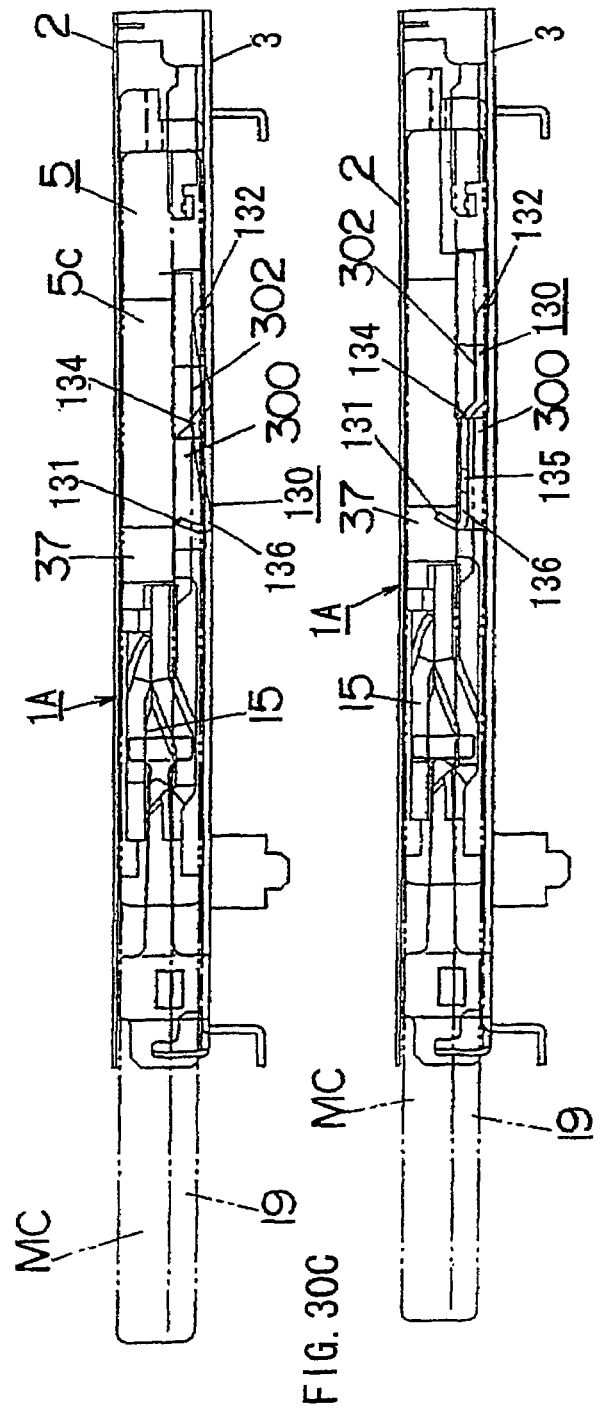
FIG. 30A
FIG. 30B
FIG. 30C

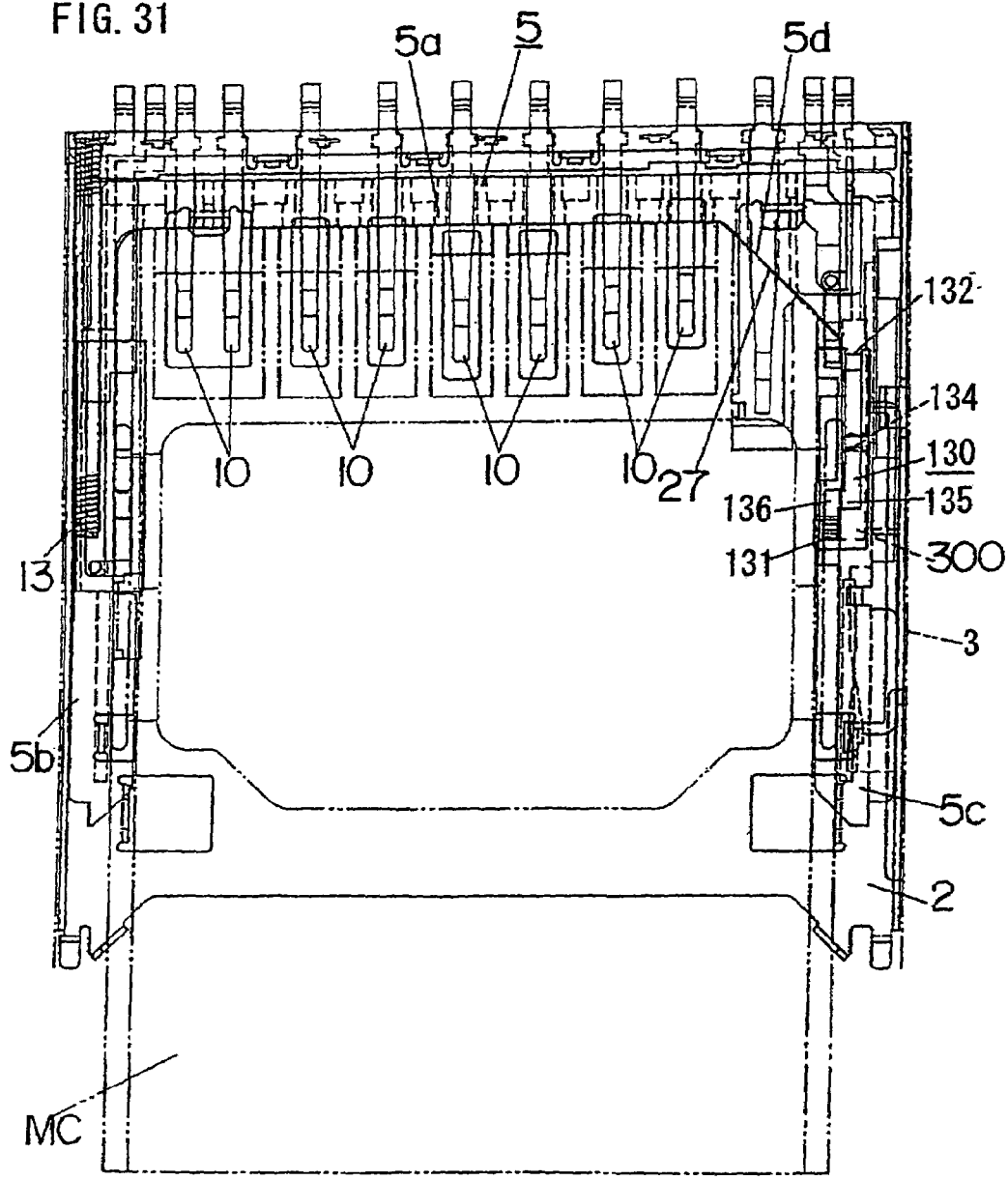

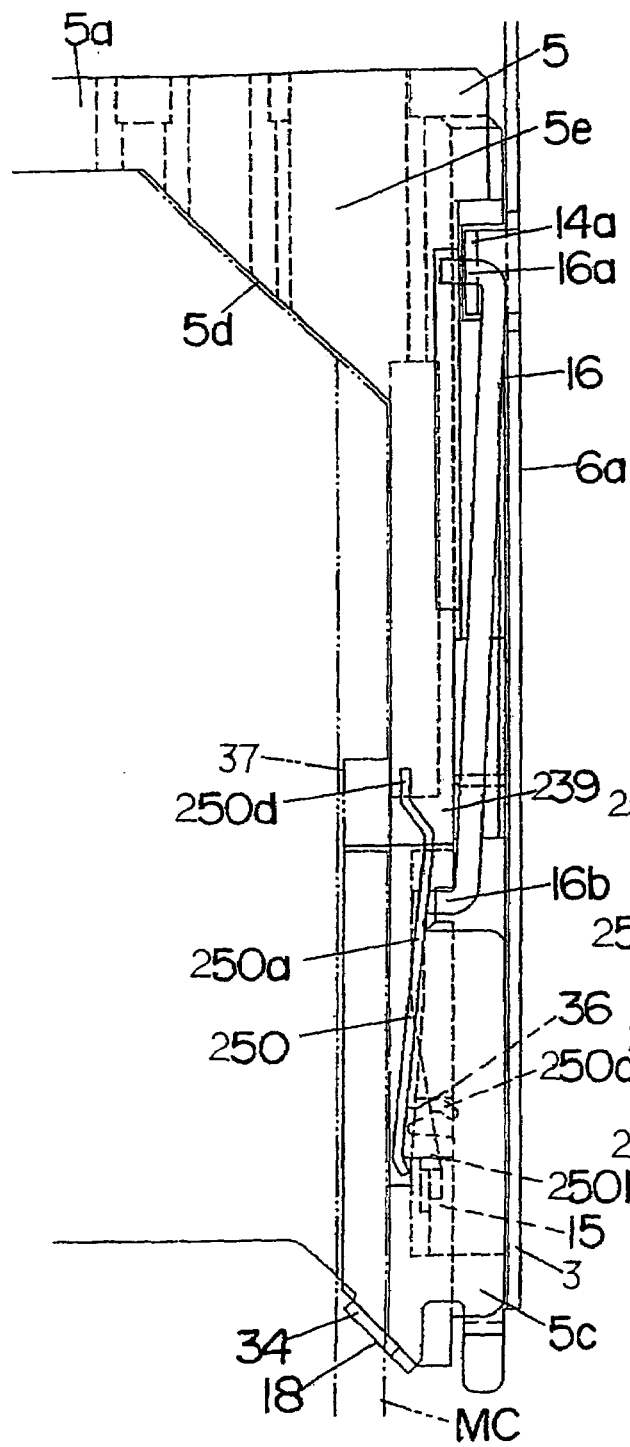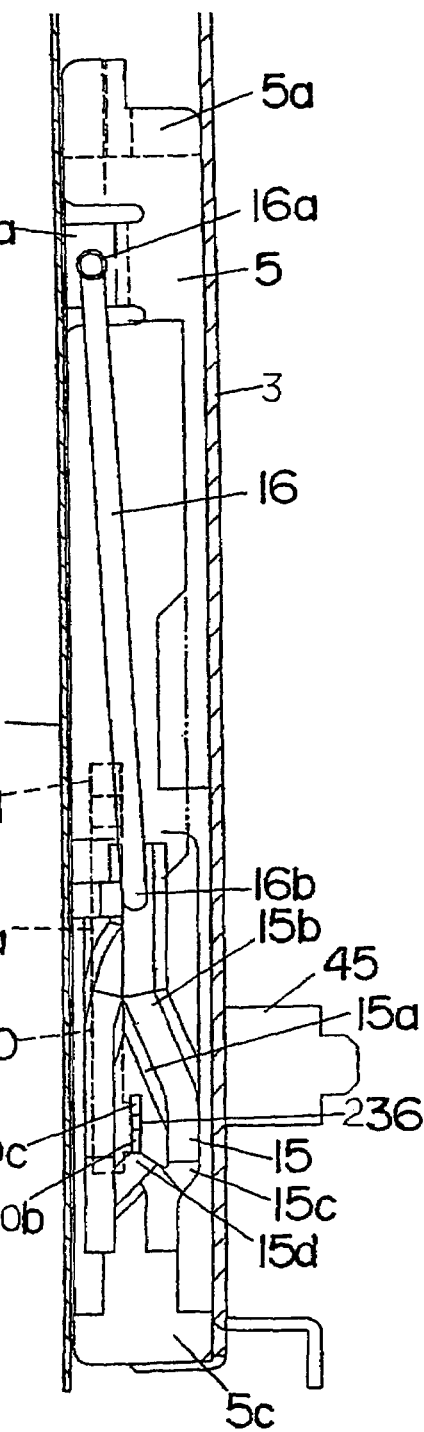

FIG. 41A (REAR)
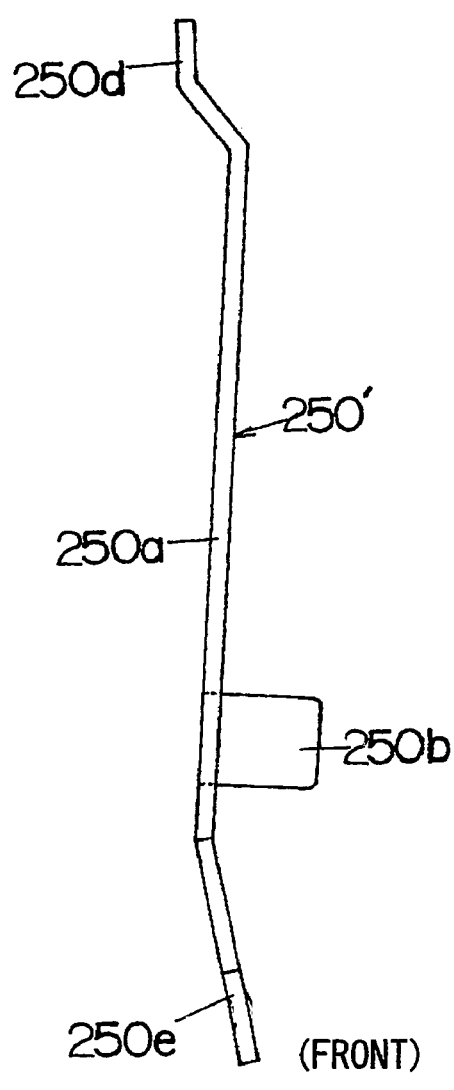
FIG. 41B
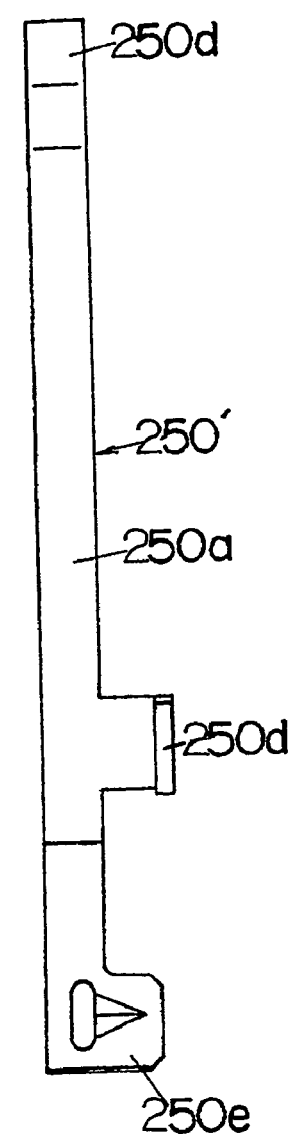
FIG. 41C
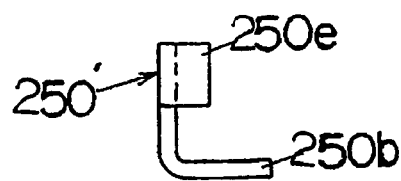

CONNECTOR FOR MEMORY CARD

FIELD OF THE INVENTION

The present invention relates to a connector used for connecting a memory card such as an SD (Secure Digital) card detachably to an apparatus processing the data memorized in the memory card.

BACKGROUND OF THE INVENTION

FIG. 43 shows a configuration of a conventional connector for connecting the memory card such as the SD card. The conventional connector comprises a cover shell 1000 made of a thin metal plate, a base member 1001 made of a resin molding, a slider 1002 made of a resin molding, a coil spring 1003 for pushing the slider 1002 forward, a plurality of contacts 1004, switching pieces 1005a and 1005b for sensing whether writing protection is switched on or off, a rod 1006 having a hook at an end thereof which is engaged with a heart cam groove 1007 formed on a side face of the slider 1002, and engaging members 1008 which are engaged with front ends on both sides of the base member 1001 for fixing the cover shell 1000 on the base member 1001.

In the conventional connector, the contacts 1004 are held on a rear wall of the base member 1001 by press-fitting thereto. The switching pieces 1005a and 1005b are held on a side wall of the base member 1001 by press-fitting thereto. The slider 1002, which is disposed freely movable along an inner surface of another side wall of the base member 1001, is moved backward against the pressing force of the coil spring 1003 corresponding to the insertion of the memory card. When the pressing force for pressing the memory card is released at a predetermined position where the contacts 1004 contact contacts of the memory card, the movement of the slider 1002 is locked by balancing the pressing force of the coil spring 1003 and the engagement of the hook of the rod 1006 with the heart cam groove 1007.

For detaching the memory card from the connector, the memory card is further pushed forward in the insertion direction thereof so that the engagement of the hook of the rod 1006 with the heart cam groove 1007 is released. After that, when the pressing force to the memory card is released, the slider 1002 with the memory card is pushed forward by the pressing force of the coil spring 1003 for pushing out the memory card from the connector.

Since the connector is required to be made thin and small so as to reduce a mounting space on a circuit substrate of an apparatus for processing the data memorized in the memory card, the shape of the base member 1001 becomes complex. Furthermore, the thickness of the bottom plate of the base member 1001, which is made of the resin molding, becomes thinner so that it will cause the deformation of the base member 1001 due to the warp of the bottom plate after molding the base member 1001. Still furthermore, the top shell 1000 is made of a thin metal plate, so that a housing of the connector made of a combination of the top shell 1000 and the base member 1001 has not necessarily sufficient mechanical strength. Thus, it will be troublesome to insert/withdraw the memory card.

Since the contacts 1004 are respectively press-fitted into the rear wall of the base member 1001, it is difficult to align the contacting portions of the contacts 1004 parallel and even with each other. Thus, it will be the cause of not only the occurrence of the miss-contacting between the I/O contacts of the memory card and the contacts 1004 but also the occurrence of the soldering error when the connector is mounted on the circuit substrate.

DISCLOSURE OF THE INVENTION

An object of the present invention is to provide a connector for memory card which has a low-profile and a high mechanical strength so that there is no trouble for inserting and drawing the memory card.

A connector for memory card in accordance with an aspect of the present invention comprises a box-shaped housing, a contact block and a slider. The housing is configured by a base shell made of a metal plate and a cover shell made of a metal plate which is engaged with the base shell, and the housing has an opening on a front face through which a memory card is inserted. The contact block is provided at a position in the vicinity of a rear end of the housing, and holds a plurality of contacts corresponding to I/O contacts of the memory card on a resin molded base member thereof. The contacts are aligned in parallel with each other in widthwise direction of the housing and extruding toward the opening. The slider is movably disposed between the opening and the contact block in the housing corresponding to the insertion and draw of the memory card.

Since the housing is made of metal plate, it has a sufficient mechanical strength even when the housing is formed low-profile. Furthermore, deformation and abrasion of the housing rarely occur when the memory card is repeatedly inserted and drawn. Still furthermore, the housing is easily grounded, so that the connector for memory card becomes tough with respect to the static electricity and the external noise.

BRIEF DESCRIPTION OF THE DRAWINGS

FIG. 5A is a drawing showing a rear view of a cover shell in the first embodiment;

FIG. 5B is a drawing showing a plan view of the cover shell;

FIG. 5C is a drawing showing a front view of the cover shell;

FIG. 5D is a drawing showing a side view of the cover shell;

FIG. 6A is a drawing showing a rear view of a contact block in the first embodiment;

FIG. 6B is a drawing showing a plan view of the contact block;

FIG. 6C is a drawing showing a side view of the contact block with respect to switching pieces;

FIG. 6D is a drawing showing a front view of the contact block;

FIG. 6E is a drawing showing a side view of the contact block with respect to contacts;

FIG. 6F is a drawing showing a side view of the contact block with respect to other switching pieces;

FIG. 7A is a drawing showing a left side view of a slider in the first embodiment;

FIG. 7B is a drawing showing a plan view of the slider;

FIG. 7C is a drawing showing a right side view of the slider;

FIG. 7D is a drawing showing a front view of the slider;

FIG. 10A is a drawing showing a cross-sectional left side view of an assembled connector in the first embodiment;

FIG. 10B is a drawing showing a cross-sectional plan view of the connector;

FIG. 10C is a drawing showing a cross-sectional right side view of the connector;

FIG. 10D is a drawing showing a partial front view of the connector;

FIG. 11A is a drawing showing a cross-sectional left side view of the connector when a memory card is inserted therein;

FIG. 11B is a drawing showing a cross-sectional plan view of the connector;

FIG. 11C is a drawing showing a cross-sectional right side view of the connector;

FIG. 13A is a drawing showing a left side view of a modified slider in the first embodiment;

FIG. 13B is a drawing showing a plan view of the modified slider;

FIG. 13C is a drawing showing a right side view of the modified slider;

FIG. 13D is a drawing showing a front view of the modified slider;

FIG. 14A is a drawing showing a rear view of a base shell in a second embodiment of the present invention;

FIG. 14B is a drawing showing a plan view of the base shell;

FIG. 14C is a drawing showing a front view of the base shell:

FIG. 14D is a drawing showing a side view of the base shell;

FIG. 15A is a drawing showing a rear view of a cover shell in the second embodiment:

FIG. 15B is a drawing showing a plan view of the cover shell;

FIG. 15C is a drawing showing a side view of the cover shell;

FIG. 17A is a drawing showing a rear view of a contact block in the second embodiment;

FIG. 17B is a drawing showing a plan view of the contact block;

FIG. 17C is a drawing showing a side view of the contact block with respect to switching pieces;

FIG. 17D is a drawing showing a front view of the contact block;

FIG. 17E is a drawing showing a side view of the contact block with respect to contacts;

FIG. 17F is a drawing showing a side view of the contact block with respect to other switching pieces;

FIG. 18 is a drawing showing a part of a side view of an SMD reverse type connector in the second embodiment;

FIG. 19 is a drawing showing a configuration of a connector in a third embodiment of the present invention;

FIG. 20A is a drawing showing a rear view of a spring guide member in the third embodiment;

FIG. 20B is a drawing showing a plan view of the spring guide member;

FIG. 20C is a drawing showing a side view of the spring guide member;

FIG. 21A is a drawing showing a left side view of a slider in the third embodiment;

FIG. 21B is a drawing showing a plan view of the slider;

FIG. 21C is a drawing showing a right side view of the slider;

FIG. 21D is a drawing showing a front view of the slider;

FIG. 22A is a drawing showing a rear view of a base shell in the third embodiment;

FIG. 22B is a drawing showing a plan view of the base shell;

FIG. 22C is a drawing showing a left side view of the base shell;

FIG. 22D is a drawing showing a right side view of the base shell;

FIG. 22E is a drawing showing a front view of the base shell;

FIGS. 23A to 23C are drawings respectively showing assembling steps of coil springs into a housing of a connector in the third embodiment;

FIG. 25 is a drawing showing a perspective view of a memory card and an arm of a slider in the fourth embodiment;

FIGS. 30A to 30C are drawings respectively showing side views of the motion of the locking mechanism;

FIG. 31 is a drawing showing a sectional plan view of the connector in the fourth embodiment.

FIG. 36A is a drawing showing a sectional plan view of a part of a slider on a base shell in the fifth embodiment;

FIG. 36B is a drawing showing a sectional side view of the slider in a housing of a connector in the fifth embodiment;

FIG. 41A is a drawing showing a plan view of a locking member in the modification of the fifth embodiment;

FIG. 41B is a drawing showing a side view of the locking member;

FIG. 41C is a drawing showing a rear view of the locking member;

PREFERRED EMBODIMENTS OF THE INVENTION

First Embodiment

A first embodiment of the present invention is described with reference to the drawings.

Figure 1:
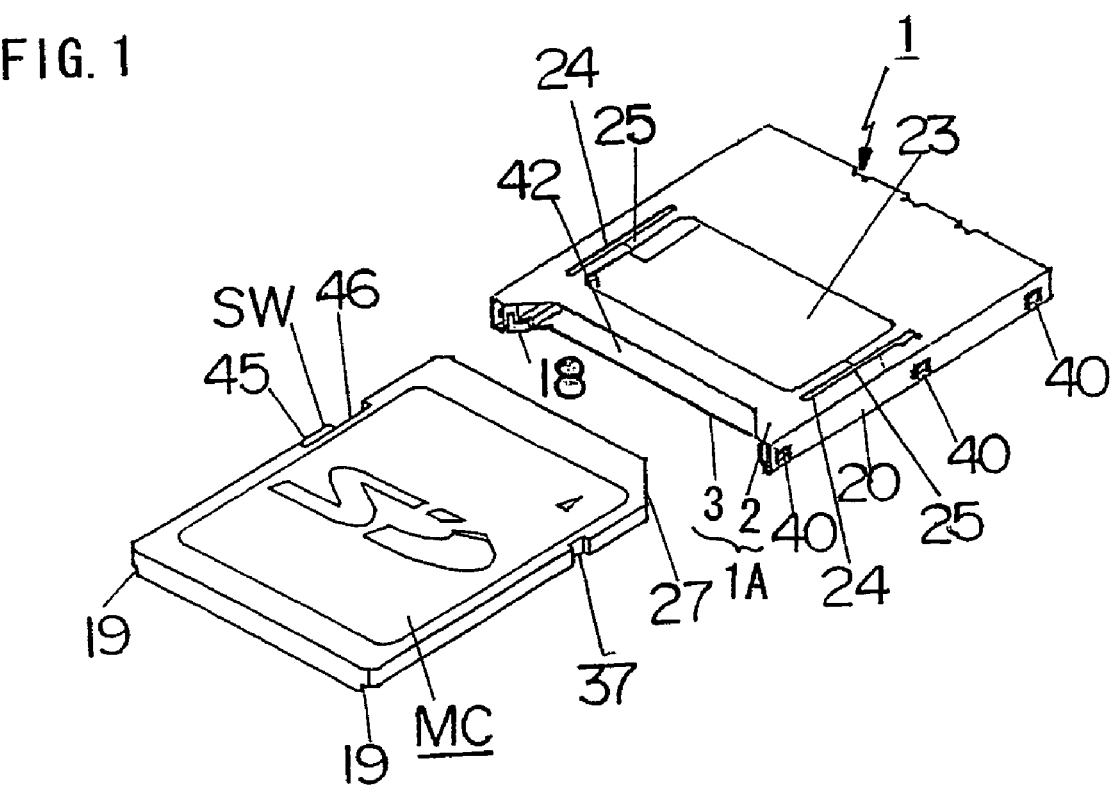
FIG. 1 is a perspective drawing showing appearances of a memory card and a connector in a first embodiment of the present invention.
Figure 2:
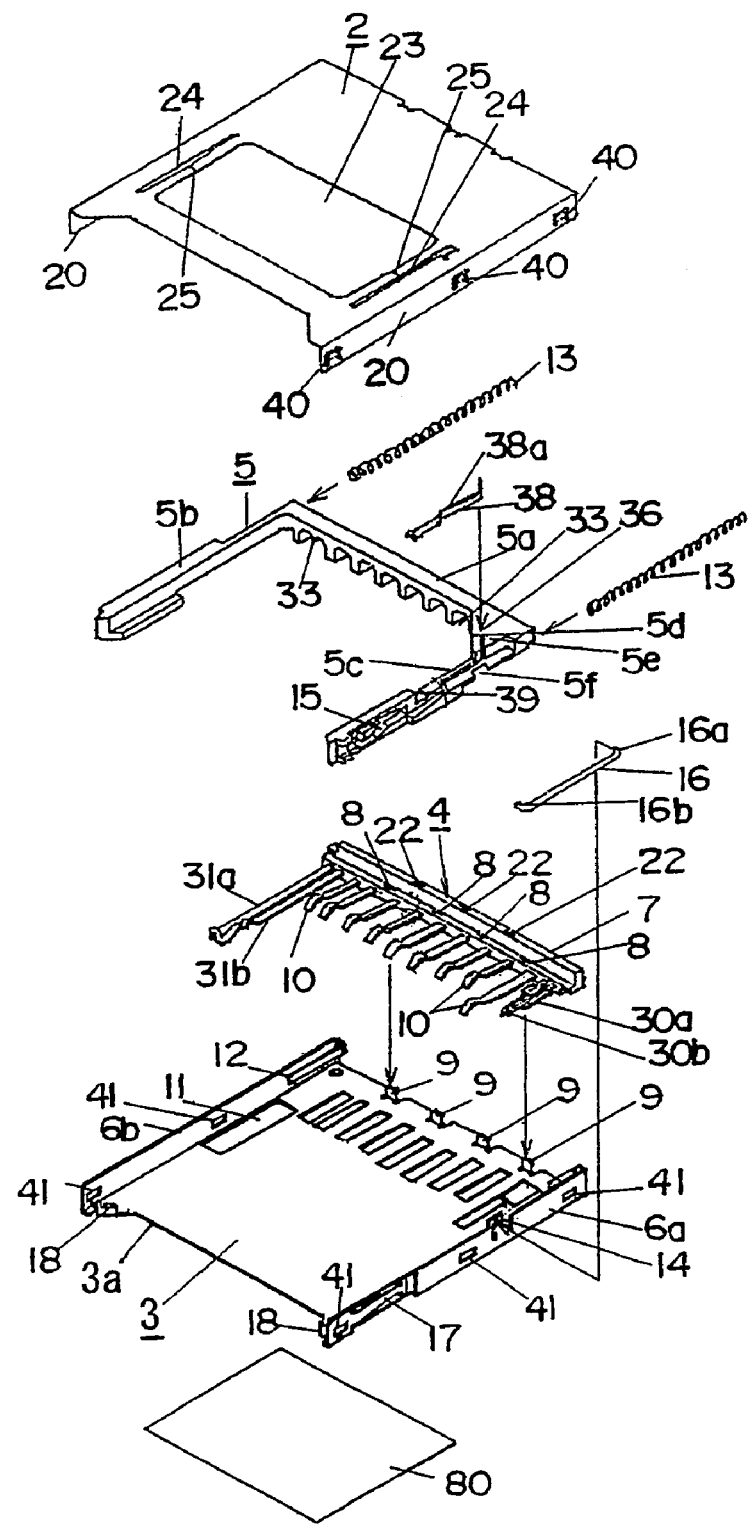
FIG. 2 is an exploded perspective drawing showing a configuration of the connector in the first embodiment.

FIG. 1 shows appearances of a memory card such as an SD card designated by a symbol "MC" and a connecter 1 in the first embodiment. FIG. 2 shows a configuration of the connector 1.

As can be seen from FIGS. 1 and 2, a planiform housing 1A of the connector 1 is configured by a cover shell 2 and a base shell 3, and the housing 1A has an opening 42 formed on a front face through which the memory card MC is inserted into the housing 1A. The cover shell 2 is formed by punching a thin stainless steel plate to a predetermined shape, and bending the punched plate (blank). Similarly, the base shell 3 is formed by punching a thin stainless steel plate to a predetermined shape, and bending the punched plate (blank). The housing 1A is assembled by engaging the cover shell 2 with the base shell 3. A contact block 4 is provided at a position in the vicinity of a rear end in the housing 1A. A slider 5 having substantially a horseshoe shape is movably provided between the opening 42 of the housing 1A and the contact block 4 in the housing 1A. The slider 5 is made by a resin molding.

Figure 3:
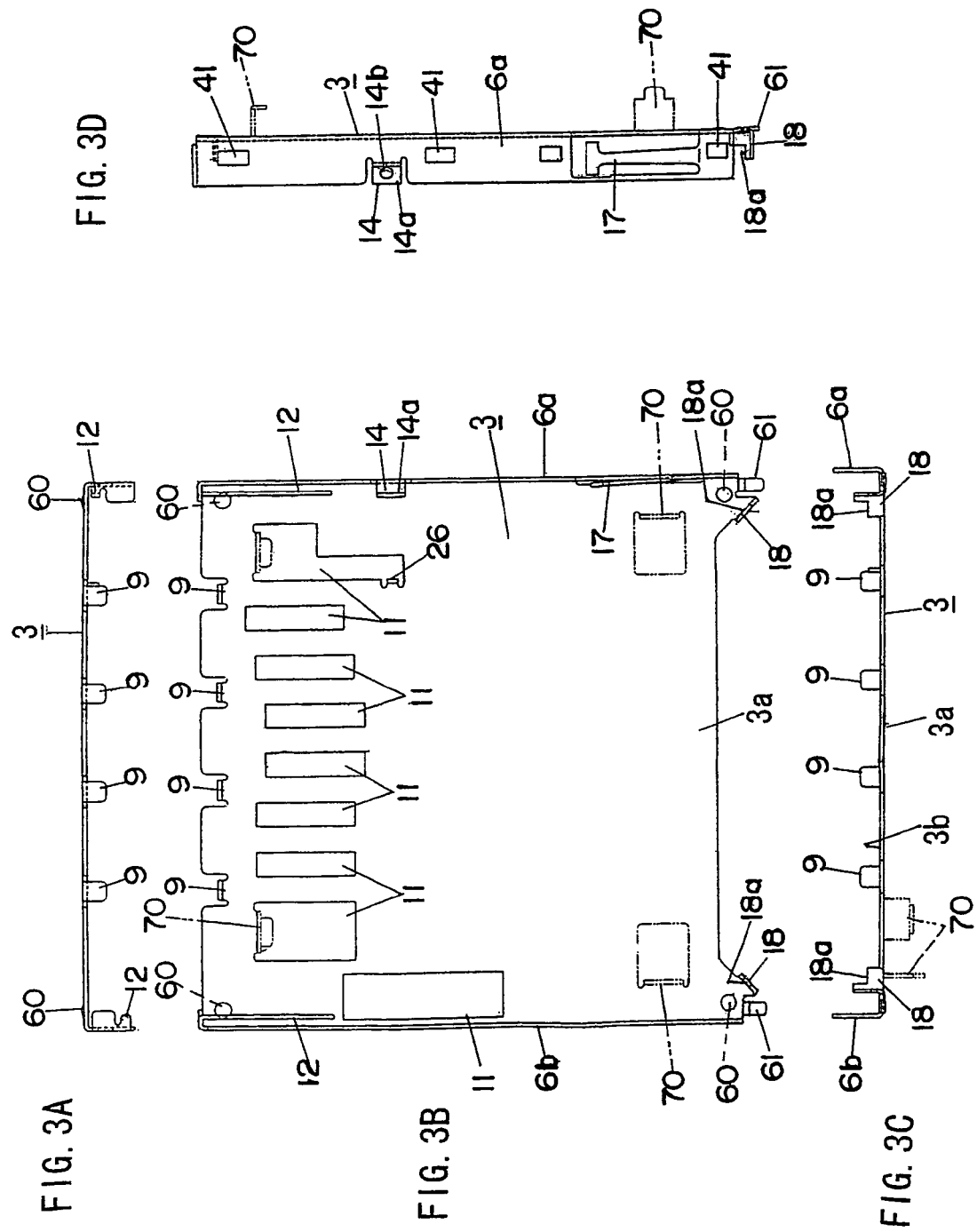
FIG. 3A is a drawing showing a rear view of a base shell in the first embodiment.
FIG. 3B is a drawing showing a plan view of the base shell.
FIG. 3C is a drawing showing a front view of the base shell.
FIG. 3D is a drawing showing a side view of the base shell.

Details of the base shell 3 are described with reference to FIGS. 3A to 3D. FIG. 3A shows a rear view of the base shell 3. FIG. 3B shows a plan view of the base shell 3. FIG. 3C shows a front view of the base shell 3. FIG. 3D shows a side view of the base shell 3.

The base shell 3 has side walls 6a and 6b which are formed by bending both sides of the punched blank upwardly. Front end and rear end of the base shell 3 are opened. Four protrusions 9 are formed at a predetermined pitch in the vicinity of the rear end of the base shell 3 by bending the blank of the base shell 3 upwardly. The protrusions 9 are to be press-fitted into press-fitting through holes 8 of resin molded base member 7 of the contact block 4 from the downside.

A plurality of holes 11 is formed on the bottom plate of the base shell 3 at positions a little forward from the rear end of the base shell 3 for preventing short-circuiting of a plurality of contacts 10 and switching pieces 30a, 30b 31a and 31b which are held on the contact block 4.

Figure 4:
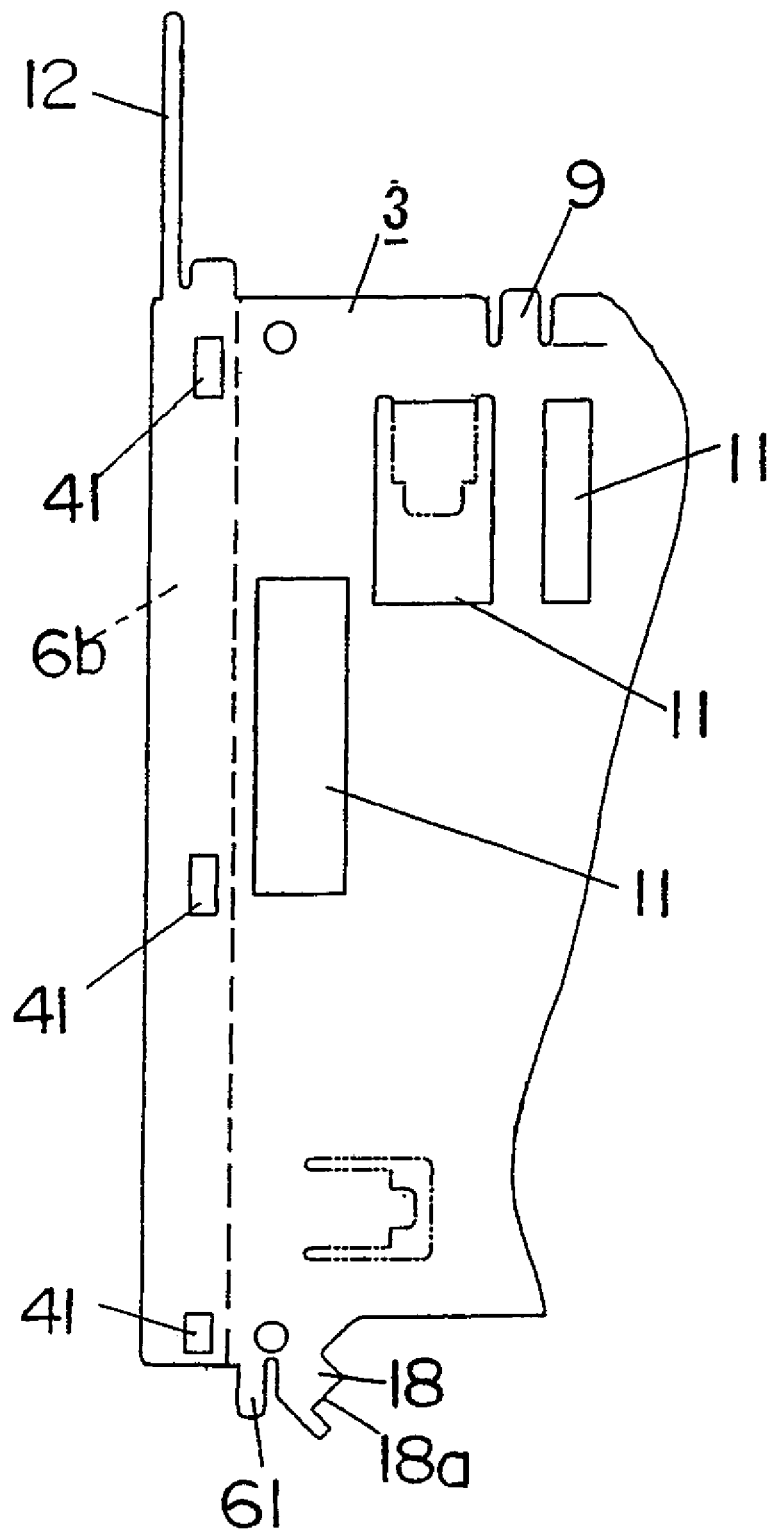
FIG. 4 is a drawing showing a part of the blank of the base shell before the bending.

A pair of spring guide rods 12 is formed parallel to and inward from the side walls 6a and 6b by bending protruded portions of the blank which are extended from the portions of the side walls 6a and 6b. FIG. 4 shows a part of the blank of the base shell 3 before the bending. Each of the spring guide rod 12 will respectively be fitted into a center hollow portion of a coil spring 13 for preventing the buckling of the coil spring 13 which is used for pressing the slider 5 forward.

A plurality of slits 41 are respectively formed on predetermined positions on the side walls 6a and 6b, into which fixing protrusions 40 of the cover shell 2 will be fitted.

As can be seen from FIGS. 2, 3B and 3C, an L-shaped protrusion 14 is formed at a position a little forward from the spring guide rod 12 by being bent from the side wall 6a. The L-shaped protrusion bears an end of a rod 16 which is used for restricting the movement of the slider 5. In detail, the L-shaped protrusion 14 has a bearing 14b formed on a standing wall 14a. A rotation shaft 16a provided at an end of the rod 16 is rotatably borne by the bearing 14b. A hook 16b provided at the other end of the rod 16 is slidably engaged with a heart cam groove 15. The heart cam groove 15 is formed in the vicinity of a front end on an outer face of an arm 5c of the slider 5. Details of the heart cam groove 15 will be described afterward.

The rod 16 is disposed in a concave portion formed on the side face of the arm 5c which is formed to be parallel to the standing wall 14a, so that the hook 16b can be engaged with the heart cam groove 15.

A plate spring 17 is formed in the vicinity of the front end on the side wall 6a by embossing the side wall 6a for pressing a side face of the rod 16 toward the arm 5c of the slider 5.

As can be seen from FIGS. 1, 2 and 3B, both side front portions of the bottom plate 3b of the base shell 3 are protruded forward than a center portion thereof. Inner peripheries of the protruded side front portions are slanted against a straight periphery of the center portion. A pair of stoppers 18 is formed on the slanted inner peripheries of the side front portions by bending the blank of the base shell 3 upwardly. The stoppers 18 prevent not only jumping out of the slider 5 but also miss-insertion of the memory card MC.

A span between the stoppers 18 corresponds to the opening 42 through which the memory card MC can be inserted. Each stopper 18 has an upward offset 18a at an inner upper edge portion. As can be seen from FIG. 1, the memory card MC has a pair of elongate downward offsets 19 formed along both lower side edges thereof. A span between inner edges of the stoppers 18 above the upward offsets 18a is selected to be a little wider than the maximum width of the memory card MC. A height between an upper face 3b of the bottom plate 3a of the base shell 3 and a lower edge of the upward offset 18a is selected to be a little smaller than a height of the downward offsets 19 of the memory card MC. A span between inner edges of the stoppers 18 below the upward offsets 18a is selected to be a little wider than the narrower width between the inner edges of the downward offsets 19 of the memory card MC.

By such a configuration, the memory card MC can be inserted into the housing 1A through the opening 42 in a manner so that the downward offsets 19 of the memory card passes above the upward offsets 18a of the stopper 18, when the memory card MC is properly inserted so that the lower face of the memory card MC faces the upper face 3b of the bottom plate 3a of the base shell 3. Alternatively, when the memory card MC is erroneously inserted so that the upper face of the memory card MC faces the upper face 3b of the bottom plate 3a of the base shell 3, both sides of the memory card MC in the vicinity of the upper face thereof cannot pass trough the passage between the stoppers 18, so that the erroneous insertion of the memory card MC can be prevented.

Another stopper 26 for preventing erroneous insertion of the memory card MC back to front is formed at a predetermined position on the bottom plate 3a of the base shell 3 by bending the blank of the base shell 3. When the memory card MC is erroneously inserted back to front, the memory card MC can pass through the portion of the upward offsets 18a of the stoppers 18 in the opening 42. If there is no stopper, a rear end of the memory card MC at which no I/O contact is provided damages the contacts 10 held on the contact block 4. Thus, the stopper 26 is formed at a position forward the contacts 10 of the contact block 4 when the contact block 4 is provided on the base shell 3. As can be seen from FIG. 6B which shows the details of the lengths of the contacts 10 of the contact block 4, a contact 10a positioned at the right end of the array of the contacts 10 has the longest length, so that it contacts the I/O contact of the memory card MC first. The stopper 26 is concretely provided on an inner side in the vicinity of a front end of the hole 11 which corresponds to the contact 10a of the contact blocks 4 having the longest length. By the way, a guide groove (not shown in the figure) by which the stopper 26 can avoid the collision with the memory card MC is formed at a predetermined position on the lower face of the memory card MC, when the memory card MC is properly inserted through the opening 42.

In the vicinity of four corners of the bottom plate 3a, downward bosses 60 are formed by punching the blank of the base shell 3. The downward bosses 60 serve as spacers when the connector 1 is directly mounted on a circuit substrate of an apparatus. Furthermore, soldering portions 61 are formed on the front end of the bottom plate 3a of the base shell 3, which are downwardly and forwardly protruded from the front end of the base shell 3. Outer faces of the soldering portions 61 will directly be soldered on the circuit substrate.

Details of the cover shell 2 are described with reference to FIGS. 5A to 5D. FIG. 5A shows a rear view of the cover shell 2. FIG. 5B shows a plan view of the cover shell 2. FIG. 5C shows a front view of the cover shell 2. FIG. 5D shows a side view of the cover shell 2.

The cover shell 2 has side walls 20 which are formed by bending both sides of the punched blank downwardly. Three protrusions 21 are formed at a predetermined pitch on a rear end of a top plate 2a of the cover shell 2 by bending the blank of the cover shell 2 downwardly. The protrusions 21 are to be press-fitted to press-fitting through holes 22 of resin molded base member 7 of the contact block 4 on the base shell 3 from the upside, when the cover shell 2 is engaged with the base shell 3.

A window 23 through which a mark such as "SD" printed on the top face of the memory card MC can be observed is formed at front portion on the top plate 2a of the cover shell 2 at the same time of punching the metal thin plate for forming the blank of the cover shell. A pair of slits 24 is further formed parallel to both sides of the window 23. Center portions of bridges 25 between the window 23 and the slits 24 are downwardly protruded from the lower face of the top plate 2a of the cover shell 2. Peaks of the protruded bridges 25 serve as pressing elements for pressing the memory card MC downward by elastically contacting the top face of the memory card MC when the memory card MC is inserted into the housing 1A.

A plurality of fixing protrusions 40 which are to be fitted into the slits 41 on the side walls 6a and 6b of the base shell 3 are formed at positions corresponding to the slits 41 by inwardly bending a part of the side walls 20 of the cover shell 2. Furthermore, a downward protrusion 44 is formed on the top plate of the cover shell 2 by bending the blank of the cover shell 2 downwardly, which serves as a restriction element of a locking member 38 described below.

Details of the contact block 4 are described with reference to FIGS. 6A to 6F. FIG. 6A shows a rear view of the contact block 4. FIG. 6B is a plan view of the contact block 4. FIG. 6C is a side view of the contact block 4 with respect to the switching pieces 31a and 31b. FIG. 6D is a front view of the contact block 4. FIG. 6E is a side view of the contact block 4 with respect to the contacts 10. FIG. 6F is a side view of the contact block 4 with respect to the switching pieces 30a and 30b.

As can be seen from FIGS. 6A, 6B and 6D, a plurality of (for example, nine for the SD memory card) the contacts 10, a pair of the switching pieces 30a and 30b and a pair of the switching pieces 31a and 31b are integrally held on the base member 7 of the contact block 4 which is formed by insert molding of resin. The contacts 10 respectively contact the I/O contacts on the lower face of the memory card MC. The switching pieces 30a and 30b are used for sensing whether the memory card MC is properly inserted or not. The switching pieces 31a and 31b are used for sensing a position of a writing protection switch of the memory card MC corresponding to the on or off of the writing protection. The contacting portions of the contacts 10 and the switching pieces 30a, 30b, 31a and 31b are protruded from the base member 7 toward the opening 42 of the housing 1A. Soldering terminals 32 of the contacts 10 and the switching pieces 30a, 30b, 31a and 31b which are to be soldered on a circuit substrate are protruded backwardly from the base member 7. As can be seen from FIGS. 6C, 6E and 6F, the base member 7 has an offset formed on a front top end thereof. The above-mentioned press-fitting through holes 8 are penetratingly formed on the offset of the base member 7. The press-fitting through holes 22 are penetratingly formed on the rear portion of the top face of the base member 7. As can be seen from FIGS. 6A and 6D, a pair of cuttings 47 into which end portions of the coil springs 13 are fitted is formed on both sides of the base member 7. One of the cuttings 47 is positioned at a lower end of the base member 7 and the other is positioned at an upper end of the base member 7.

Figure 8A:
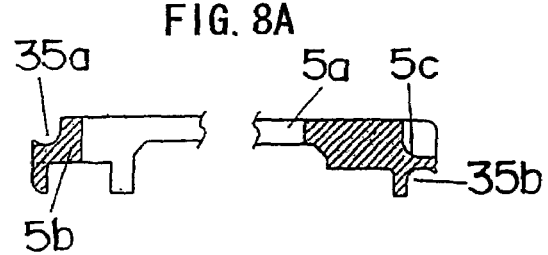
FIGS. 8A to 8C are drawings respectively showing A—A section, B—B section and C—C section in FIG. 7B.
Figure 8B:
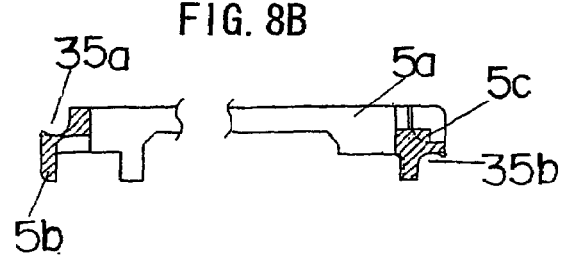
Figure 8C:
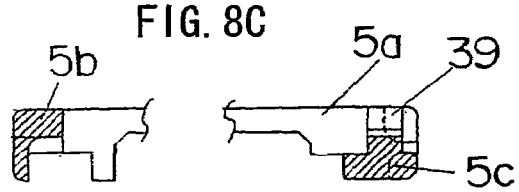
Figure 9:
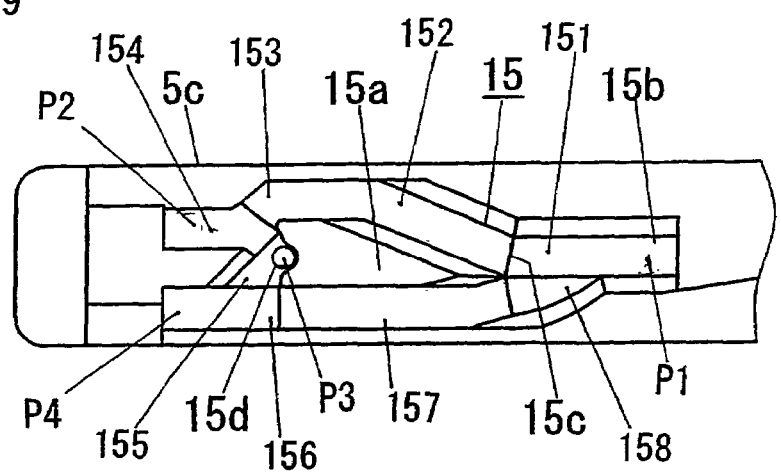
FIG. 9 is a drawing showing a heart cam groove formed on an outer face of an arm of the slider.

Details of the slider 5 are described with reference FIGS. 7A to 7D, 8A to 8C and 9. FIG. 7A shows a left side view of the slider 5. FIG. 7B shows a plan view of the slider 5. FIG. 7C shows a right side view of the slider 5. FIG. 7D shows a front view of the slider 5. FIGS. 8A to 8C respectively show A—A section, B—B section and C—C section in FIG. 7B. FIG. 9 shows the heart cam groove 15 formed on the outer face of the arm 5c of the slider 5.

The slider 5 is formed substantially horseshoe shape by resin molding. The arms 5b and 5c are protruded forward from a transverse portion 5a of the slider 5. An array of grooves 33 are formed on the lower face of the transverse portion 5a of the slider 5. Since the slider 5 moves forward and backward in the housing 1A, the grooves 33 prevents the collision of the slider 5 with the contacts 10 and the switching pieces 30a, 30b, 31a and 31b of the contact base 4.

The arms 5b and 5c serve as guide elements for guiding both sides of the memory card MC. Slanted faces 34 are formed at front ends of the arms 5b and 5c in a manner so that a distance between the inner side faces of the arms 5b and 5c gradually increases toward the end.

A narrow groove 35a having substantially u-shape section is provided on the left arm 5b toward the center from the upper rear end. The rear end and the left side of the groove 35a are opened as shown in FIG. 7B. Similarly, a narrow groove 35b having substantially u-shape section is provided on the right arm 5c toward the center from the lower rear end. The rear end and the right side of the groove 35b are opened.

The coil springs 13 are respectively fitted into the grooves 35a and 35b. Dead ends of the grooves 35a and 35b respectively receive the pressing forces of the coil springs 13. Since both of the arms 5b and 5c evenly receive the pressing forces of the coil springs 13 forwardly, the slider 5 can move in the housing 1A of the connector 1 smoothly.

A pair of guide rails 50a and 50b on which the downward offsets 19 of the memory card MC are slidably disposed is integrally formed on the inner side faces of the arms 5b and 5c of the slider 5.

The heart cam groove 15 is formed at a portion in the a vicinity of the front end on the outer side face of the right arm 5c. As can be seen from FIG. 9, the heart cam groove 15 is configured by a heart cam 15a and guide groove 15b. The guide groove 15b further comprises eight sub-grooves 151 to 158. The hook 16b of the rod 16 is slidably engages with the guide groove 15b. Corresponding to the forward and backward movement of the slider 5, the hook 16b of the rod 16 moves a predetermined way along the guide groove 15b and is guided by the side walls of the guide groove 15b and the heart cam 15a and the convex and concave elevation of the bottom 15c of the sub-grooves 151 to 158 of the guide groove 16b. Details of the heart cam groove 15 will be described later.

A web 5e having a slant 5d is formed at an inner corner between the transverse member 5a and the right arm 5c. A slanted cutting 27 on the front end of the memory card MC can be fitted to the slant 5d of the web 5e of the slider 5. A slit 36 is formed on the web 5e in a manner so that an end of the slit 36 is opened on the outer side face of the arm 5c and a straight portion of the slit 36 is parallel to the slant 5d. An end of a locking member 38 (see FIG. 2) which is made of an elastic thin metal plate is press-fitted into the slit 36 so as to be held on the slider 5. A hooking end of the locking member 38 will be engaged with a cutting 37 formed on a side face of the memory card MC (see FIG. 1).

The right arm 5c further has a concave portion 39 formed at a position on a top face thereof and backward to the heart cam groove 15, by which the hooking end of the locking member 38 can be extruded inwardly to be engaged with the cutting 37 of the memory card MC.

Assemble of the connector 1 in the first embodiment is described.

At first, the coil springs 13 are respectively fitted to the spring guide rods 12 of the base shell 3 so that the coil springs 13 are disposed at both rear sides of the base shell 3.

Subsequently, the contact block 4 is mounted on the upper face 3b of the bottom plate 3a of the base shell 3. At this time, the protrusions 9 protruded on the bottom plate 3a in the vicinity of the rear end of the base shell 3 are press-fitted into the press-fitting through holes 8 of the contact block 4 from the downside so that the contact block 4 is fixed on the base shell 3. Concurrently, the coil springs 13 are respectively fitted into the cuttings 47 formed on the base member 7 of the contact block 4.

The slider 5 is disposed in front of the contact base 4 on the base shell 3. At this time, the coil springs 13 are respectively fitted into the grooves 35a and 35b formed on the arms 5b and 5c of the slider 5. The rotation shaft 16a of the rod 16 is inserted into the bearing 14b on the standing wall 14a of the L-shaped protrusion 14 bend from the side wall 6a so as to be pivoted. Subsequently, the rod 16 is disposed between the arm 5c of the slider 5 and the inner side face of the side wall 6a of the base shell 3. The hook 16b of the rod 16 is engaged with the heart cam groove 15 formed on the outer side face of the arm 5c. By such the configuration, the rod 16 is biased toward the arm Sc by the plate spring 17 formed on the side wall 6a of the base shell 3.

The slider 5 is pressed forward by the pressing force of the coil springs 13 so that the slanted faces 34 at the front ends of the arms 5b and 5c contact the slanted rear faces of the stoppers 18 provided on the front end of the base shell 3. Thus, the jumping out of the slider 5 from the base shell 3 can be prevented. At this time, the hook 16b of the rod 16 is positioned at a rear end position designated by a symbol P1 in FIG. 9 in the guide groove 15b. By the way, the locking member 38 is fixed on the slider 5, as mentioned above.

Subsequently, the cover shell 2 is covered to the base shell 3 with the contact base 4, the slider 5, the coil springs 13, the rod 16 and the locking member 38, from the upside. At this time, the protrusions 21 formed on the rear end of the cover shell 2 are downwardly press-fitted into the press-fitting through holes 22 formed on the base member 7 of the contact base 4, and the inner faces of the side walls 20 of the cover shell 2 downwardly slide on the outer faces of the side wall 6a and 6b of the base shell 3. The elastic fixing protrusions 40 on the side walls 20 of the cover shell 2 are fitted into the slits 41 formed on the side walls 6a and 6b of the base shell 3. Thus, the cover shell 2 is fixed on the base shell 3 so that the planiform box-shaped housing 1A having the opening 42 of the connector 1 is formed. At the same time, assemble of the connector 1 in the first embodiment is completed.

FIG. 10A shows a cross-sectional left side view of the assembled connector 1. FIG. 10B shows a cross-sectional plan view of the connector 1. FIG. 10C shows a cross-sectional right side view of the connector 1. FIG. 10D shows a partial front view of the connector 1. In FIGS. 10A to 10D, the memory card MC is in the midway of the insertion into the housing 1A of the connector 1.

The slider 5 is fully moved toward the opening 42 by receiving the pressing forces of the coil springs 13. Under such the state, the downward protrusion 44 of the cover shell 2 contacts on the side face of the locking member 38 in the vicinity of the base end thereof held on the slider 5. Thus, the motion of the locking member 38 is restricted in a manner so that the hooking end of the locking member 38 cannot extrude inwardly from the inner side face of the arm 5c of the slider 5.

The connector 1 in the first embodiment is configured as an SMD (Surface Mount Device) type one. As can be seen from FIG. 10A, the heights of the outer faces of the soldering terminals 32 of the contacts 10 and the switching pieces 30a, 30b, 31a and 31b from the outer face of the bottom plate 3a of the base shell 3 are made lower. Similarly, the heights of the downward bosses 60 from the outer face of the bottom plate 3a of the base shell 3, and the heights of the outer faces of soldering portions 61 of the base shell 3 from the outer face of the bottom plate 3a of the base shell 3 are made lower. Thus, when the SMD type connector 1 is directly fixed on the circuit substrate, the height of the circuit substrate can be made lower. Furthermore, the metal housing 1A of the connector 1 can easily be grounded by directly soldering on the circuit substrate, so that the connector 1 which is tough with respect to the static electricity and the external noise can be obtained.

Motion of respective portions of the connector 1 when the memory card MC is inserted into the housing 1A of the connector is described.

When the memory card MC is properly inserted through the opening 42 of the housing 1A with respect to upside and downside, and front and rear, the downward offsets 19 at both lower sides of the memory card MC passes above the upward offsets 18a formed at the front end of the base shell 3. The front end of the memory card MC can be inserted in the space between the arms 5b and 5c of the slider 5 in the housing 1A, and the downward offsets 19 of the memory card MC are held on the guide rails 50a and 50b. When the memory card MC is further inserted into the housing 1A, the slanted cutting 27 on the front end of the memory card MC fits to the slant 5d on the web 5e of the slider 5, so that the slider 5 is pushed backward. When the memory card MC is further pushed against the pressing forces of the coil springs 13 which are applied to the slider 5, the slider 5 starts to move backward corresponding to the insertion of the memory card MC.

When the slider 5 starts to move, the hook 16b of the rod 16 relatively starts to move in the guide groove 15b of the heart cam groove 15 corresponding to the movement of the slider 5. The hook 16b of the rod 16 is positioned at a position P1 in the first sub-groove 151 in FIG. 9. When the slider 5 moves backward, the hook 16b relatively moves forward in the first sub-groove 151 of the guide groove 15b.

Since the elevation of the bottom of the eighth sub-groove 158 in the direction perpendicular to the paper sheet of FIG. 9 is higher than that of the first sub-groove 151, the hook 16b cannot proceed to the eighth sub-groove 158. Thus, the rod 16b proceeds in the second sub-groove 152 and reaches to the third sub-groove 153. Since the bottom of the second sub-groove 152 is sloped, the elevation of the bottom of the third sub-groove 153 is the highest in the guide groove 15b.

When the slider 5 stops at the dead end, the hook 16b proceeds to the fourth sub-groove 154 and stops at a position P2 where is a little shorter than the dead end of the fourth sub-groove 154. When the pressing force to the memory card MC is released, the slider 5 a little moves forward due to the pressing forces of the coil springs. The hook 16b relatively moves backward in the fourth sub-groove 154 corresponding to the forward movement of the slider 5. Since the elevation of the bottom of the third sub-groove 153 is higher than that of the fourth sub-groove 154, and the elevation of the bottom of the fourth sub-groove 154 is higher than that of the fifth sub-groove 155, the hook 16b must proceed to the fifth sub-groove 155.

In the fifth sub-groove 155, a recess 15d, to which the hook 16b is to be fitted, is formed on the side wall of the heart cam 15a. When the hook 16b proceeds to the fifth sub-groove 155, the hook 16b fits to the recess 15d at a position P3. Thus, the forward movement of the slider 5 is stopped due to the balancing the pressing forces of the coil springs 13 and the reaction force acting between the heart cam 15a and the hook 16b of the rod 16.

While the above mentioned movement of the memory card MC, the contacting portion of the contacts 10 protruded forward through the grooves 33 of the transverse member 5a of the slider 5 respectively contact the I/O contacts of the memory card MC which are provided on the lower face of the memory card MC. As can be seen from FIG. 6B, the contacts 10 respectively have different length, so that the contacts 10 serially contact the I/O contacts of the memory card MC corresponding to the length thereof.

When the slanted cutting 27 on the front end of the memory card MC contacts the switching piece 30a, the switching piece 30a warps so that the contacting portion of the switching piece 30a contacts the switching piece 30b. By applying a predetermined voltage between the switching pieces 30a and 30b, a switching on signal can be outputted from the switching pieces 30a and 30b. It is possible to sense that the memory card MC is properly inserted by an external sensing circuit (not shown in the figure) with using the switching on signal from the switching pieces 30a and 30b.

As can be seen from FIG. 1, a recess 46 from which a knob 45 of the writing protection switch SW is formed on a side wall of the memory card MC. When the memory card MC is properly inserted, the front end portion of the switching piece 31b runs upon the knob 45 or falls in the recess 46 alternatively corresponding to the position of the knob 45 in the recess 46. When the front end portion of the switching piece 31b falls in the recess 46, the front end portion of the switching piece 31b contacts the front end portion of the other switching piece 31a. By applying a predetermined voltage between the switching pieces 31a and 31b, a switching on signal can be outputted from the switching pieces 31a and 31b. It is possible to sense whether the memory card MC is in the writing protection mode or not by the external sensing circuit with using the switching on or off signal from the switching pieces 31a and 31b.

The movement of the slider 5 can be restricted by fitting the hook 16b of the rod 16 into the recess 15d of the heart cam 15a. The memory card MC, however, can forcibly be extracted from the housing 1A of the connector 1, if there is no locking mechanism. In the first embodiment, the locking member 38 which is to be engaged with the cutting 37 of the memory card MC is provided with the slider 5. When the slider 5 moves backwardly to a predetermined position, a bent portion 38a formed at a center portion of the locking member 38 (see FIG. 2) strides over the downward protrusion 44 formed on the top plate of the cover shell 2. When the restriction due to the protrusion 44 is released, the locking member 38 can be deflected so that the hooking end of the locking member 38 engages with the cutting 37 of the memory card MC through the concave portion 39 on the top face of the arm Sc of the slider 5. Thus, the memory card MC is locked with the slider 5. FIGS. 11A to 11C show the state that the memory card MC is properly inserted into the housing 1A of the connector 1.

Since the timing and the position for locking the memory card MC can freely be selected by modifying the shape of the locking member 38, the specifications of the connector 1 can be modified corresponding to the demand of the user or the electronic apparatus to which the connector 1 is built in.

For drawing out the memory card MC from the housing 1A of the connector 1, it is necessary to push the memory card MC in the insertion direction, again. The slider 5 moves backward with the memory card MC. The hook 16b of the rod 16 relatively moves forward in the fifth sub-groove 155. Since the dead end wall of the fifth sub-groove 155 facing the recess 15d of the heart cam 15a is slanted and the elevation of the bottom of the fifth sub-groove 155 is lower than that of the fourth sub-groove 154, the hook 16b must proceed to the sixth sub-groove 156, and stops at a position P4. The elevation of the bottom of the sixth sub-groove 156 is the lowest in the guide groove 15b of the heart cam groove 15.

When the pressing forces to the memory card MC is released, the slider 5 moves forward due to the pressing forces of the coil springs 13. The hook 16b relatively moves backward in the sixth sub-groove 156 corresponding to the forward movement of the slider 5. Since the elevation of the bottom of the fifth sub-groove 155 is higher than that of the sixth sub-groove 156, the hook 16b must proceed to the seventh sub-groove 157.

Concurrently, the protrusion 38a of the locking member 38 strides over the downward protrusion 44 on the top plate of the cover shell 44 corresponding to the backward movement of the slider 5, the locking member 38 is warped by contacting of the protrusion 44 in a manner so that the hooking end of the locking member 38 returns into the concave portion 39 on the top face of the arm 5c of the slider 5. Thus, the memory card MC is unlocked with the slider 5.

Subsequently, the hook 16b of the rod 16 proceeds in the seventh sub-groove 157 and reaches to the eighth sub-groove 158. The bottom of the seventh sub-groove 157 are sloped so that the elevation of the bottom of the eights sub-groove 158 is higher than that of the first sub-groove 151. When the hook 16b further proceeds from the eighth sub-groove 158, it falls into the first sub-groove 151 and returns to the initial position P1. At this time, the slider 5 returns to the initial state shown in FIGS. 10A to 10D. The memory card MC is largely protruded from the opening 42 of the housing 1A of the connector, and the memory card MC can be taken out from the connector 1.

Since the slider 5 is formed by resin molding, there is a possibility that the arms 5b and 5c are inwardly deformed caused by the heat from another electric device in the same apparatus or the elastic pressure while the insertion and extraction of the memory card MC. In the connector 1, the slanted faces 34 at the front ends of the arms 5b and 5c of the slider 5 contact the slanted rear faces of the stoppers 18 provided on the front end of the base shell 3 for expanding the front ends of the arms 5b and 5c when the memory card MC is not inserted. Thus, it is possible to ensure the span between the front ends of the arms 5b and 5c by which the memory card MC can be inserted smoothly without any contacting of the arms 5b or 5c.

The coil springs 13 for pressing the slider 5 have a very small outer diameter but have a longer length with respect to the diameter, so that the buckling can easily occur in the coil springs 13. In the connector 1, the spring guide rods 12, however, are fitted into the inner hollows of the coil springs 13, and the end portions of the coil springs 13 are guided by the cuttings 47 on the both sides of the base member 7 of the contact block 4. Thus, the occurrence of the buckling of the coil springs 13 can be prevented when the loads are applied to the coil springs while the slider 5 is moved or locked.

Figure 12A:
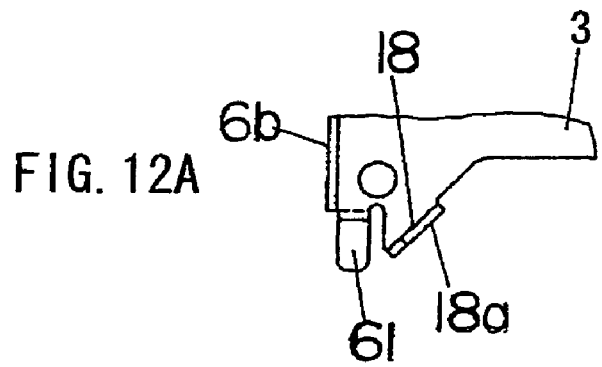
FIG. 12A is a drawing for showing a plan view of a soldering portion of the base shell which corresponds to a stand-off type structure in a modification of the first embodiment.
Figure 12B:
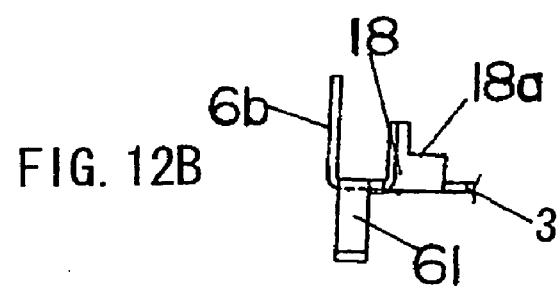
FIG. 12B is a drawing showing a front view of the stand-off type soldering portion.
Figure 12C:
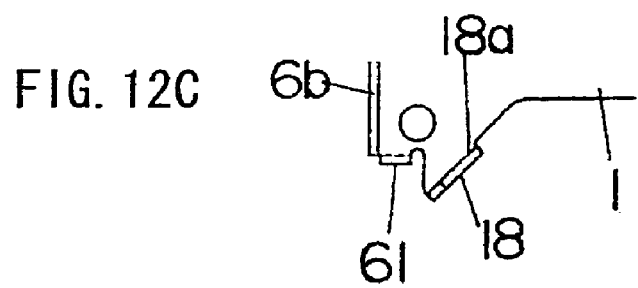
FIG. 12C is a drawing for showing a plan view of a soldering portion of the base shell which corresponds to a DIP type structure in a modification of the first embodiment.
Figure 12D:
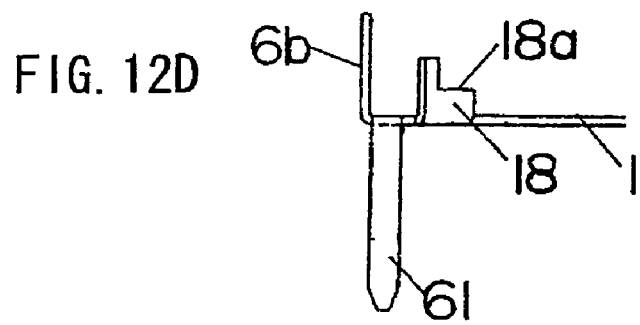
FIG. 12D is a drawing showing a front view of the DIP type soldering portion.

As mentioned above, the connector 1 in the first embodiment is configured as the SMD type one. It, however, can be modified the connector 1 as a stand-off type one or a DIP (Dual Inline Package) type one. For example, as shown by two-dotted chain lines in FIGS. 3B and 3D, it is possible to form a plurality of legs 70 for the DIP type structure or the stand-off type structure on the base shell 3 by bending the blank of the base shell 3 outwardly. Furthermore, as shown in FIGS. 12A and 12B, the soldering portions 61 of the base shell 3 can be extended downwardly corresponding to the stand-off type structure. Still furthermore, as shown in FIGS. 12C and 12D, the soldering portions 61 of the base shell 3 can straightly be extended downwardly corresponding to the DIP type structure. Accordingly, the connector 1 in the first embodiment can easily be modified to the SMD type, the DIP type or the stand-off type one by changing the dies for punching the blank of the base shell 3 and for bending the legs 70 and the soldering portions 61.

For responding to the modification of the connector 1, it is possible that the soldering terminals 32 of the contacts 10 and the switching pieces 30a, 30b, 31a and 31b are not bent but has sufficient length which can respond to respective types of the connector 1 before the insert molding of the contact block 4. After insert molding of the contact block 4, the soldering terminals 32 are bent and cut to predetermined shapes corresponding to the types of the connector 1 by changing the dies for bending and cutting the soldering terminals 32. By such the configuration, the same parts of the contact block 4 can commonly be used in respective types of the connector, so that the industry management of the parts can be bade easier and the dies for insert molding the contact block 4 can be reduced.

When the insulation of the connector 1 is required with respect to the circuit patterns on the circuit substrate or another electronic device in the mounting of the connector 1 on the circuit substrate, it is possible to install an insulation tape 80 at a necessary portion of the surface of the housing 1A, as shown in FIG. 2. Alternatively, it is possible to coat an insulation material such as an insulation resin at a necessary portion of the surface of the housing 1A.

A modification of the slider 5 is illustrated in FIGS. 13A to 13D. It is possible to form a protrusion 5g on the dead end of the groove 35a so at to hold the end of the coil spring 13 and to fit the coil spring 13 into the groove 35a, as shown in FIGS. 13A and 13B. By forming the protrusion 5g, the end of the coil spring 13 can be fitted thereto. Since the end of the coil spring 13 is fitted to the slider 5 by the protrusion 5g, attachment of the slider on the base shell 3 can be made easier.

Still furthermore, it is possible to form a cutting 5f on the arm 5c of the slider 5 so as not to contact with the L-shaped protrusion 14 formed on the side wall 6a of the base shell 3, as shown in FIGS. 21B and 21C.

Second Embodiment

A second embodiment of the present invention is described. The connector 1 in the first embodiment is on condition that the base shell 3 is fixed on the circuit substrate. Alternatively, in the second embodiment, the cover shell 2 is to be fixed on the circuit substrate. The connector 1 in the second embodiment is called reverse type.

Details of the reverse type base shell 3 in the second embodiment are shown in FIGS. 14A to 14D. FIG. 14A shows a rear view of the base shell 3. FIG. 14B shows a plan view of the base shell 3. FIG. 14C shows a front view of the base shell 3. FIG. 14D shows a side view of the base shell 3.

In comparison with FIGS. 3A to 3D in the first embodiment, it is found that the soldering portions 61 are upwardly bent on the front end of the base shell 3. The height of the soldering portions 61 is a little higher than the thickness of the housing 1A in a manner so that the soldering portions 61 is positioned above the outer face of the top plate of the cover shell 2 when the cover shell 2 is fit to the base shell 3.

Details of the reverse type cover shell 2 in the second embodiment are shown in FIGS. 15A to 15C. FIG. 15A shows a rear view of the cover shell 2. FIG. 15B shows a plan view of the cover shell 2. FIG. 15C shows a side view of the cover shell 2.

In comparison with FIGS. 5A to 5D in the first embodiment, it is found that soldering portions 62 are further formed on the front end of the top plate 2a of the cover shell 2.

Figure 16A:
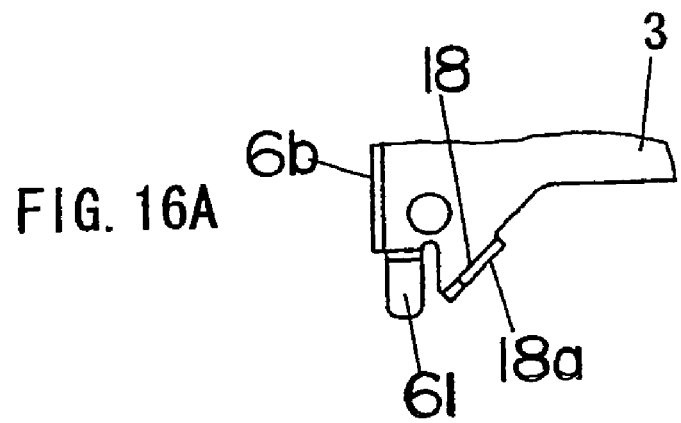
FIG. 16A is a drawing for showing a plan view of a soldering portion of the base shell which corresponds to a stand-off type structure in a modification of the second embodiment.
Figure 16B:
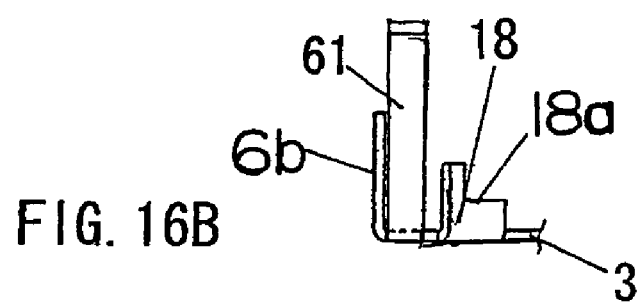
FIG. 16B is a drawing showing a front view of the stand-off type soldering portion.
Figure 16C:
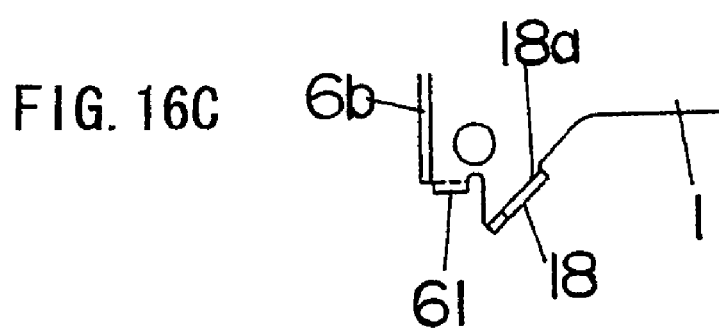
FIG. 16C is a drawing for showing a plan view of a soldering portion of the base shell which corresponds to a DIP type structure in a modification of the second embodiment.
Figure 16D:
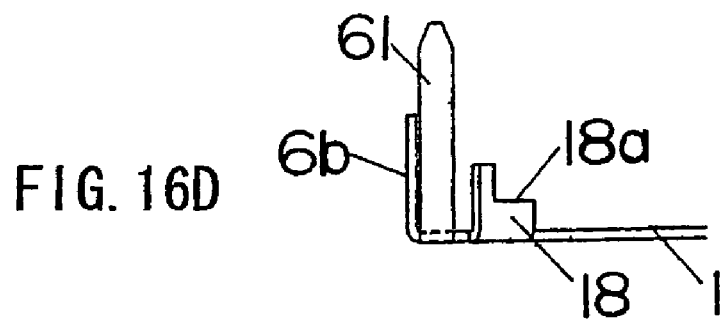
FIG. 16D is a drawing showing a front view of the DIP type soldering portion.

By such a configuration, the SMD reverse type connector 1 can be provided. It, however, can be modified the connector 1 as a stand-off type one or a DIP type one. For example, as shown in FIGS. 16A and 16B, the soldering portions 61 of the base shell 3 can be extended upwardly corresponding to the stand-off type structure. Still furthermore, as shown in FIGS. 16C and 16D, the soldering portions 61 of the base shell 3 can straightly be extended upward corresponding to the DIP type structure. Still further more, it is possible to form a plurality of legs for the DIP type structure or the stand-off type structure on the cover shell 2 by bending the blank of the base shell 2 outwardly which are not shown in FIGS. 15A to 15D.

Details of the contact block 4 are shown in FIGS. 17A to 17F. FIG. 17A shows a rear view of the SMD type contact block 4. FIG. 17B is a plan view of the contact block 4. FIG. 17C is a side view of the contact block 4 with respect to the switching pieces 31a and 31b. FIG. 17D is a front view of the contact block 4. FIG. 17E is a side view of the contact block 4 with respect to the contacts 10. FIG. 17F is a side view of the contact block 4 with respect to the switching pieces 30a and 30b.

In comparison with FIGS. 6A to 6F in the first embodiment, the soldering terminals 32 of the connectors 10 and the switching pieces 30a, 30b, 31a and 31b are respectively bent in the opposite direction than those in the first embodiment. The heights of the soldering terminals 32 are extended by the thickness of the housing 1A corresponding to the SMD type. FIG. 18 shows a part of the side view of the SMD reverse type connector 1 in the second embodiment. For corresponding to the stand-off type or DIP type connector 1, the heights of the soldering terminals 32 are extended by the stand-off or DIP heights further to the thickness of the housing 1A.

The elements which are not referred are substantially the same as those in the first embodiment, so that the description of them is omitted.

Third Embodiment

A third embodiment of the present invention is described. In the description of the third embodiment, the elements which are substantially the same as those in the first embodiment are not referred, and the characteristic elements in the third embodiment are mainly described.

FIG. 19 shows a configuration of the connector 1 in the third embodiment. In comparison with FIG. 2 in the first embodiment, a pair of spring guide members 100 are independently formed from the base shell 3. The coil springs 13 are fitted into the cuttings 47 formed on the both sides of the base member 7 of the contact block 4 and the grooves 35a and 35b formed on the arms 5b and 5c of the slider 5 from openings on the rear face of the housing 1A. Subsequently, the spring guide members 100 are engaged with the housing 1A in a manner so that spring guide rods 101 of the spring guide members 100 are fitted into the inner hollows of the coil springs 13. Cuttings 110 are formed on the rear end portion of the side walls 6a and 6b of the base shell 3.

The span between the inner faces of the side walls 6a and 6b are selected a little wider than the width of the contact block 4 so as to form slits 200 (see FIGS. 23A to 23C) between the contact block 4 and the side walls 6a and 6b.

Details of the spring guide member 100 is illustrated in FIGS. 20A to 20C. FIG. 20A shows a rear view of the spring guide member 100. FIG. 20B shows a plan view of the spring guide member 100. FIG. 20C shows a side view of the spring guide member 100.

The spring guide member 100 has the spring guide rod 101 which is fitted into the inner hollow of the coil spring 13 for preventing the buckling of the coil spring 13, a temporal tacking hook 103 by which the spring guide member 100 is temporarily tacked on the side wall 6a or 6b of the base shell 3, and a pair of main hooks 102 formed on rear end of the temporal tacking hook 103 which are to be fitted into the cuttings 110 on the side walls 6a and 6b of the base shell 3.

A length 100L from a rear end 103b to a front end 103a of the temporal tacking hook 103 is selected in a manner so that the front end 103a of the temporal tacking hook 103 is press-fitted into the slit 200 prior to the rear end 100a of the spring guide rod 101 contacts the rear end of the coil spring 13 while the spring guide rod 101 is fitted into the inner hollow of the coil spring 13. The main hooks 102 are formed by bending the rear end of the temporal tacking hook 103 outwardly.

Details of the slider 5 is shown in FIGS. 21A to 21D. FIG. 21A shows a left side view of the slider 5. FIG. 21B shows a plan view of the slider 5. FIG. 21C shows a right side view of the slider 5. FIG. 21D shows a front view of the slider 5.

In comparison with FIGS. 7A to 7D, a cutting 5f is formed on the arm 5c of the slider 5 so as not to contact with the L-shaped protrusion 14 formed on the side wall 6a of the base shell 3.

Details of the base shell 3 in the third embodiment are shown in FIGS. 22A to 22E. FIG. 22A shows a rear view of the base shell 3. FIG. 22B shows a plan view of the base shell 3. FIG. 22C shows a left side view of the base shell 3. FIG. 22D shows a right side view of the base shell 3. FIG. 22E shows a front view of the base shell 3.

The base shell 3 in the third embodiment is a stand-off type one. In comparison with FIGS. 3A to 3D in the first embodiment, cuttings 110 are formed on the rear end portion of the side walls 6a and 6b of the base shell 3, and the spring guide rods 12 in the first embodiment are not formed on the base shell 3. Furthermore, a plurality of legs 70 for the stand-off type structure is formed on the base shell 3 by bending the blank of the base shell 3 outwardly, and a pair of soldering portions 61 is formed on the front end of the base shell 3 for extending downwardly corresponding to the stand-off type structure.

Assemble of the connector 1 in the third embodiment is described with reference to FIGS. 18 and 23A to 23C.

At first, the contact block 4 is mounted on the upper face 3b of the bottom plate 3a of the base shell 3 in a manner so that the contacts 10 face the opening 42 of the housing 1A. At this time, the protrusions 9 protruded in the vicinity of the rear end of the base shell 3 are press-fitted into the press-fitting through holes 8 of the contact block 4 from the downward so that the contact block 4 is fixed on the base shell 3. The rotation shaft 16a of the rod 16 is borne in the bearing 14b on the standing wall 14a of the L-shaped protrusion 14 bend from the side wall 6a so as to be pivoted.

Subsequently, the locking member 38 is fitted in the slit 36 formed on the web 5e of the slider 5. The slider 5 is disposed in front of the contact base 4 on the base shell 3 in a manner so that the L-shaped protrusion 14 and the rod 16 are not restricting the motion of the slider 5 by the cutting 5f. Concurrently, the hook 16b of the rod 16 is engaged with the heart cam groove 15 formed on the outer face of the arm 5c. By such the configuration, the rod 16 is biased toward the arm 5c by the plate spring 17 formed on the side wall 6a of the base shell 3.

Subsequently, the cover shell 2 is covered to the base shell 3 from the upward. At this time, the protrusions 21 formed on the rear end of the cover shell 2 are downwardly press-fitted into the press-fitting through holes 22 formed on the base member 7 of the contact base 4, and the inner faces of the side walls 20 of the cover shell 2 downwardly slide on the outer faces of the side wall 6a and 6b of the base shell 3. The elastic fixing protrusions 40 on the side walls 20 of the cover shell 2 are fitted into the slits 41 formed on the side walls 6a and 6b of the base shell 3. Thus, the cover shell 2 is fixed on the base shell 3 so that the planiform box-shaped housing 1A having the opening 42 of the connector 1 is formed.

Subsequently, as shown in FIG. 23A, the coil springs 13 are fitted into the cuttings 47 which are formed on both side of the base member 7 of the contact block 4 from the rear end of the housing 1A. Thus, the soil springs 13 are respectively disposed on both sides of the housing 1A of the connector 1 in a manner so that the rear end portions of the coil springs 13 are outwardly protruded from the rear face of the housing 1A, as shown in FIG. 23B. Lengths or heights of the protruded portions of the coil springs 13 are designated by a symbol 13L.

The spring guide rod 101 of the spring guide member 100 is fitted into the inner hollow of the coil spring 13 from the end of the protruded portion of the coil springs 13. Since the length 100L of the temporal tacking hook 103 is selected a little longer than the length 13L of the protruded portions of the coil springs 13, the front end 103a of the temporal tacking hook 103 is press-fitted into the slit 200 formed between the contact block 4 and the side walls 6a and 6b of the base shell 3 on the rear face of the housing 1A prior to the rear end 100a of the spring guide rod 101 contacts the rear end of the coil spring 13 so as to compress the coil springs 13. Thus, the spring guide member 100 is never rotated or moved, even when the spring guide member 100 is forcibly press-fitted against the reaction force of the coil spring 13.

When the temporal tacking hook 103 of the spring guide member 100 is further press-fitted into the slit 200, and the main hooks 102 are fitted into the cuttings 110 formed on the side walls 6a and 6b of the base shell 3, the spring guide member 100 is fixed on the housing 1A, as shown in FIG. 23C. Accordingly, assemble of the connector 1 is completed. Since the main hooks 102 and the cuttings 110 into which the main hooks 102 are fitted are provided, the spring guide members 100 can easily be foxed on the housing 1A by press-fitting the spring guide members 100 into the slits 200.

In the third embodiment, the coil springs 13 are inserted into the housing 1A after assembling the main part of the connector 1. Thus, the slider can easily be attached without making resistance to the reaction forces of the coil springs 13. Furthermore, the coil springs 13 are only inserted into the housing 1A, so that the coil springs 13 can easily be attached even when the diameter of the coil springs are much smaller. Furthermore, the shapes of the base shell 3 cam be simplified, and the yielding of the raw materials such as the metal thin plate can be improved.

Furthermore, the protrusions 5g on the dead ends of the grooves 35a and 35b on the slider 5 as shown in FIGS. 13A and 13B are not necessary, so that the shape and the configuration of the die for molding the slider 5 can be simplified.

Fourth Embodiment

Figure 24:
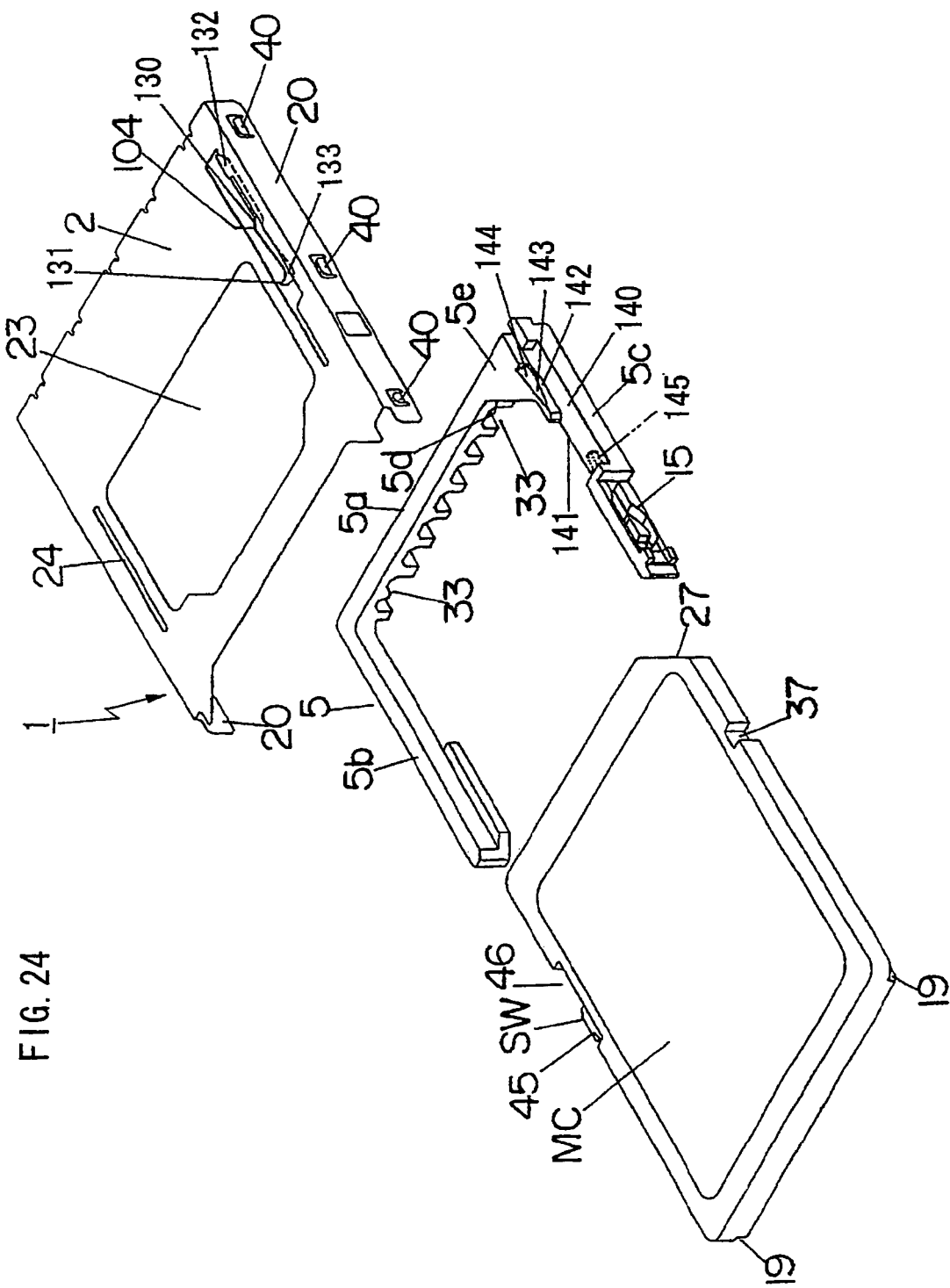
FIG. 24 is a drawing showing a perspective view of main elements of a connector in the fourth embodiment.
Figure 26:
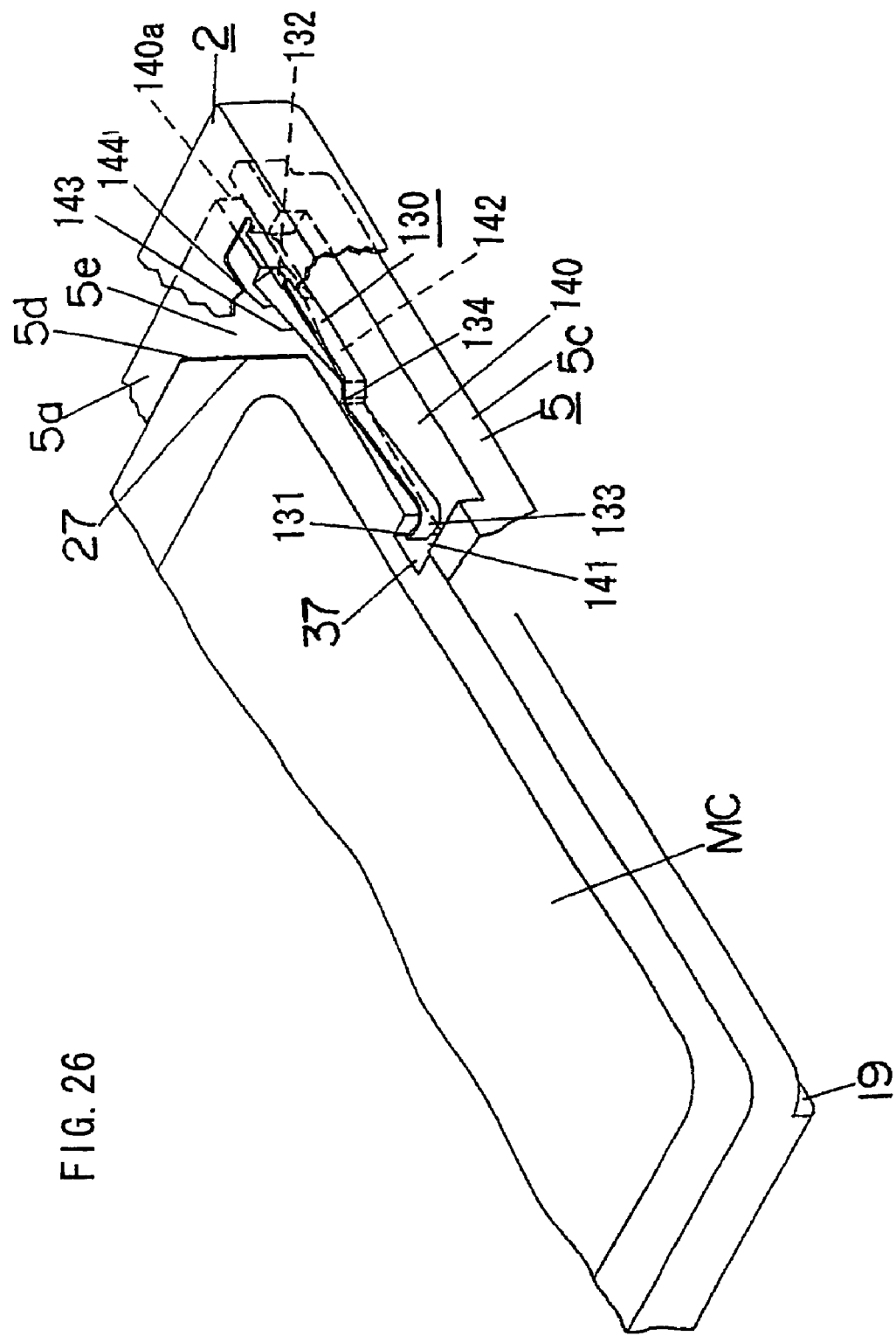
FIG. 26 is a drawing showing a perspective view of the memory card and the arm of the slider when the memory card is locked so as not to be drawn out from the connector.

FIG. 24 shows a perspective view of main elements such as the cover shell 2 and the slider 5 of the connector 1 in the fourth embodiment. In the fourth embodiment, a plate spring 130 is integrally formed on the cover shell 2 instead of using the locking member 38. A concave portion 140 corresponding to the plate spring 130 for enabling the swing of the plate spring 130 is formed on the arm 5c of the slider 5. A locking hook 131 formed at a top end of the plate spring 130 can be protruded into the inside space of the slider 5 through an opening 141. A cam face 142 by which the protrusion and retraction of the locking hook 131 is controlled is formed on a side wall of the concave portion 130 on the arm 5c of the slider 5. Other configurations of the connector 1, which are designated by the same numerals, are substantially the same as those in the above-mentioned embodiments, so that the description of them is omitted.

As can be seen from FIG. 24, the plate spring 130 is formed by bending the blank of the cover shell 2 downwardly, in a manner so that a rear end of the plate spring 130 is integrally connected to the cover shell 2 at a position corresponding to the upper rear end of the arm 5c of the slider 5, a side face from the bending end 132 to a front end 133 of the plate spring 130 is substantially perpendicular to the top plate of the cover shell 2 and the plate spring 130 can be swing in a direction parallel to the top plate of the cover shell 2. A Z-shaped bent portion 134 is formed at a center portion of the side wall from the bending end 132 to the front end 133 of the plate spring 130. The locking hook 131 is formed by bending a portion in the vicinity of the front end 133 inwardly.

The concave portion 140 is formed on the upper face of the arm 5c of the slider 5 which faces the plate spring 130. When the slider 5 is provided in the housing 1A (not shown in the figure), the plate spring 130 of the cover shell 2 is contained in the concave portion 140 of the arm 5c of the slider 5. Since the locking hook 131 faces the opening 141, the locking hook 131 can be extruded into and retracted from the inside space between the arms 5b and 5c of the slider 5 through the opening 141. The cam face 142 is formed on an inner side face 143 of the concave portion 140 backward to the opening 141 in a manner so that the bent portion 134 is contacted on the cam face 142 for restricting the extrusion of the locking hook 131 into the inside space of the slider 5 through the opening 141 until the slider 5 reaches to a predetermined position in the backward movement, and the restriction of the locking hook 131 is released for extruding into the inside space of the slider 5 through the opening 141 when slider reaches to the predetermined position.

A slanted face 144 is formed above an upper edge of the side wall 143, which is downwardly slanted toward the concave portion 140. The slanted face 144 serves as a guide face for falling the plate spring 130 of the cover shell 2, which is inwardly bent by elasticity, into the concave portion 140 when cover shell 2 is engaged with the base shell 3 (not shown in the figure). A numeral 140a designates a narrow channel of the concave portion 140 opened on the rear face of the slider 5, through which the plate spring 130 can relatively be moved in the concave portion 140 while the slider 5 moves forward or backward.

Figure 27:
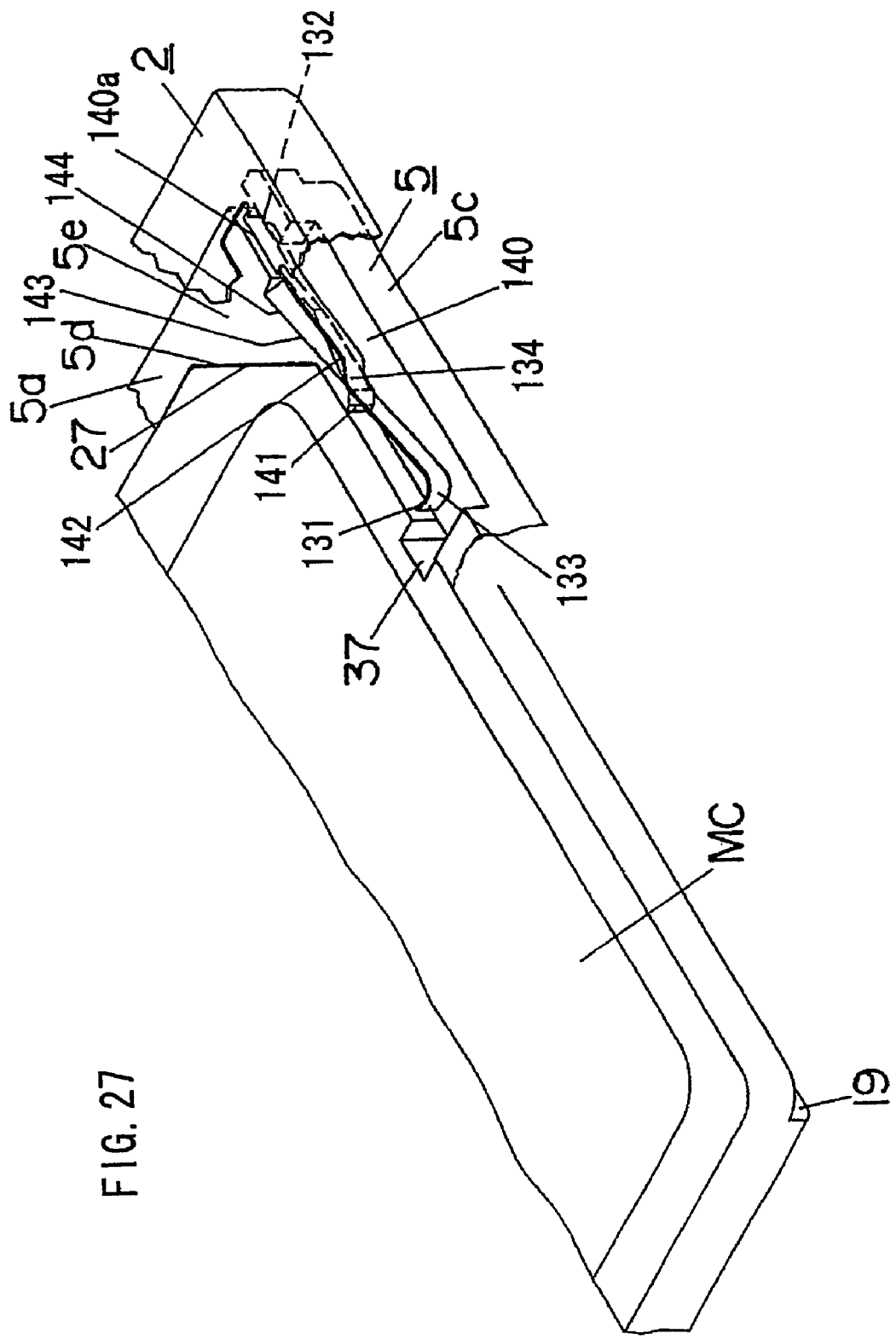
FIG. 27 is a drawing showing a perspective view of the memory card and the arm of the slider when the memory card is in a midway of the drawn out from the connector.
Figure 28B:
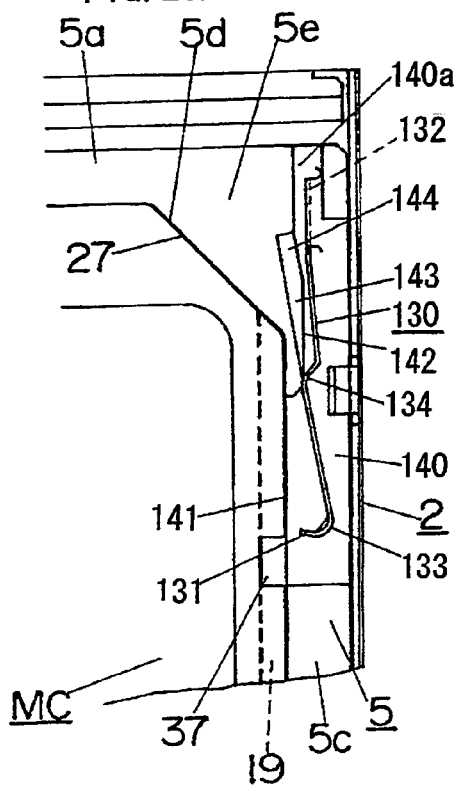
FIGS. 28A, 28B, 29A and 29B are drawings respectively showing plan views of motion of a locking mechanism of the memory card in the fourth embodiment.
Figure 28A:
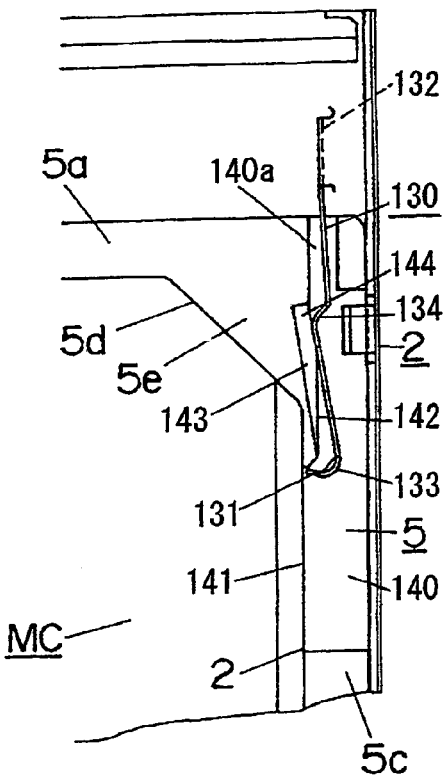
Figure 29B:
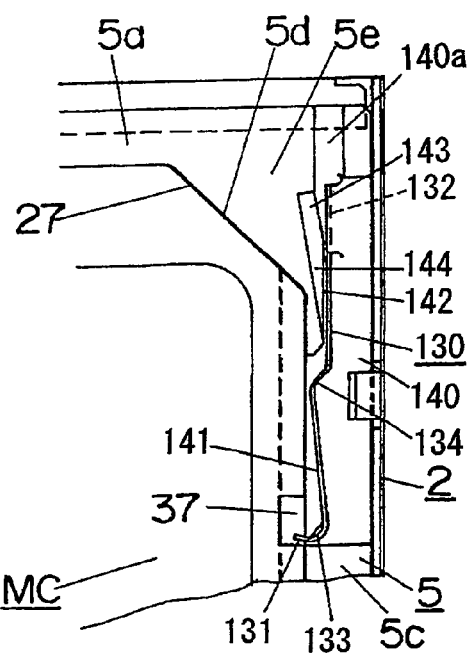
Figure 29A:
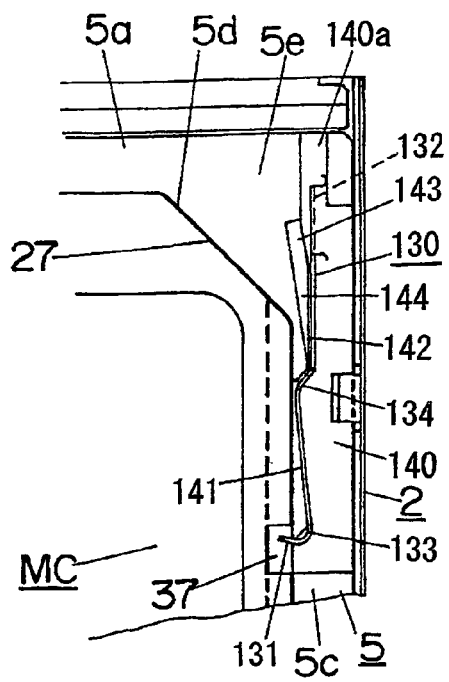

Movement of the plate spring 130 is described with reference to FIGS. 25 to 27, 28A, 28B, 29A and 29B. FIGS. 25 and 28A show the state that the memory card MC is not inserted into the connector yet. In such the state, the slider 5 is moved toward the opening 42 by receiving the pressing forces of the coil springs 13. The bent portion 134 of the plate spring 130 is pushed outward by the cam face 142 on the side wall 143 of the concave portion 140, so that the locking hook 134 on the front end 133 of the plate spring 130 is restricted so as not to extrude into the inside space of the slider 5 through the opening 141.

Subsequently, the memory card MC is properly inserted into the housing 1A through the opening 42, the slanted cutting 27 on the front end of the memory card MC fits to the slant 5d on the web 5e of the slider 5, so that the slider 5 is pushed backward. When the memory card MC is further pushed against the pressing forces of the coil springs 13 which are applied to the slider 5, the slider 5 starts to move backward corresponding to the insertion of the memory card MC.

Following to the backward movement of the slider 5, the bent portion 134 of the plate spring 130 contacting on the cam face 142 is further pushed outward, so that the plate spring 130 is warped. As shown in FIGS. 27 and 28B, the locking hook 131 on the front end 133 of the plate spring 130 retracts into the concave portion 140.

When the slider 5 further moves backward and reaches to a predetermined position, the bent portion 134 falls into the opening 141 from the cam face 142. Thus, the locking hook 131 on the front end 133 of the plate spring 130 extrudes into the inside space of the slider 5 through the opening 141 by the elasticity of the plate spring 130. The extruding point of the locking hook 131 corresponds to the cutting 37 formed on the side face of the memory card MC which is held on the slider 5, so that the locking hook 131 extrudes into the center of the cutting 37 so as to lock the memory card MC. At this time, there is a gap which allows a little movement of the memory card MC forward and backward between the locking hook 131 and the front and rear dead walls of the cutting 37.

For drawing the memory card MC from the connector 1, the end of the memory card MC protruded from the opening 42 of the housing 1 is further pushed backwardly so as to move the memory card MC with the slider 5 to the rear end of the housing 1A. By such the movement, the locking of the hook 16b of the rod 16 and the hart cam groove 15 is released, and the relation between the plate spring 130 and the cam face 142 on the arm 5c of the slider returns to the state shown in FIG. 29A from the state shown in FIG. 29B. Subsequently, the slider 5 with the memory card MC moves forward by the pressing forces of the coil springs 13. By such the forward movement of the slider 5, the bent portion 134 of the plate spring 130 of the cover shell 2 runs upon the cam face 142, so that the plate spring 130 warps outward. The locking hook 131 on the front end 133 of the plate spring 130 retracted from the cutting 37 as shown in FIG. 28B, so that the locking of the memory card MC is released.

Concurrently, the slider 5 moves toward the opening 42 by the pressing forces of the coil springs 13 so that it returns to the state shown in FIG. 28A. The rear end of the memory card MC is largely protruded from the opening 42 of the housing 1A. Thus, the memory card MC can be taken out from the housing 1A of the connector 1.

In the above-mentioned description of the fourth embodiment, the plate spring 130 is directly bent from the blank of the cover shell 2. It, however, is possible to connect a plate spring member on the cover shell 2 by caulking, laser welding or spot welding.

By the way, the SD memory card has compatibility with a MMC (Multi Memory Card) which has substantially the same plan view except the cutting 37, so that the MMC can be connected to the connector 1. When the MMC is inserted into the inside of the housing 1A, the locking hook 131 of the plate spring 130 contacts a side face of the MMC so that the plate spring 130 is outwardly warped.

When the connector 1 is exclusive use of the memory card MC with the cutting 37 such as the SD memory card, it is preferable to form a protrusion 145 for restricting the warp of the plate spring 130, as shown by two-dotted chain line in FIG. 24. By such the configuration, the plate spring 130 cannot be warped outwardly by contacting the protrusion 145 even when a memory card inserted into the housing 1A forcibly warped the plate spring 130 by contacting with the locking hook 131.

A modification of the fourth embodiment is described with reference to FIGS. 30A to 30C, 31 and 32A to 32D. In this modification, the plate spring 130 is formed on the base shell 3.

As can be seen from FIGS. 30A to 30C, the plate spring 130 is integrally formed at a position on the bottom plate of the base shell 3 facing a lower face of the arm 5c of the slider 5. The plate spring 130 is connected at a rear end thereof to the base shell 3. An upper face of the plate spring 130 from a rear end to a front end thereof is substantially parallel to the bottom plate of the base shell 3, and the plate spring 130 can be warped in a direction perpendicular to the bottom plate of the base shell 3. A Z-shaped bent portion 134 is formed at a center portion of the plate spring 130.

As can be seen from FIG. 31, with respect to a plan view of the plate spring 130, the plate spring 130 has a first cantilever portion 135 and a second cantilever portion 136. The first cantilever portion 135 is elongated from the rear end 132 of the plate spring 130, and the second cantilever 136 is elongated from and off to the side of the front end of the first cantilever 135 in the same direction as the first cantilever portion 135 so that the second cantilever portion 136 faces the lower face of the arm 5c of the slider 5. A locking hook 131 is formed by bending a portion in the vicinity of the front end of the second cantilever portion 136 of the plate spring 130 upwardly.

Figure 32D:
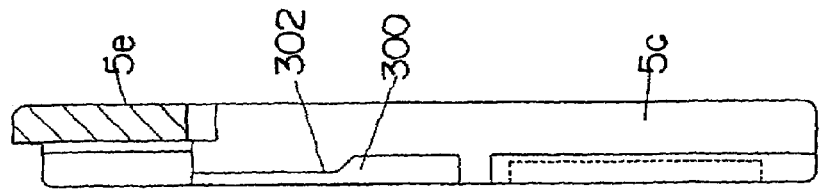
FIG. 32D is a drawing showing a left side view of the arm.
Figure 32C:
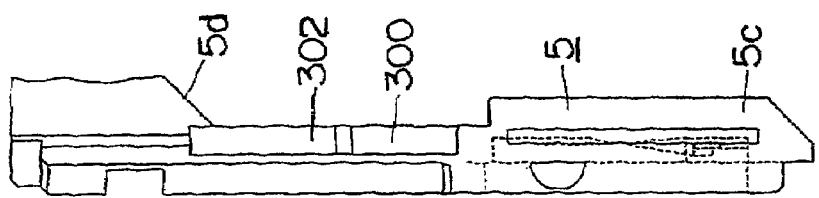
FIG. 32C is a drawing showing a bottom view of the arm.
Figure 32B:
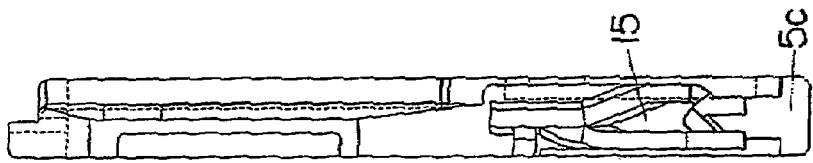
FIG. 32B is a drawing showing a right side view of the arm.
Figure 32A:
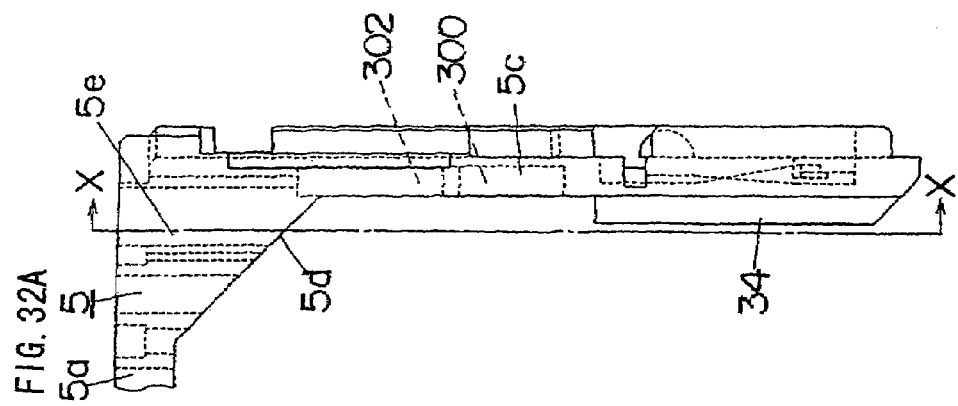
FIG. 32A is a drawing showing a plan view of the arm of the slider in the fourth embodiment.

FIG. 32A shows a plan view of the arm 5c of the slider 5. FIG. 32B shows a right side view of the arm 5c. FIG. 32C shows a bottom view of the arm 5c. FIG. 32D shows a left side view of the arm 5c.

As can be seen from FIGS. 32A to 32D, the arm 5c of the slider 5 has a concave portion 300 on the lower face thereof corresponding to the plate spring 130 of the base shell 3. When the slider 5 is disposed on the base shell 3, the plate spring 130 is positioned in an inner space of the concave portion 300. The concave portion 300 is opened to the inside space between the arms 5b and 5c of the slider 5, so that the locking hook 131 of the plate spring 130 can face the memory card MC held on the slider 5. Furthermore, a cam face 302 is formed on a ceil of the concave portion 300 in a manner so that the bent portion 134 is contacted on the cam face 302 for restricting the extrusion of the locking hook 131 into the inside space of the slider 5 by warping the plate spring 130 downwardly until the slider 5 reaches to a predetermined position in the backward movement, and the restriction of the locking hook 131 is released for extruding above the lower face of the memory card MC when slider 5 reaches to the predetermined position.

Thus, the plate spring 130 is downwardly warped due to the bent portion 134 contacts the cam face 302 and the upper end of the locking hook 131 is positioned below a level of the downward offset 19 on the memory card MC before the insertion of the memory card MC as shown in FIG. 30A, and while the insertion of the memory card MC with the slider 5 to a predetermined position as shown in FIG. 30B.

Following to the backward movement of the slider 5, the bent portion 134 contacting the cam face 302 is pushed downward, so that the plate spring 130 is warped downward and the locking hook 131 is moved downward.

When the slider with the memory card MC reaches to the predetermined position, the bent portion 134 is departed from the cam face 302, so that the plate spring 130 can be warped upward by the elastic reaction force thereof. The locking hook 131 of the plate spring 130 moves upward. At this time, the upper end of the locking hook 131 corresponds to a lower opening of the cutting 37 of the memory card MC which is held on the slider 5, so that the locking hook 131 proceeds into the center portion of the cutting 37 so that the locking hook 131 locks the memory card MC, as shown in FIG. 30C. At this time, there is a gap which allows a little movement of the memory card MC forward and backward between the locking hook 131 and the front and rear dead walls of the cutting 37.

For drawing the memory card MC from the connector 1, the end of the memory card MC protruded from the opening 42 of the housing 1 is further pushed backwardly so as to move the memory card MC with the slider 5 to the rear end of the housing 1A. By such the movement, the locking of the hook 16b of the rod 16 and the hart cam groove 15 is released, and the slider 5 returns to the state shown in FIG. 30C from the state shown in FIG. 30B. Subsequently, the slider 5 with the memory card MC moves forward by the pressing forces of the coil springs 13. By such the forward movement of the slider 5, the bent portion 134 of the plate spring 130 of the cover shell 2 runs upon the cam face 302, so that the plate spring 130 warps downward. The locking hook 131 of the plate spring 130 retracted from the cutting 37, so that the locking of the memory card MC is released.

Fifth Embodiment

Figure 33:
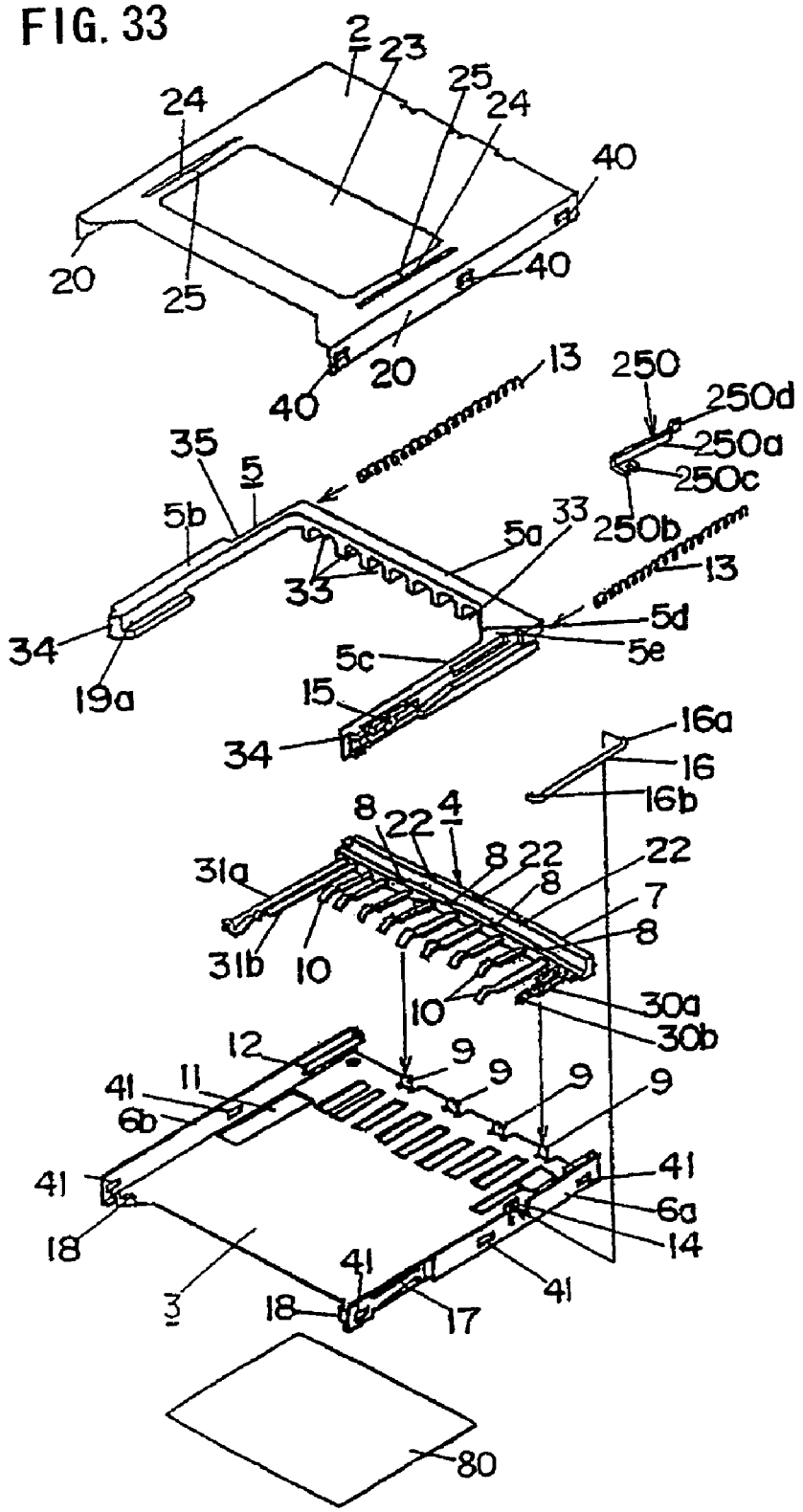
FIG. 33 is a drawing showing a configuration of a connector in a fifth embodiment of the present invention.
Figure 34A:
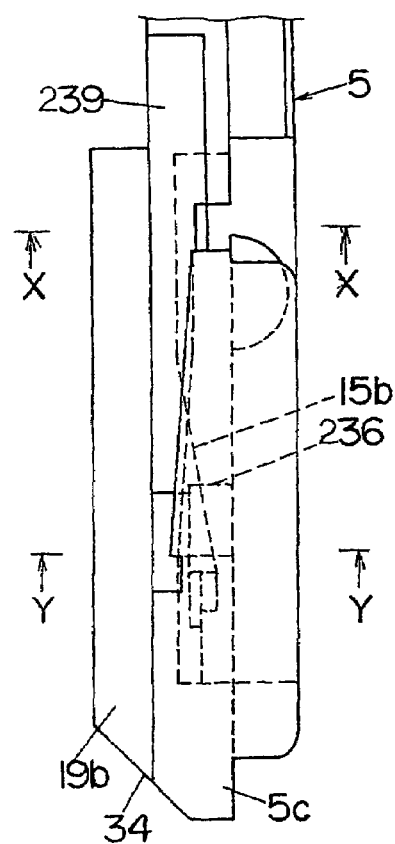
FIG. 34A is a drawing showing a left side view of a front portion of an arm of a slider in the fifth embodiment
Figure 34B:
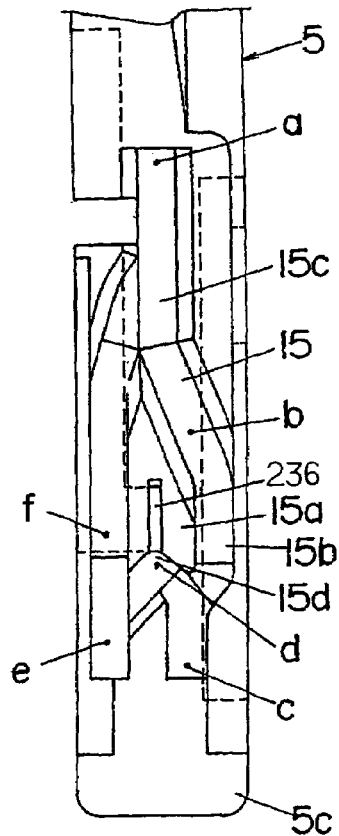
FIG. 34B is a drawing showing a right side view of the front portion of the arm.
Figure 34C:
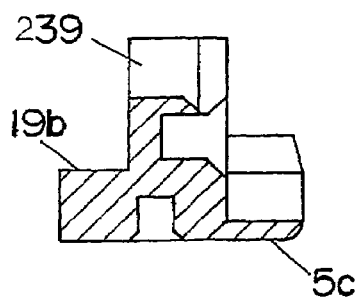
FIG. 34C is a drawing showing an X—X section of the arm in FIG. 34A.
Figure 34D:
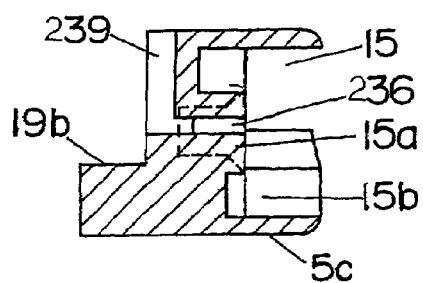
FIG. 34D is a drawing showing a Y—Y section of the arm.

A fifth embodiment of the present invention is described. FIG. 33 shows a configuration of the connector 1 in the fifth embodiment. FIG. 34A shows a left side view of a front portion of the arm 5c of the slider 5 in the fifth embodiment. FIG. 34B shows a right side view of the front portion of the arm 5c. FIG. 34C shows an X—X section of the arm 5c in FIG. 34A. FIG. 34D shows a Y—Y section of the arm 5c.

As can be seen from FIG. 34B, a holding groove 236 is formed on the heart cam 15a of the heart cam groove 15 on the arm 5c in parallel with the moving direction of the slider 5. An end of the holding groove 236 is opened to the recess 15d to which the hook 16b of the rod 16 is fitted when the slider 5 is held at the predetermined position. A protrusion 250b and a contacting portion 250c of a locking member 250 will be press-fitted.

Figure 35A:
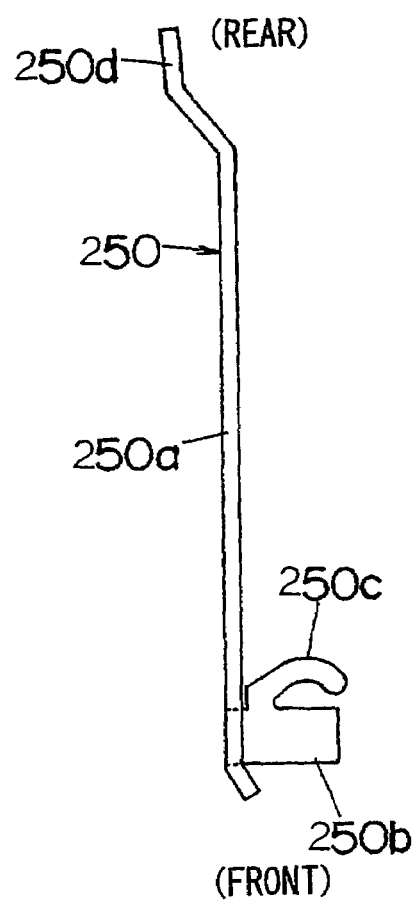
FIG. 35A is a drawing showing a plan view of a locking member in the fifth embodiment.
Figure 35B:
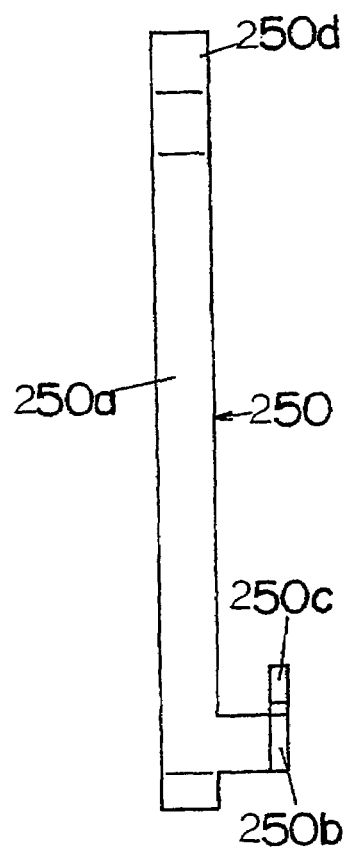
FIG. 35B is a drawing showing a side view of the locking member.
Figure 35C:
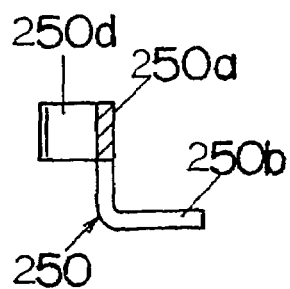
FIG. 35C is a drawing showing a rear view of the locking member.

FIG. 35A shows a plan view of the locking member 250. FIG. 35B shows a side view of the locking member 250. FIG. 35C shows a rear view of the locking member 250.

The locking member 250 is formed by punching and bending of a metal thin plate such as a stainless steel having elasticity. The locking member 250 has a lever portion 250a which is an elongate plate and will be disposed in parallel with the inner side face of the arm 5c when the locking member 250 is held on the arm 5c. The protrusion 250b is bent from an edge in the vicinity of a lower front end of the lever portion 250a toward a direction substantially perpendicular to the lever portion 250a. The contacting portion 250c is formed at a portion on a rear edge of the protrusion 250b and in the vicinity of the bent portion of the protrusion 250b from the lever 250a in a manner so that the center portion of the contacting portion 250c is outwardly embowed. A locking hook 250d is formed in the vicinity of a rear end portion of the lever portion 250a, which has a crank shaped section.

The locking member 250 is held on the arm 5c by fitting the protrusion 250b and the contacting portion 250c into the holding groove 236. A concave portion 239 is formed on the arm 5c in a manner to be opened to the upside of the arm 5c and opened to the inner space between the arms 5b and 5c. When the protrusion 250b and the contacting portion 250c are fitted into the holding groove 236, the front end of the protrusion 250b of the locking member 250 is extruded in the recess 15d of the hart cam groove 15. The lever portion 250a of the locking member 250 is disposed in the concave portion 239 of the arm 5c.

The holding groove 236 is formed in a manner so that a width in the holding groove 236 is wider than the width at the opening thereof. Thus, when the protrusion 250b and the contacting portion 250c are fitted into the holding groove 236, the locking member 250 is never unloosen from the holding groove 236 due to the hooking of the contacting portion 250c with the edge of the opening of the holding groove 236. On the other hand, the protrusion 250b and the contacting portion 250c are movable in the holding groove 236. Since the front end of the protrusion 250b of the locking member 250 is extruded in the recess 15d of the hart cam groove 15, when the hook 16b of the rod 16 is fitted to the recess 15d, the front end of the protrusion 250b of the locking member 250 is backwardly pressed via the hook 16b due to the pressing forces of the coil springs 13 which presses the slider 5 forward. The rear end portion of the lever portion 250a is elastically deformed for warping toward the memory card MC by the pressing force. The locking hook 250d extruded from the concave portion 239 and engages with the cutting 37 of the memory card MC. Thus, the memory card MC is locked so as not to be drawn out from the housing 1A of the connector 1.

On the other hand, when the hook 16d of the rod 16 is out from the recess 15d of the heart cam groove 15 except the locking state of the memory card MC, the pressing force for pressing the protrusion 250b of the locking member 250 is not acted. Thus, the locking hook 250d of the locking member 250 is evacuated from the cutting 37 of the memory card MC to the concave portion 239 on the arm 5c due to the elastic restitution force of the lever portion 250a. Thus, the locking of the cutting 37 of the memory card MC by the locking hook 250d is released.

Figure 37:
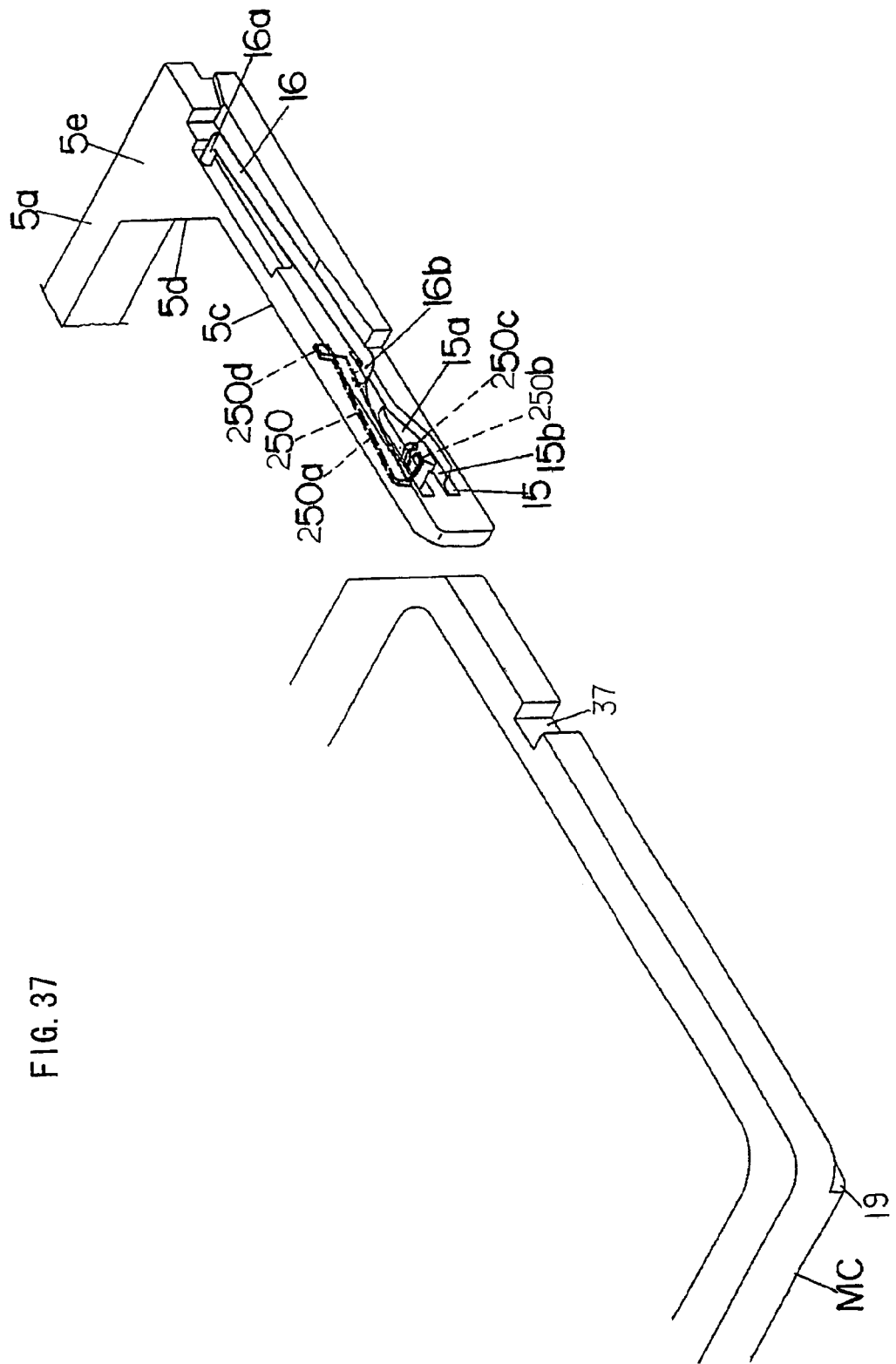
FIG. 37 is a drawing showing a perspective view of a memory card and the arm of the slider.

FIG. 36A shows a sectional plan view of a part of the slider 5 on the base shell 3. FIG. 36B shows a sectional side view of the slider 5 in the housing 1A. FIG. 37 shows a perspective view of the memory card MC and the arm 5c of the slider 5. In FIGS. 36A and 36B and 37, the memory card MC is not inserted and the slider 5 is moved forward by the pressing forces of the coil springs 13.

The hook 16b of the rod 16 is positioned at a rear end of the guide groove 15b, and the hook 16b is distant from the locking position, namely, the recess 15d on the guide groove 15b of the heart cam groove 15. The protrusion 250b of the locking member 250 receives no pressing force for pressing backward, so that the locking hook 250d of the locking member 250 is evacuated into the concave portion 239 due to the elastic restitution force of the lever portion 250a of the locking member 250 so as not to extrude inwardly from the inner side face of the arm 5c.

Figure 38A:
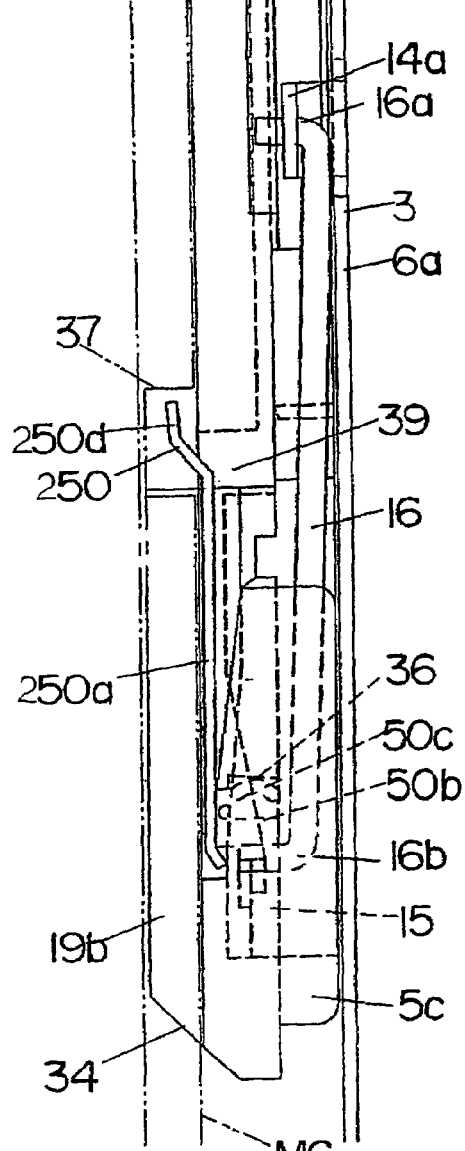
FIG. 38A is a drawing showing a sectional plan view of a part of the slider on the base shell.
Figure 38B:
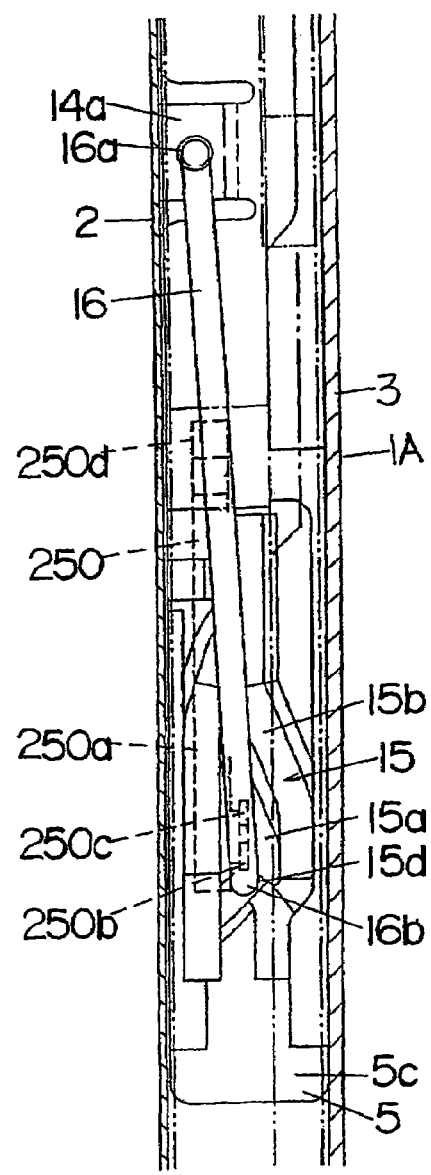
FIG. 38B is a drawing showing a sectional side view of the slider in the housing.
Figure 38C:
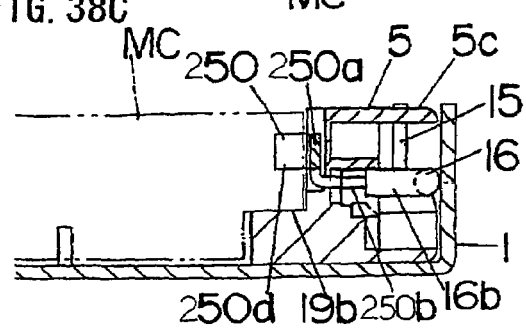
FIG. 38C is a drawing showing a sectional view of the locking mechanism of the slider and the memory card.
Figure 39:
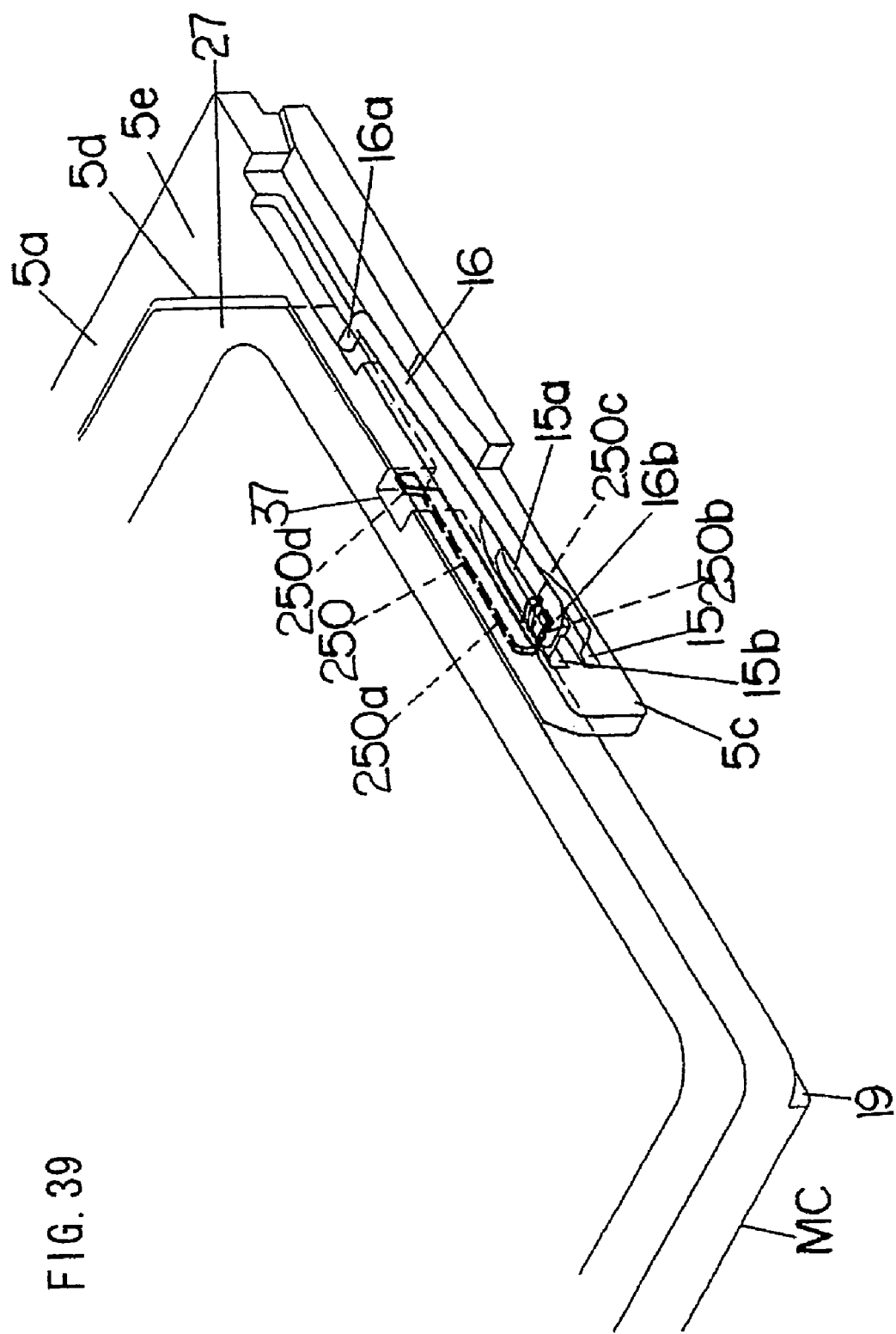
FIG. 39 is a drawing showing a perspective view of the memory card and the arm of the slider.

FIG. 38A shows a sectional plan view of a part of the slider 5 on the base shell 3. FIG. 38B shows a sectional side view of the slider 5 in the housing 1A. FIG. 38C shows a sectional view of the locking mechanism of the slider 5 and the memory card MC. FIG. 39 shows a perspective view of the memory card MC and the arm 5c of the slider 5. In FIGS. 38A to 38C and 39, the memory card MC is not inserted and the slider 5 is moved forward by the pressing forces of the coil springs 13.

When the slider 5 on which the memory card MC is properly held is moved to the predetermined position and the hook 16b of the rod 16 is stopped at the locking position in the recess 15d of the heart cam 15a, the front end of the protrusion 250b of the locking member 250 extruded into the recess 15d of the hart cam groove 15 is pressed backward by the hook 16b of the rod 16. The rear end portion of the lever portion 250a is elastically deformed for warping toward the memory card MC by the pressing force. The locking hook 250d extruded from the concave portion 239 and engages with the cutting 37 of the memory card MC. Thus, the memory card MC is locked so as not to be drawn out from the housing 1A of the connector 1.

For drawing the memory card MC from the connector 1, the end of the memory card MC protruded from the opening 42 of the housing 1 is further pushed backwardly so as to move the memory card MC with the slider 5 to the rear end of the housing 1A. By such the movement, the locking of the hook 16b of the rod 16 and the hart cam groove 15 is released, and the hook 16b moves to a position designated by a symbol "c" in the guide groove 15b in FIG. 34B. When the hook 16b of the rod 16 is disengaged from the recess 15d, the protrusion 250b of the locking member 250 receives no pressing force for pressing backward, so that the front end of the protrusion 250b extrudes into the recess 15d and the locking hook 250d of the locking member 250 is evacuated into the concave portion 239 due to the elastic restitution force of the lever portion 250a of the locking member 250. Thus, the locking of the cutting 37 of the memory card MC by the locking hook 250d of the locking member 250 is released.

As mentioned above, the locking hook 250d of the locking member 250 extrudes into the cutting 37 of the memory card MC only when the hook 16d of the rod 16 is positioned at the locking position in the recess 15d. When the hook 16d of the rod 16 is disengaged from the recess 15d, the locking of the cutting 37 of the memory card MC by the locking hook 250d of the locking member 250 is surely released. Since the locking hook 250d of the locking member 250 is not engaged with the cutting 37 of the memory card MC, the locking hook 250d of the locking member 250 and the cutting 37 of the memory card MC may not be deformed, even when unnecessary force of applied to the memory card MC during the drawing thereof.

Figure 40A:
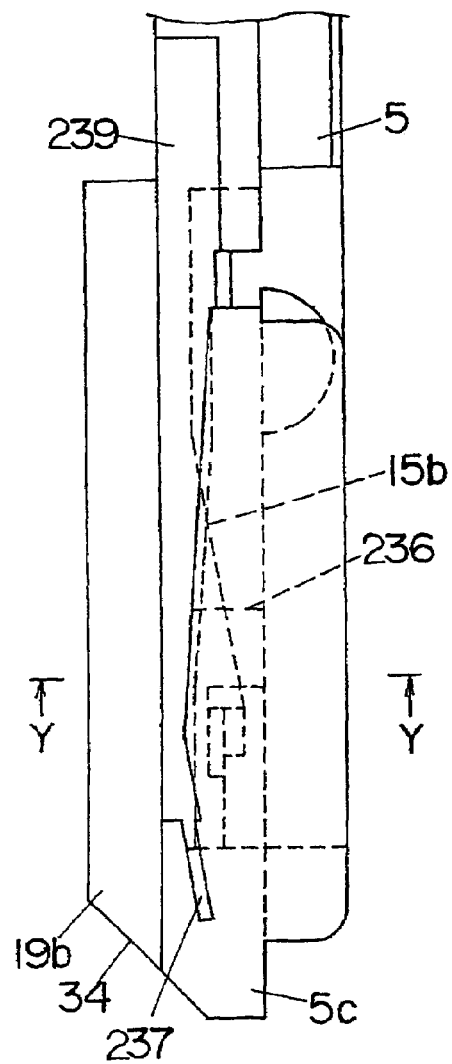
FIG. 40A is a drawing showing a plan view of a front portion of am arm of a slider in a modification of the fifth embodiment.
Figure 40B:
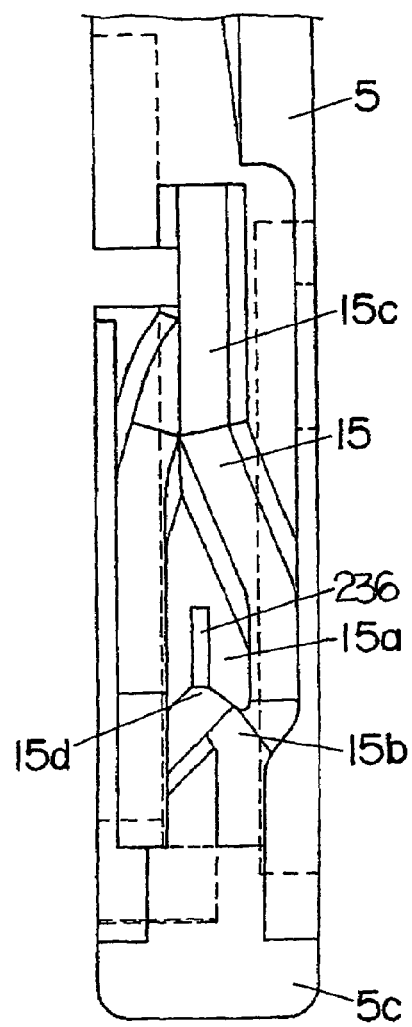
FIG. 40B is a drawing showing a right side view of the front portion of the arm.
Figure 40C:
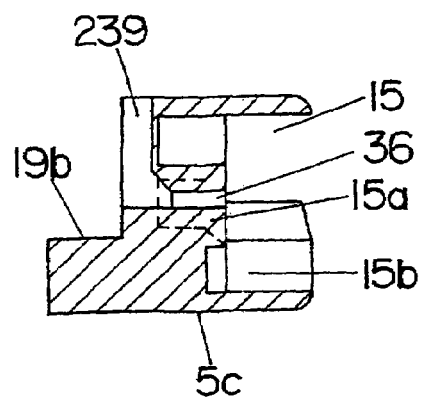
FIG. 40C is a drawing showing a Y—Y section of the arm.

A modification of the fifth embodiment is described. FIG. 40A shows a plan view of the front portion of the arm 5c of the slider 5. FIG. 40B shows a right side view of the front portion of the arm 5c. FIG. 40C shows a Y—Y section of the arm 5c.

As can be seen from FIG. 40A, a slit 237 is formed on upper front portion of the arm 5c further to the holding groove 236. An end of the slit 237 is opened to the concave portion 239.

FIG. 41A shows a plan view of a locking member 250'. FIG. 41B shows a side view of the locking member 250'. FIG. 41C shows a rear view of the locking member 250'.

The locking member 250' is formed by punching and bending of a metal thin plate such as a stainless steel having elasticity. The locking member 250' has a lever portion 250a which is an elongate plate and will be disposed in parallel with the inner side face of the arm 5c when the locking member 250' is held on the arm 5c. The protrusion 250b is bent from a lower edge in the midway position of the lever portion 250a toward a direction substantially perpendicular to the lever portion 250a. A locking hook 250d is formed in the vicinity of a rear end portion of the lever portion 250a, which has a crank shaped section. A press-fitting portion 250e is formed in the vicinity of the front end of the lever portion 250a of the locking member 250', which will be press-fitted into the slit 237 on the arm 5c.

For fixing the locking member 250' on the arm 5c, the press-fitting portion 250e is press-fitted into the slit 237 while the rear end of the lever portion 250a is forcibly warped inward. Subsequently, the rear end of the lever portion 250a is returned to the original shape for approaching the arm 5c. The protrusion 250b is inserted into the holding groove 236. For fixing the locking member 250' on the arm 5c easily, it is possible to make the width of the opening of the holding groove 236 wider or to make the width of the protrusion 250b narrower. When the locking member 250' is held on the arm 5c, the front end of the protrusion 250b is extruded into the recess 15d of the heart cam groove 15 from the holding groove 236.

Figure 42A:
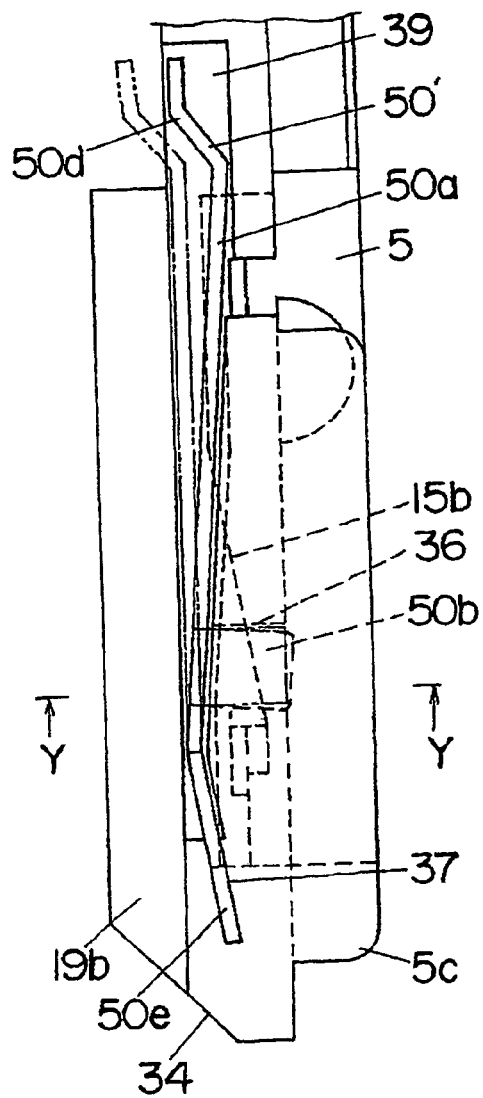
FIG. 42A is a drawing showing a plan view of the front portion of the arm of the slider with the locking member in the modification of the fifth embodiment.
Figure 42B:
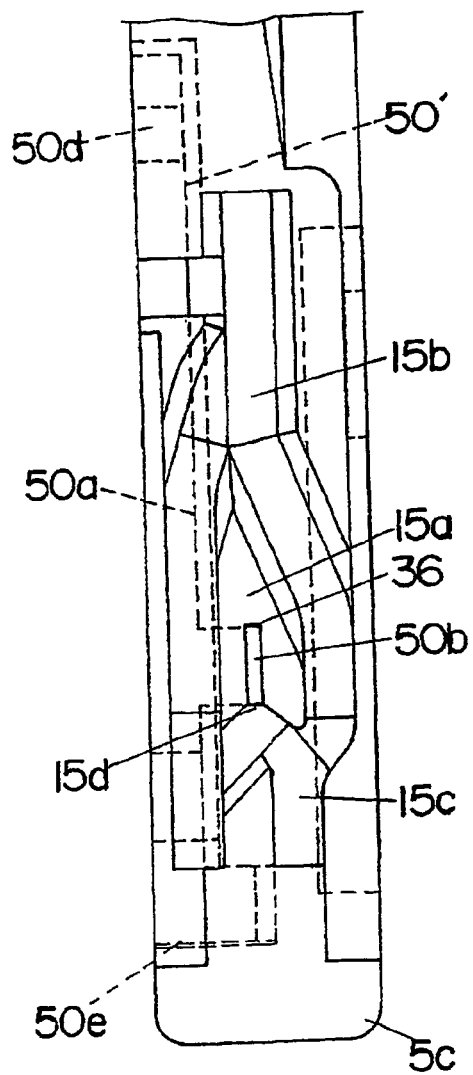
FIG. 42B is a drawing showing a right side view of the front portion of the arm.
Figure 42C:
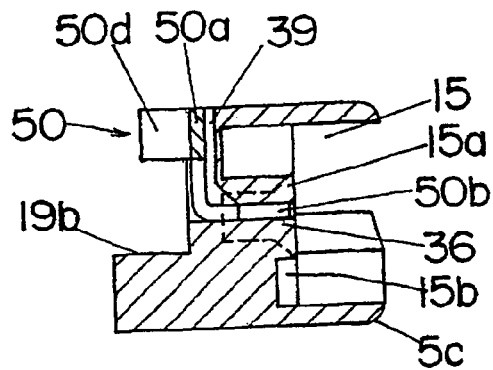
FIG. 42C is a drawing showing a Y—Y section of the arm.
Figure 43:
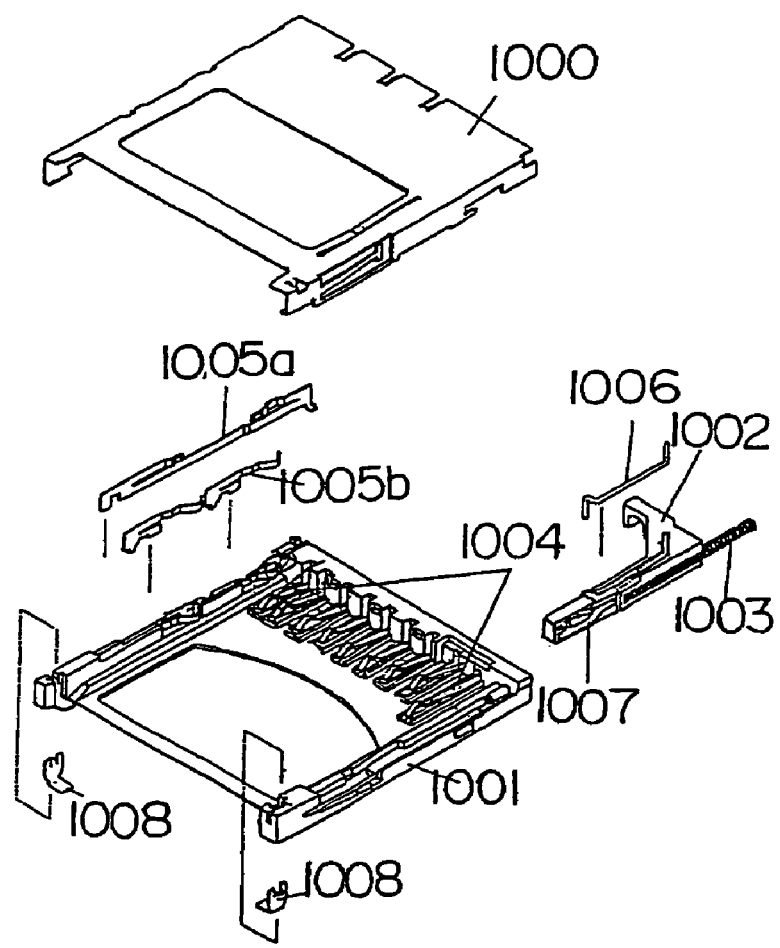
FIG. 43 is a drawing showing an exploded perspective view of a conventional connector.

FIG. 42A shows a plan view of the front portion of the arm 5c of the slider 5 with the locking member 250'. FIG. 42B shows a right side view of the front portion of the arm 5c. FIG. 42C shows a Y—Y section of the arm 5c.

When the memory card MC is properly inserted into the housing 1A of the connector 1 through the opening 42, the slider 5 is moved to the predetermined position and the hook 16b of the rod 16 is stopped at the locking position in the recess 15d in the heart cam groove 15. The front end of the protrusion 250b of the locking member 250' extruded into the recess 15d of the hart cam groove 15 is pressed backward by the hook 16b of the rod 16. The rear end portion of the lever portion 250a is elastically deformed for warping toward the memory card MC by the pressing force. The locking hook 250d extruded from the concave portion 239 and engages with the cutting 37 of the memory card MC. Thus, the memory card MC is locked so as not to be drawn out from the housing 1A of the connector 1.

When the hook 16b of the rod 16 is disengaged from the recess 15d, the protrusion 250b of the locking member 250 receives no pressing force for pressing backward, so that the front end of the protrusion 250b extrude into the recess 15d and the locking hook 250d of the locking member 250 is evacuated into the concave portion 239 due to the elastic restitution force of the lever portion 250a of the locking member 250. Thus, the locking of the cutting 37 of the memory card MC by the locking hook 250d of the locking member 250 is released.

The above-mentioned fifth embodiment is compatible not only the memory card MC such ad the SD memory card having the cutting 37 but also a memory card such as MMC having no cutting to be locked. When the memory card having no cutting is inserted into the inside of the housing 1A, the locking hook 250d of the locking member 250 or 250' contacts a side face of the memory card so that the locking member 250 or 250' is warped in the opposite direction to the memory card.

By such the configuration of the fifth embodiment, there is no position in the heart cam groove 15 at which the hook 16b of the rod 16 contacts the front end of the protrusion 250b except the recess 15d. Thus, the locking hook 250d of the locking member 250 or 250' is never extruded into the cutting 37 of the memory card MC except the locking position of the memory card. Thus, the locking hook 250d of the locking member 250 or 250' and the cutting 37 of the memory card MC may not be deformed, even when unnecessary force of applied to the memory card MC during the drawing thereof.

The above-mentioned embodiments are described with respect to the SD memory card which is an example of the memory card MC. The present invention, however, is not restricted by the embodiments, and it can be applied another type of memory card.

This application is based on Japanese patent applications 2001-350782, 2002-127556, 2002-224833 and 2002-279723 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A connector for a memory card comprising:
   a box-shaped housing having an opening on a front face through which the memory card is inserted, the housing being configured by a base shell comprising a metal plate and a cover shell comprising a metal plate, the cover shell engaging with the base shell;
   a contact block provided in a vicinity of a rear end of the housing, and holding a plurality of contacts corresponding to I/O contacts of the memory card on a resin molded base member so that the contacts are aligned parallel to each other in a widthwise direction of the housing and extend toward the opening; and
   a slider movably disposed between the opening and the contact block in the housing to correspond to an insertion and withdrawal of the memory card to and from the housing;
   wherein the slider comprises a resin molded member having a center portion disposed perpendicular to a moving direction of the slider and a pair of arms that protrude forward from sides of a front face of the center portion, the memory card being guided and held between the arms, and wherein the slider receives pressing forces of coil springs at both sides of a rear face of the center portion.

2. The connector in accordance with claim 1, wherein a pair of spring guide rods is parallel to and inward from side walls of the housing so that an end of each spring guide rod is integrally connected at rear sides of the housing, and another end of each spring guide rod extends toward the opening, wherein each spring guide rod is positioned in a center hollow portion of the coil spring to prevent a buckling of the coil spring; and
   a pair of cuttings is provided on sides of the base member of the contact block, into which the coil springs are fitted.

3. The connector in accordance with claim 1, further comprising:
   a pair of spring guide members each having a spring guide rod, the spring guide members being secured to the housing, wherein coil springs are respectively disposed on sides of the housing so that rear ends of the coil springs respectively extend from the rear face of the housing;
   the spring guide rod of each spring guide member is positioned in a center hollow portion of the coil spring to prevent a buckling of the coil spring; and
   a pair of cuttings is provided on sides of the base member of the contact block, to which the coil springs are fitted from the rear face of the housing.

4. The connector in accordance with claim 3, wherein the spring guide member includes a tacking hook facing the rear face of the housing when the spring guide rod is positioned in the coil spring;
   a pair of slits provided on sides on the rear face of the housing, into which the tacking hooks of the spring guide members are press-fitted; and
   a length from a rear end to a front end of the tacking hook is selected so that the front end of the tacking hook is press-fitted into the slot before the rear end of the spring guide rod contacts the rear end of the coil spring while the spring guide rod is fitted into the inner hollow portion of the coil spring.

5. The connector in accordance with claim 1, wherein the contact block further comprises switching pieces to sense at least a position of the memory card and a write protection state of the memory card.

6. The connector in accordance with claim 5, wherein soldering terminals of the contacts protrude from a rear face of the base member of the contact block; and
   the soldering terminals are bent toward the cover shell, wherein soldering portions of the soldering terminals are disposed above the cover shell of the housing.

7. The connector in accordance with claim 6, wherein blanks of the contacts include soldering terminals with portions that are commonly shaped, the commonly shaped portions each having a length that corresponds to a plurality of kinds of mounting types, and the soldering terminals of the contacts and the switching pieces extend from the rear face of the base member of the contact block, the soldering terminals being cut and bent to correspond to a mounting type of the connector.

8. The connector in accordance with claim 1, wherein the contact block comprises an insert molding by which the contacts are integrally held on the base member.

9. The connector in accordance with claim 8, wherein the contact block further comprise switching pieces to sense at least a position of the memory card and a write protection state of the memory card.

10. The connector in accordance with claim 9, wherein soldering terminals of the contacts and the switching pieces extend from a rear face of the base member of the contact block; and the soldering terminals are bent toward the cover shell, wherein soldering portions of the soldering terminals are disposed above the cover shell of the housing.

11. The connector in accordance with claim 10, wherein blanks of the contacts and the switching pieces comprise soldering terminals having portions which are commonly shaped, the commonly shaped portions each having a length that corresponds to a plurality of mounting types, the soldering terminals of the contacts and the switching pieces extend from the rear face of the base member of the contact block are cut and bent to correspond to a mounting type of the connector.

12. The connector in accordance with claim 1, further comprising slanted faces at front ends of the arms of the slider configured so that a distance between inner side faces of the arms gradually increases toward the front ends; and a pair of slanted first stoppers is provided on the sides of the opening of the housing so that the first stoppers contact the slanted faces of the arms of the slider when no memory card is being held by the slider as the slider moves forward by the pressing forces of the coil springs, and the arms receive forces for expanding the distance between the inner side faces of the arms from the stoppers.

13. The connector in accordance with claim 12, further comprising a second stopper provided in the housing to prevent an erroneous backwards insertion of the memory card, the second stopper being positioned more forward than the contacts held on the contact block so that an I/O contact of the memory card reaches the memory card when properly inserted, the second stopper is configured not to contact the memory card when the memory card is properly inserted and to contact the memory card when the memory card is erroneously inserted backwards; and when the memory card has downward offsets at lower side edges in the insertion direction, the first stoppers on the sides of the opening of the housing are configured to prevent an upside down erroneous insertion of the memory card so that the downward offsets of the memory card pass between the first stoppers when the memory card is properly inserted, and the memory card cannot pass between the first stoppers when the memory card erroneously inserted upside down.

* * * * *

UNITED STATES PATENT AND TRADEMARK OFFICE
CERTIFICATE OF CORRECTION

| | | |
|---|---|---|
| PATENT NO. | : 6,994,573 B2 | Page 1 of 1 |
| APPLICATION NO. | : 10/466109 | |
| DATED | : February 7, 2006 | |
| INVENTOR(S) | : H. Tanaka et al. | |

It is certified that error appears in the above-identified patent and that said Letters Patent is hereby corrected as shown below:

At column 28, line 24 (claim 13, line 19) of the printed patent, after "card" insert --is--.

Signed and Sealed this

Third Day of October, 2006

JON W. DUDAS
*Director of the United States Patent and Trademark Office*